United States Patent
Guan

(10) Patent No.: US 11,208,534 B2
(45) Date of Patent: Dec. 28, 2021

(54) DYNAMIC POLYMERS BASED ON SILYL ETHER EXCHANGE

(71) Applicant: The Regents of the University of California, Oakland, CA (US)

(72) Inventor: Zhibin Guan, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 141 days.

(21) Appl. No.: 16/019,500

(22) Filed: Jun. 26, 2018

(65) Prior Publication Data

US 2018/0371183 A1 Dec. 27, 2018

Related U.S. Application Data

(60) Provisional application No. 62/525,176, filed on Jun. 26, 2017.

(51) Int. Cl.
*C08J 3/24* (2006.01)
*C08F 212/08* (2006.01)
(Continued)

(52) U.S. Cl.
CPC ............ *C08J 3/24* (2013.01); *C08F 8/44* (2013.01); *C08F 212/08* (2013.01); *C08F 212/24* (2020.02); *C08F 216/06* (2013.01); *C08F 220/20* (2013.01); *C08F 230/08* (2013.01); *C08K 5/5415* (2013.01); *C08F 12/22* (2013.01); *C08F 12/24* (2013.01); *C08J 2325/18* (2013.01); *C08L 2312/08* (2013.01)

(58) Field of Classification Search
CPC . C08K 5/54–5419; C08J 3/24; C08J 2343/04; C08F 30/08; C08F 230/08; C08F 12/24; C08F 212/24; C08F 112/24; C08F 16/02–08; C08F 116/02–08; C08F 216/02–08; C08F 20/20; C08F 120/20; C08F 220/20; C08L 43/04; C09D 143/04; C09J 143/04
See application file for complete search history.

(56) References Cited

U.S. PATENT DOCUMENTS 7,605,394 B2 * 10/2009 Marks ............... H01L 51/052
106/287.1
2007/0129305 A1 6/2007 Divita et al.
(Continued)

FOREIGN PATENT DOCUMENTS

JP 2017110074 A * 6/2017 ............. C09J 7/20
WO 2006/060182 6/2006

OTHER PUBLICATIONS

CAS abstract of Nishimura et al., "Renewable silicon-containing cross-linked polymers and tuning their properties," presented at 253rd ACS National Meeting and Exposition, San Francisco, CA, Apr. 2-6, 2017.*

(Continued)

*Primary Examiner* — Kregg T Brooks
(74) *Attorney, Agent, or Firm* — Gavrilovich, Dodd & Lindsey LLP

(57) ABSTRACT

The disclosure provides for dynamic polymers based on silyl ether exchange that are malleable and recyclable which have favorable mechanical properties and chemical resistance, methods of making thereof, and uses and applications thereof.

15 Claims, 13 Drawing Sheets

(51) Int. Cl.

| | |
|---|---|
| C08F 8/44 | (2006.01) |
| C08F 230/08 | (2006.01) |
| C08F 216/06 | (2006.01) |
| C08F 220/20 | (2006.01) |
| C08F 212/14 | (2006.01) |
| C08K 5/5415 | (2006.01) |
| C08F 12/22 | (2006.01) |
| C08F 12/24 | (2006.01) |

(56) References Cited

U.S. PATENT DOCUMENTS

| | | | |
|---|---|---|---|
| 2008/0161464 A1* | 7/2008 | Marks | C08K 5/544 524/401 |
| 2009/0105115 A1 | 4/2009 | Reineke | |
| 2012/0183578 A1 | 7/2012 | Sinko et al. | |
| 2014/0242123 A1 | 8/2014 | Guan et al. | |
| 2014/0288150 A1 | 9/2014 | Guan et al. | |
| 2014/0288190 A1 | 9/2014 | Ashley et al. | |
| 2015/0297742 A1 | 10/2015 | Strieker et al. | |
| 2017/0327625 A1* | 11/2017 | Du Prez | C08G 83/008 |

OTHER PUBLICATIONS

Nishimura et al., "Renewable silicon-containing cross-linked polymers and tuning their properties," presented at 253rd ACS National Meeting and Exposition, San Francisco, CA, Apr. 2-6, 2017.*
Partial machine translation of JP-2017110074-A.*
Lieb, Jannette. Final Office Action for U.S. Appl. No. 14/814,475 (dated Apr. 11, 2017).
Lieb, Jannette. Advisory Action for U.S. Appl. No. 14/814,475 (dated Jul. 12, 2017).
Lieb, Jannette. Notice of Allowance for U.S. Appl. No. 14/814,475 (dated Sep. 19, 2017).
Liao et al., "De novo design of saccharide-peptide hydrogels as synthetic scaffolds for tailored cell responses." J Am Chem Soc 131:17638e46 (2009).
Liao et al., "Maintaining functional islets through encapsulation in an injectable saccharide-peptide hydrogel." Biomaterials 34(16):3984-91 (Mar. 7, 2013).
Liao et al., "The effect of cell-matrix interaction on encapsulated human islets, presented at the Congress of the International Pancreas and Islet Transplantation," (Jun. 2013).
Liao et al., "The Effect of Cell-Matrix Interaction on Encapsulated Human Islets," Transplantation 96(65):S97 (Sep. 27, 2013).
Lin et al., "PEG Hydrogels for the Controlled Release of Biomolecules in Regenerative Medicine." Pharmacol. Res. 26:631-643 (2009).
Lin et al., "Glucagon-like peptide-1 functionalized PEG hydrogels promote survival and function of encapsulated pancreatic beta-cells." Biomacromolecules 10:2460e7 (2009).
Liu et al., "Interfacial Assembly of a Series of Cinnamoyl-Containing Bolaamphiphiles: Spacer-Controlled Packing, Photochemistry, and Odd-Even Effect", Langmuir 28:3474-3482 (2012).
Liu et al., "SiRNA Delivery Systems Based on Neutral Cross-Linked Dendrimers," Bioconjug Chem 23:174-183 (Jan. 2012).
Liu et al., "Efficient Delivery of Sticky siRNA and Potent Gene Silencing in aProstate Cancer Model Using a Generation 5 Triethanolamine-Core PAMAM Dendrimer," Mol Pharmaceutics 9:470-481 (Mar. 2012).
Love et al., "Lipid-like materials for low-dose, in vivo gene silencing", PNAS 107(5): 1864-1869 (2010).
Lu et al., "Making Insoluble Polymer Networks Malleable via Olefin Metathesis." J. Am. Chem. Soc. 134:8424-8427 (2012).
Lu et al., "Olefin Metathesis for Effective Polymer Healing via Dynamic Exchange of Strong Carbon-Carbon Double Bonds." J. Am. Chem. Soc. 134:14226-14231 (2012).
Lutolf et al., "Synthesis and physicochemical characterization of end-linked poly(ethylene glycol)-co-peptide hydrogels formed by Michael-type addition." Biomacromolecules 4:713-722 (2003).
Malone et al., "Cationic liposome-mediated RNA transfection", PNAS 86:6077-6081 (1989).
Martens et al., Tailoring the degradation of hydrogels formed from multivinyl poly(ethylene glycol) and poly(vinyl alcohol) macromers for cartilage tissue engineering. Biomacromolecules 4:283-292 (2003).
Martin et al., Human embryonic stem cells express an immunogenic nonhuman sialic acid. Nat Med 11:228e32 (2005).
McCall et al., Update on islet transplantation. Cold Spring Harb Perspect Med 2:a007823 (2012).
Merkel et al., "Molecular modeling and in vivo imaging can identify successful flexible triazine dendrimer-based siRNA delivery systems," J Control Release 153(1):23-33 (2011).
Metters et al., Network formation and degradation behavior of hydrogels formed by Michael-type addition reactions Biomacromolecules 6:290-301 (2005).
Metzke et al. A novel carbohydrate-derived side-chain polyether with excellent protein resistance. J. Am. Chem. Soc. 125:7760-7761 (2003).
Metzke et al., Structure-property studies on carbohydrate-derived polymers for use as protein-resistant biomaterials. Biomacromolecules 9:208-215 (2008).
Mitragotri et al., "Overcoming the challenges in administering biopharmaceuticals:formulation and delivery strategies", Nat. Rev. Drug Discovery 13:655-672 (2014).
Moassesfar et al., "Slide on Transplantation Medical Cost, Islets vs. Pancreas," presented before the International Pancreas & Islet Transplant Association (IPITA) Congress on Sep. 25, 2013.
Montarnal et al., "Silica-like Malleable Materials from Permanent Organic Networks." Science 334(6058):965-968 (2011).
Negishi et al., "Luminescence technology in preservation and transplantation for rat islet." Islets 2011;3:111e7 (2011).
Nguyen et al., "Polymeric Materials for Gene Delivery and DNA Vaccination," Adv Mater 21:847-867 (2009).
Nguyen et al., "Nucleic acid delivery: the missing pieces of the puzzle?," Acc Chem Res 45:1153-1162 (Jul. 2012).
Nicolay et al., "Responsive Gels Based on a Dynamic Covalent Trithiocarbonate Cross-Linker." Macromolecules 43:4355-4361 (2010).
Nie et al., "Production of heparin-containing hydrogels for modulating cell responses." Acta Biomater. 5:865-875 (2009).
Nikolova et al., "The vascular basement membrane: a niche for insulin gene expression and beta cell proliferation." Dev Cell 10:397e405 (2006).
Nishimura et al., "Silyl Ether as a Robust and Thermally Stable Dynamic Covalent Motif for Malleable Polymer Design." J Am. Chem. Soc. 139:14881-14884 (2017).
Nuttelman et al., "Macromolecular monomers for the synthesis of hydrogel niches and their application in cell encapsulation and tissue engineering." Prog. Polym. Sci. 33: 167-179 (2008).
Obdia et al., "Reprocessing and Recycling of Highly Cross-Linked Ion-Conducting Networks through Transalkylation Exchanges of C-N Bonds." J Am. Chem. Soc. 137:6078-6083 (2015).
Omori et al., "Microassay for glucose-induced preproinsulin mRNA expression to assess islet functional potency for islet transplantation." Transplantation 89:146e54 (2010).
Osthoff et al., "Chemical Stress-Relaxation of Polydimethylsiloxane Elastomers." J. Am. Chem. Soc. 76(18):4659-4663 (1954).
Pasini et al., "Efficient Biocatalytic Cleavage and Recovery of Organic Substrates Supported on Soluble Polymers." Adv. Synth. Catal. 349:971-978 (2007).
Paszek et al., "Tensional homeostasis and the malignant phenotype." Cancer Cell 8:241-254 (2005).
Pavan et al., "Computational Insights into the Interactions between DNA and siRNA with "Rigid" and "Flexible" Triazine Dendrimers," Biomacromolecules 11: 721-730 (2010).
Pavan et al., "Dendrimers and dendrons for siRNA binding: computational insights," J Drug Deliv Sci Tec 22:83-89 (2012).
Pei et al., "Regional Shape Control of Strategically Assembled Multishape Memory Vitrimers." Adv. Mater. 28:156-160 (2016).
Pei et al., "Mouldable liquid-crystalline elastomer actuators with exchangeable covalent bonds." Nature Materials (13):36-41 (2014).
Peppas et al., Hydrogels in biology and medicine: from molecular principles to bionanotechnology AdV. Mater. 18:1345-1360 (2006).

(56) References Cited

OTHER PUBLICATIONS

Pitarresi et al., "Photocrosslinking of dextran and polyaspartamide derivatives: A combination suitable for colon-specific drug delivery." Journal of Controlled Release 119:328-338 (2007).
Rackham et al., "Co-transplantation of mesenchymal stem cells maintains islet organisation and morphology in mice." Diabetologia 54:1127-1135 (2011).
Rajeswari et al., "Does Tryptophan Intercalate in DNA? A Comparative Study of Peptide Binding to Alternating and Nonalternating A*T Sequences," Biochemistry 26:6825-6831 (1987).
Reed et al., "In situ mechanical interferometry of matrigel films." Langmuir 25:36-39 (2009).
Rehfeldt et al., "Cell responses to the mechanochemical microenvironment-implications for regenerative medicine and drug delivery" Adv. Drug Delivery Rev. 59:1329-1339 (2007).
Rejman et al., "Size-dependent internalization of particles via the pathways of clathrin and caveolae-mediated endocytosis", Biochem. J. 377:159-169 (2004).
Rettig et al., "Progress Toward In Vivo Use of siRNAs-II," Mol Ther 20:483-512 (Mar. 2012).
Rizzi et al., "Recombinant protein-co-PEG networks as cell-adhesive and proteolytically degradable hydrogel matrixes. Part I: Development and physicochemical characteristics." Biomacromolecules 6:1226-1238 (2005).
Rottger et al., "High-Performance vitrimers from commodity thermoplastics through dioxaborolane metathesis." Science 356:62-65 (2017).
Rozema et al., "Dynamic PolyConjugates for targeted in vivo delivery of siRNA to hepatocytes", PNAS 104 (32):12982-12987 (2007).
Sahin et al., "Combinatorial RNAi for quantitative protein network analysis", PNAS 104(16):6579-6584 (2007).
Salto et al., "Enhanced Hydrophobicity of Fluorinated Lipid Bilayer: A Molecular Dynamics Study", J. Phys. Chem B 112:11305-11309(2008).
Salvay et al., Extracellular matrix protein-coated scaffolds promote the reversal of diabetes after extrahepatic islet transplantation. Transplantation 85:1456e64 (2008).
Schafer et al., "Redox environment of the cell as viewed through the redox state of the glutathione disulfide/glutathione couple," Free Rad. Biol. Med. 30:1191-1212 (2001).
Schaffer et al., "Molecular Engineering of Viral Gene Delivery Vehicles,"Annu Rev Biomed Eng 10:169-194 (2008).
Schense et al., Cross-linking exogenous bifunctional peptides into fibrin gels with factor XIIIa. Bioconjugate Chem. 10:75-81 (1999).
Schmolke et al., "Dynamically Cross-Linked Polydimethylsiloxane Networks with Ambient-Temperature Self-Healing." Macromolecules 48:8781-8788 (2015).
Schnizer, Richard A. Non-Final Office Action for U.S. Appl. No. 14/221,249 (dated Nov. 25, 2015).
Schnizer, Richard A. Final Office Action for U.S. Appl. No. 14/221,249 (dated May 2, 2016).
Schnizer, Richard A. Advisory Action for U.S. Appl. No. 14/221,249 (dated Jul. 22, 2016).
Schnizer, Richard A. Non-Final Office Action for U.S. Appl. No. 14/221,249 (dated Sep. 20, 2016).
Schnizer, Richard A. Notice of Allowance for U.S. Appl. No. 14/221,249 (dated May 4, 2017).
Schnizer, Richard A. Non-Final Office Action for U.S. Appl. No. 15/688,718 (dated Dec. 26, 2017).
Schnizer, Richard A. Final Office Action for U.S. Appl. No. 15/688,718 (dated Jun. 26, 2018).
Scott et al., "Photoinduced Plasticity in Cross-Linked Polymers." Science 308:1615-1617 (2005).
Seliktar D. "Designing cell-compatible hydrogels for biomedical applications." Science 336:1124e8 (Jun. 15, 2012).
Sengupta et al., "Alternate glucocorticoid receptor ligand binding structures influence outcomes in an in vivo tissue regeneration model." Comp Biochem Physiol C Toxicol Pharmacol. 156(2):121-129 (2012).

Silva et al., "Selective differentiation of neural progenitor cells by high-epitope density nanofibers." Science 303:1352-1355 (2004).
Smith et al., "Diblock Glycopolymers Promote Colloidal Stability of Polyplexes and Effective pDNA and siRNA Delivery under Physiological Salt and Serum Conditions," Biomacromolecules 12:3015-3022 (2011).
Solari et al., "Marginal mass islet transplantation with autologous mesenchymal stem cells promotes long-term islet allograft survival and sustained normoglycemia." Journal of Autoimmunity 32:116-124 (2009).
Solon et al. Fibroblast adaptation and stiffness matching to soft elastic substrates. Biophys. J. 93:4453-4461 (2007).
Son et al., "Bioreducible Polymers for Gene Silencing and Delivery", Accounts of Chemical Research 45(7):1100-1112 (2012).
Sonawane et al., "Chloride Accumulation and Swelling in Endosomes Enhances DNA Transfer by Polyamine-DNA Polyplexes," J Biol Chem 278:44826-44831 (2003).
Soofi et al., "The elastic modulus of Matrigel as determined by atomic force microscopy." J. Struct. Biol. 167:216-219 (2009).
Stendahl et al., Extracellular matrix in pancreatic islets: relevance to scaffold design and transplantation. Cell Transplant 18:1e12 (2009).
Su et al., Anti-inflammatory peptide-functionalized hydrogels for insulin-secreting cell encapsulation. Biomaterials 31:308e14 (2010).
Tabernero et al., "First-in-Humans Trial of an RNA Interference Therapeutic Targeting VEGF and KSP in Cancer Patients with Liver Involvement," Cancer Discovery 3:406-417 (2013).
Tan et al., Thermosensitive injectable hyaluronic acid hydrogel for adipose tissue engineering. Biomaterials 30(36):6844-6853 (2009).
Tang et al., "In Vitro Gene Delivery by Degraded Polyamidoamine Dendrimers," Bioconjugate Chem 7:703-714 (1996).
Tibbei et al., Hydrogels as Extracellular Matrix Mimics for 3D Cell Culture. Biotechnol Bioeng. 103(4):655-663 (2009).
Toyofuku et al., Natural killer T-cells participate in rejection of islet allografts in the liver of mice. Diabetes 55:34e9 (2006).
Urakami et al., "Living Ring-Opening Polymerization of a Carbohydrate-Derived Lactone for the Synthesis of Protein-Resistant Biomaterials." Biomacromolecules, Jan. 26, 2008, 9, 592-597.
Vercruysse et al. Synthesis and in vitro degradation of new polyvalent hydrazide cross-linked hydrogels of hyaluronic acid. Bioconjugate Chem. 8:686-694 (1997).
Wagner, E., "Polymers for siRNA Delivery: Inspired by Viruses to be Targeted, Dynamic, and Precise," Acc Chem Res 45:1005-1013 (2011).
Wakefield et al., "Membrane Activity and Transfection Ability of Amphipathic Polycations as a Function of Alkyl Group Size," Bioconjug Chem 16:1204-1208 (2005).
Wang et al. Substrate flexibility regulates growth and apoptosis of normal but not transformed cells. Am. J. Physiol. Cell Physiol. 279:C1345-1350 (2000).
Weber et al., Cell-matrix interactions improve Beta-cell survival and insulin secretion in three-dimensional culture. Tissue Eng Part A 14:1959e68 (2008).
Weber et al., "Hydrogel encapsulation environments functionalized with extracellular matrix interactions increase islet insulin secretion." Matrix Biol 27(8):667-673 (2008).
Whitehead et al., "Knocking down barriers:advances in siRNA delivery", Nature Reviews 8:129-138 (2009).
Williams et al., "The Temperature Dependence of Relaxation Mechanisms in Amorphous Polymers and Other Glass-forming Liquids" J. Am. Chem. Soc. 77(14):3701-3707 (1955).
Won et al., "Oligopeptide complex for targeted non-viral gene delivery to adipocytes", Nature Materials 13:1157-1164 (Oct. 5, 2014).
Wong et al., "Co-Injection of a Targeted, Reversibly Masked Endosomolytic Polymer Dramatically Improves the Efficacy of Cholesterol-Conjugated Small Interfering RNAs In Vivo", Nucleic Acid Therapeutics 22(6):380-390 (2012).
Wu et al., "Polycationic dendrimers interact with RNA molecules: polyaminedendrimers inhibit the catalytic activity of Candida ribozymes." ChemComm 3:313-315 (2005).
Wu et al., "Dendrimers as Carriers for siRNA Delivery and Gene Silencing: A Review", The Scientific World Journal (2013).

(56) References Cited

OTHER PUBLICATIONS

Yamaguchi et al., "Growth Factor Mediated Assembly of Cell Receptor-Responsive Hydrogels." J. Am. Chem. Soc. 129:3040-3041 (2007).
Antoft-Finch et al., "N,N-diethyl O-carbamate: directed metalation group and orthogonal Suzuki-Miyaura cross-coupling partner," J. Am. Chem. Soc. 131 (49): 17750-2 (2009).
Beckmann et al., "Ring strain in boroxine rings: computational and experimental considerations," J. Organomet. Chem. 633(1-2):149-156 (2001).
Brutman et al., "Polylactide Vitrimers," ACS Macro Lett. 3(7):607-610 (2014).
El-Kaderi et al., "Designed Synthesis of 3D Covalent Organic Frameworks," Science 316(5822):268-72 (2007).
Fortman et al., "Making Insoluble Polymer Networks Malleable via Olefin Metathesis," J. Am. Chem. Soc. 137:14019-22 (2015).
Garcia et al., "Recyclable, Strong Thermosets and Organogels via Paraformaldehyde Condensation with Diamines," Science 344(6185):732-5 (2014).
Greenspan, L., "Humidity fixed points of binary saturated aqueous solutions," Journal of Research of the National Bureau of Standards Section A: Physics and Chemistry 81(1):89-96 (1977).
Hendriks et al., "Poly(thioether) Vitrimers via Transalkylation of Trialkylsulfonium Salts,"ACS Macro Lett. 6:930-934 (2017).
Iovine et al., "Condensation of Arylboroxine Structures on Lewis Basic Copolymers as a Noncovalent Means of Polymer Functionalization," Macromolecules 39(19):6324-6326 (2006).
Iovine et al., "Hetero-arylboroxines: The First Rational Synthesis, X-ray Crystallographic and Computational Analysis," Dalton Trans. 3791-4 (2008).
Jin et al., "Recent advances in dynamic covalent chemistry," Chem. Soc. Rev. 42:6634-54 (2013).
Korich et al., "Synthesis, characterization, and star polymer assembly of boronic acid end-functionalized polycaprolactone," . J. Polym. Sci., Part A: Polym. Chem. 48(24):5767-5774 (2010).
Lai et al., "A Stiff and Healable Polymer Based on Dynamic-Covalent Boroxine Bonds," Adv Mater. 28(37):8277-8282 (2016).
Li et al., "An Improved Protocol for the Preparation of 3-Pyridyl- and Some Arylboronic Acids," J. Org. Chem. 67(15):5394-5397 (2002).
Marinaro et al., "Properties of a Model Aryl Boronic Acid and Its Boroxine," J. Pharm. Sci. 101(9):3190-8 (2012).
McCusker et al., "Organoboron Compounds. II. Preparation and Properties of Some Trialkylboroxines," J. Am. Chem. Soc. 79(19):5185-5188 (1957).
Morgan et al., "Synthesis, flame-retardancy testing, and preliminary mechanism studies of nonhalogenated aromatic boronic acids: A new class of condensed-phase polymer flame-retardant additives for acrylonitrile-butadiene-styrene and polycarbonate," J. Appl. Polym. Sci. 76(8): 1257-1268 (2000).
Ogden et al., "Recyclable, Strong, and Highly Malleable Thermosets Based on Boroxine Networks," J. Am. Chem. Soc. 140(20):6217-6220 (2018).
Pigge et al., "An Enaminone-Directed Benzannulation/Macrocyclization Approach to Cyclophane Ring Systems," J. Org. Chem. 67:4547-52 (2002).
Qin et al., "Silylated Initiators for the Efficient Preparation of Borane-End-Functionalized Polymers via ATRP," Macromolecules 40(5):1413-1420 (2007).
Rowan et al., "Dynamic Covalent Chemistry," F. Angew. Chem. Int. Ed. Engl. 41(6):898-952 (2002).
Snyder et al., "Reprocessable Acid-Degradable Polycarbonate Vitrimers," Macromolecules 51:389-397 (2018).
Stuhr-Hansen et al., "Synthetic protocols and building blocks for molecular electronics," Tetrahedron 61(52):12288-12295 (2005).
Taynton et al., "Heat- or water-driven malleability in a highly recyclable covalent network polymer," Adv. Mater. 26(23):3938-42 (2014).

Xiang et al., "From Molecular-Level Organization to Nanoscale Positioning: Synergetic Ligand Effect on the Synthesis of Hybrid Nanostructures," Adv. Funct. Mater. 27(45):12 (2017).
Zhang et al., "Dynamic Thiol-Michael Chemistry for Thermoresponsive Rehealable and Malleable Networks," Macromolecules 49(18):6871-6878 (2016).
Zou et al., "Dynamic Covalent Polymer Networks: from Old Chemistry to Modern Day Innovations," Adv. Mater. 2(14) (2017).
Eguchi et al., "siRNA delivery using peptide transduction domains." Cell 30(7):341-345 (2009).
Elbert et al., Conjugate addition reactions combined with free-radical cross-linking for the design of materials for tissue engineering. Biomacromolecules 2:430-141 (2001).
Engler et al., Matrix elasticity directs stem cell lineage specification. Cell 126:677-689 (2006).
Fabio et al., "Novel Galactosylated Polyamine Bolaamphiphiles for Gene Delivery," Bioconjugate Chemistry 14:358-367 (2003).
Fischer et al., "Dendritic Polyglycerols with Oligoamine Shells Show Low Toxicity and High siRNA Transfection Efficiency in Vitro," Bioconjug Chem 21:1744-1752 (2010).
Flanagan et al., Neurite branching on deformable substrates. NeuroReport 13: 2411-2415 (2002).
Fortman et al., "Mechanically Activated, Catalyst-Free Polyhydroxyurethane Vitrimers." J. Am. Chem. Soc. 137:14019-14022 (2015).
Fougerolles et al., "Interfering with disease: a progress report on siRNA-based therapeutics", Nat. Rev. Drug Discovery 6:443-410 (2007).
Frisch et al., Anoikis mechanisms. Curr Opin Cell Biol 13:555e62 (2001).
Gaucheron et al., "In Vitro Gene Transfer with a Novel Galactosylated Spermine Bolaamphiphile," Bioconjugate Chem. 12:569-575 (2001).
Gelain et al., Designer self-assembling peptide nanofiber scaffolds for adult mouse neural stem cell 3-dimensional cultures. S. PLoS One 1:e119 (2006).
Giljohann et al., "Gene Regulation with Polyvalent siRNA-Nanoparticle Conjugates," JACS 131(6):2072-2073 (2009).
Gilleron et al., "Image-based analysis of lipid nanoparticle-mediated siRNA delivery, intracellular trafficking and endosomal escape" Nature Biotechnology 31:638-646 (2013).
Grieshaber et al., Synthesis and Characterization of Elastin-Mimetic Hybrid Polymers with Multiblock, Alternating Molecular Architecture and Elastomeric Properties. Macromolecules 42:2532-2541(2009).
Guilak et al., Control of stem cell fate by physical interactions with the extracellular matrix. Cell Stem Cell 5, 17-26 (2009).
Hafez et al., "On the mechanism whereby cationic lipids promote intracellular delivery of polynucleic acids" Nature 8:1188-1196 (2001).
Haines-Butterick et al., "Controlling hydrogelation kinetics by peptide design for three-dimensional encapsulation and injectable delivery of cells." Proc. Natl. Acad. Sci. U.S.A. 104:7791-7796 (2007).
Hamley, Ian. "PEG-Peptide Conjugates." Biomacromolecules 15:1543-1559 (2014).
Hartgerink et al., "Self-Assembly and Mineralization of Peptide-Amphiphile Nanofibers", Science 294:1684-1688 (2010).
Hiemstra et al., Rapidly in situ forming biodegradable robust hydrogels by combining stereocomplexation and photopolymerization. J. Am. Chem. Soc. 129:9918-9926 (2007).
Hu et al., Rational design of transglutaminase substrate peptides for rapid enzymatic formation of hydrogels. J. Am. Chem. Soc. 125, 14298-14299(2003).
Hu et al., Hydrogels cross-linked by native chemical ligation. Biomacromolecules 2194-2200 (2009).
Hunter, "Molecular hurdles in polyfectin design and mechanistic background to polycation induced cytotoxicity", Adv. Drug Delivery Rev 58:1523-1531 (2006).
Hwang et al., Cartilage tissue engineering: Directed differentiation of embryonic stem cells in three-dimensional hydrogel culture. J. Methods Mol. Biol. 407:351-373 (2007).

(56) References Cited

OTHER PUBLICATIONS

Gossl et al., "Molecular Structure of Single DNA Complexes with Positively Charged Dendronized Polymers." J. Am. Chem. Soc. 124:6860-6865 (2002).

Guignard et al., "Cost Analysis of Human Islet Transplantation for the Treatment of Type 1 Diabetes in the Swiss-French Consortium GRAGIL." Diabetes Care ,27(4):895-900 (2004).

Ingber et al., Cell structure and hierarchical systems biology. J. Cell Sci. 116:1157-1173 (2003).

Inukai et al., Preparation and characterization of hyaluronate-hydroxyethyl acrylate blend hydrogel for controlled release device. Chem. Pharm. Bull. 48:850-854 (2000).

Ito et al., "Mesechymal Stem Cell and Islet Co-Transplantation Promotes Graft Revascularization and Function", Transplantation, 89(12):1438-1445 (Jun. 28, 2010).

Jain et al., "Lactose-ornithine bolaamphiphiles for efficient gene delivery in vitro", International Journal of Pharmaceutics 423:392-400 3 (2012).

Jun et al., Biomimetic self-assembled nanofibers Soft Matter 2:177-181 (2006).

Kersey et al., A hybrid polymer gel with controlled rates of cross-link rupture and self-repair J. R. Soc. Interface 4:373-380 (2007).

Khalil et al., "Uptake Pathways and Subsequent Intracellular Trafficking in Nonviral Gene Delivery," Pharmacological Reviews 58(1):32-45 (2006).

Khan et al., "Diaminododecane-based cationic bolaamphiphile as a non-viral gene delivery", Biomaterials 33 , 4673-4680 (2012).

Kim et al., "Polyoxalate Nanoparticles as a Biodegradable and Biocompatible Drug Delivery Vehicle," Biomacromolecules 11: 555-560 (2010).

Kim et al., "Dendronized gold nanoparticles for siRNA delivery" Small 8(21):3253-3256 (2012).

Kim et al., "In Silico, In Vitro, and In Vivo Studies Indicate the Potential Use of Bolaamphiphiles for Therapeutic siRNAs Delivery", Molecular Therapy-Nucleic Acids 2:e80 (2013).

Klein et al., "Nucleic acid transfer with hemi!uorinated polycationic lipids" Biomaterials 31:4781-4788 (2010).

Kleinman et al., "Isolation and characterization of type IV procollagen, laminin, and heparan sulfate proteoglycan from the EHS sarcoma. " Biochemistry 21:6188-6193 (1982).

Kloxin et al., "Covalent Adaptable Networks (CANs): A Unique Paradigm in Crosslinked Polymers." Macromolecules 43(6):2643-2653 (2010).

Kloxin et al., "Mechanophotopatterning on a Photoresponsive Elastomer." Adv. Mater 23:1977-1981 (2011).

Knudsen et al., "In vivo toxicity of cationic micelles and liposomes" Nanomedicine 11(2):467-477 (Aug. 26, 2014).

Kopecek, Hydrogel Biomaterials: A Smart Future? J. Biomaterials 28:5185-5192 (2007).

Kulkarni et al., "Pendant Polymer:Amino-β-Cyclodextrin:siRNA Guest:Host Nanoparticles as Efficient Vectors for Gene Silencing," J Am Chem Soc 134:7596-7599 (Apr. 30, 2012).

Kumar et al., "Transvascular delivery of small interfering RNA to the central nervous system", Nature 448:39-43 (2007).

Lee et al., "Controlling Mechanical and Swelling Properties of Alginate Hydrogels Independently by Cross-Linker Type and Cross-Linking Density" Macromolecules 33, 4291-4294 (2000).

Lee et al., "Hydrogels for tissue engineering." J. Chem ReV 101:1869-1879 (2001).

Lee et al., "Three-dimensional micropatteming of bioactive hydrogels via two-photon laser scanning photolithography for guided 3D cell migration." Biomaterials 29:2962-2968 (2008).

Lee et al., "Growth factor delivery-based tissue engineering: general approaches and a review of recent developments." J R Soc Interface 8:153e70 (2011).

Lieb, Jannette. Non-final Office Action for U.S. Appl. No. 14/814,475 (dated Jul. 22, 2016).

Yang et al., "Carbon nanotube-vitrimer composite for facile and efficient photo-welding of epoxy." Chem. Scie 5:3486-3492 (2014).

Yu et al., "An Amphiphilic Dendrimer for Effective Delivery of Small Interfering RNA and Gene Silencing In Vitro and In Vivo", Angewandte Chemie 51:8478-8484 (2012).

Yu et al., "Reprocessing and Recycling of Thermosetting Polymers based on Bond Exchange Reactions." RSC Adv. 4:10108-10117(2014).

Zeng et al. "Multifunctional Dendronized Peptide Polymer Platform for Safe and Effective siRNA Delivery", JACS 135:4962-4965 (Mar. 15, 2013).

Zhang et al., "Effect of Sterics and Degree of Cross-Linking on the Mechanical Properties of Dynamic Poly(alkylurea-urethane) Networks". Macromolecules 50:5051-5060 (2017).

Zheng et al., "A Surprise from 1954: Siloxane Equilibration Is a Simple, Robust, and Obvious Polymer Self-Healing Mechanism". J. Am Chem. Soc. 134:2024-2027 (2012).

Akinc et al., "A combinatorial library of lipid-like materials for delivery of RNAi therapeutics," Nat Biotechnol 26:561-569 (2008).

Amamoto e et al., "Self-Healing of Covalently Cross-Linked Polymers by Reshuffling Thiuram Disulfide Moieties in Air under Visible Light," Adv. Mater. 24:3975-398- (2012).

Amamoto et al., "Repeatable Photoinduced Self-Healing of Covalently Cross-Linked Polymers through Reshuffling of Trithiocarbonate Units," Angew. Chem. Int. Ed. 50:1660-1663 (2011).

Ashcroft et al., "Glucose metabolism in mouse pancreatic islets." Biochem J 118:143e54 (1970).

Banerjee et al. "The influence of hydrogel modulus on the proliferation and differentiation of encapsulated neural stem cells." Biomaterials 30:4695-4699 (2009).

Banwell et al., "Rational design and application of responsive alpha-helical peptide hydrogels." Nat. Mater. 8:596-600 (2009).

Barnard et al., Degradable Self-Assembling Dendrons for Gene Delivery: Experimental and Theoretical Insights into the Barriers to Cellular Uptake J Am Chem Soc 133:20288-20300 (2011).

Behr, J. P., "Synthetic Gene Transfer Vectors II: Back to the Future," Acc Chem Res 45:980-984 (Feb. 2012).

Bennet et al., "Incompatibility between human blood and isolated islets of Langerhans: a finding with implications for clinical intraportal islet transplantation?," Diabetes 48:1907e14 (1999).

Berkefeld et al., "Silicon a-Effect: A Systematic Experimental and Computational Study of the Hydrolysis of Ca and Cg-Functionalized Alkoxytriorganylsilanes of the Formula Type ROSiMes2(CH2)nX (R = me, ET; n =1, 3; X = Functional group)." Organometallics 33:2721-2737 (2014).

Blomeier et al. Polymer scaffolds as synthetic microenvironments for extrahepatic islet transplantation. Transplantation 82:452e9 (2006).

Borg et al., The use of biomaterials in islet transplantation. Curr Diab Rep 11:434e44 (2011).

Bowman et al., "Covalent Adaptable Networks: Reversible Bond Structures Incorporated in Polymer Networks." Angew. Chem. Int. Ed. 51:4272-4274 (2012).

Brown et al. Importance of hepatic portal circulation for insulin action in streptozotocin-diabetic rats transplanted with fetal pancreases. J Clin Invest 64:1688e94 (1979).

Brunelle et al., "A structureeactivity investigation of hemifluorinated bi-functional bolaamphiphiles designed for gene delivery," C. R. Chimie 12:88-208 (2009).

Bryant et al., Hydrogel properties influence ECM production by chondrocytes photoencapsulated in poly(ethylene glycol) hydrogels. J. Biomed. Mater. Res. 59:63-72 (2002).

Bryant et al., Incorporation of tissue-specific molecules alters chondrocyte metabolism and gene expression in photocrosslinked hydrogels. Acta Biomater. 1:243-252 (2005).

Burdick et al. Photoencapsulation of osteoblasts in injectable RGD-modified PEG hydrogels for bone tissue engineering Biomaterials 23:4315-4323 (2002).

Burdick et al. Controlled degradation and mechanical behavior of photopolymerized hyaluronic acid networks. Biomacromolecules 6:386-391 (2005).

Burnett et al., "RNA-based Therapeutics—Current Progress and Future Prospects," J. Chem Biol 19:60-71 (Jan. 2012).

Brutman et al. "Polylactide Vitrimers." ACS Macro Lett. 3:607-610 (2014)).

(56) References Cited

OTHER PUBLICATIONS

Capelot et al., "Catalytic Control of the Vitrimer Glass Transition." ACS Macro Lett. 1:789-792 (2012).

Carlsson et al., Markedly decreased oxygen tension in transplanted rat pancreatic islets irrespective of the implantation site. Diabetes 50:489e95 (2001).

Castanotto et al., "The promises and pitfalls of RNA interference-based therapeutics", Nature 457:426-433 (2009).

Chabert et al., "Multiple welding of long fiber epoxy vitrimer composites." Soft Matter 12:4838-4845 (2016).

Chang et al., "Surface-Engineered Dendrimers with a Diaminododecane Core Achieve Efficient Gene Transfection and Low Cytotoxicity," Bioconjugate Chemistry 25(2):342-50. Jan. 21, 2014).

Chawla et al., Biodegradable and biocompatible synthetic saccharide-Peptide hydrogels for three-dimensional stem cell culture. Biomacromolecules 12:560e7 (2011).

Chawla et al., Modulation of chondrocyte behavior through tailoring functional synthetic saccharide-peptide hydrogels. Biomaterials 33:6052e60 (Sep. 1, 2012).

Chen et al., "Bioreducible Hyperbranched Poly(amido amine)s for Gene Delivery," Biomacromolecules 10:2921-2927 (2009).

Chen et al., "An RNA interference screen uncovers a new molecule in stem cell self-renewal and long-term regeneration", Nature 485(7396):104-108 (2012).

Cordero Garcia, Marcela M. Non-final Office Action for U.S. Appl. No. 14/186,973 (dated Mar. 24, 2015).

Cordero Garcia, Marcela M. Final Office Action for U.S. Appl. No. 14/186,973 (dated Aug. 21, 2015).

Cordero Garcia, Marcela M. Notice of Allowance for U.S. Appl. No. 14/186,973 (dated Nov. 12, 2016).

Creusat et al., "Self-Assembling Polyethylenimine Derivatives Mediate Efficient siRNA Delivery in Mammalian Cells," Chembiochem 9:2787-2789 (2008).

Crombez et al., "A New Potent Secondary Amphipathic Cell-penetrating Peptide for siRNA Delivery Into Mammalian Cells," Molecular Therapy 17(1):95-103 (2009).

Crombez et al., "Targeting cyclin B1 through peptide-based delivery of siRNA prevents tumour growth," Nucleic Acids Res 37(14):4559-4569 (2009).

Cromwell et al., "Malleable and Self-Healing Covalent Polymer Networks through Tunable Dynamic Boronic Ester Bonds." J. Am. Chem. Soc. 137:6492-6495 (2015).

Cui et al., "Conjugation Chemistry through Acetals toward a Dextran-Based Delivery System for Controlled Release of siRNA," J Am Chem Soc 134:15840 (Sep. 2012).

Dafik et al., "Fluorinated Lipid Constructs Permit Facile Passage of Molecular Cargo into Living Cells," JACS 131:12091-12093(2009).

Davis et al., "Evidence of RNAi in humans from systemically administered siRNA via targeted nanoparticles," Nature 464:1067-1071 (2010).

Deforest et al., "Sequential click reactions for synthesizing and patterning three-dimensional cell microenvironments." Nat. Mater. 8:659-664 (2009).

Degoricija et al., "Hydrogels for osteochondral repair based on photocrosslinkable carbamate dendrimers. Biomacromolecules." 9:2863-2872 (2008).

Denissen et al., "Vinylogous Urethane Vitrimers." Adv. Funct. Mater. 25(16):2451-2457 (2015).

Denissen et al., "Vitrimers: permanent organic networks with glass-like fluidity." Chem. Sci. 7:30-38 (2016).

Denyelle et al., "Synthesis and preliminary biological studies of hemifluorinated bifunctional bolaamphiphiles designed for gene delivery," New Journal of Chemistry 30:629-646 (2006).

Dietzl et al., "A genome-wide transgenic RNAi library for conditional gene inactivation in *Drosophila*", Nature 448:151-156 (2007).

Discher et al., Tissue cells feel and respond to the stiffness of their substrate. Science 310:1139-1143 (2005).

Dong et al., "Lipopeptide nanoparticles for potent and selective siRNA delivery in rodents and nonhuman primates", PNAS 111(11):3955-3960 (Mar. 18, 2014).

Drury et al., Hydrogels for tissue engineering: scaffold design variables and applications. J. Biomaterials 24:4337-4351 (2003).

Dunn et al., "Reductively-responsive siRNA-conjugated hydrogel nanoparticles for gene silencing," J Am Chem Soc 134:7423-7430 (May 2012).

\* cited by examiner

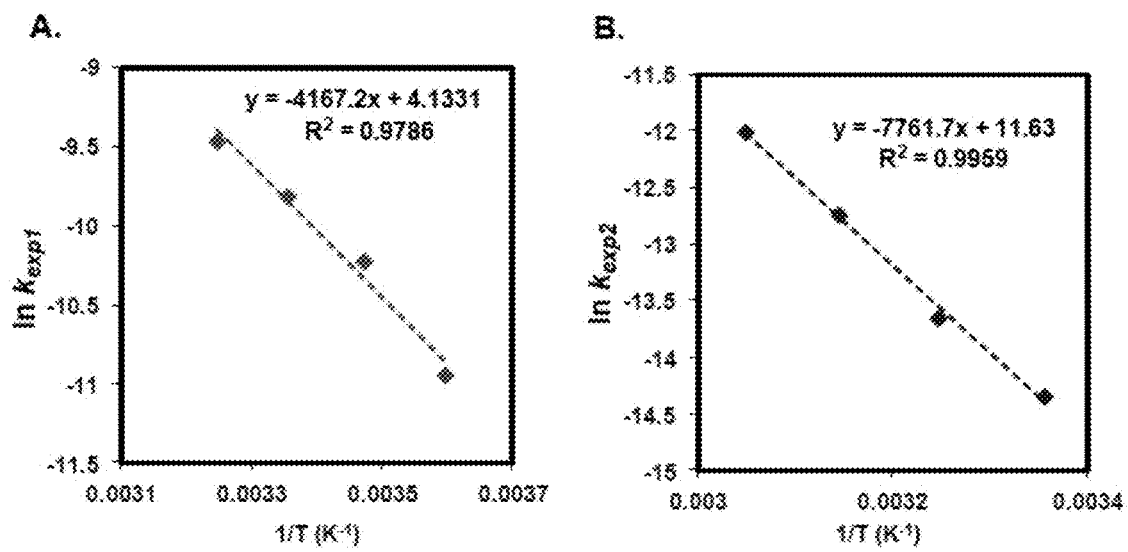
FIG. 5A-B
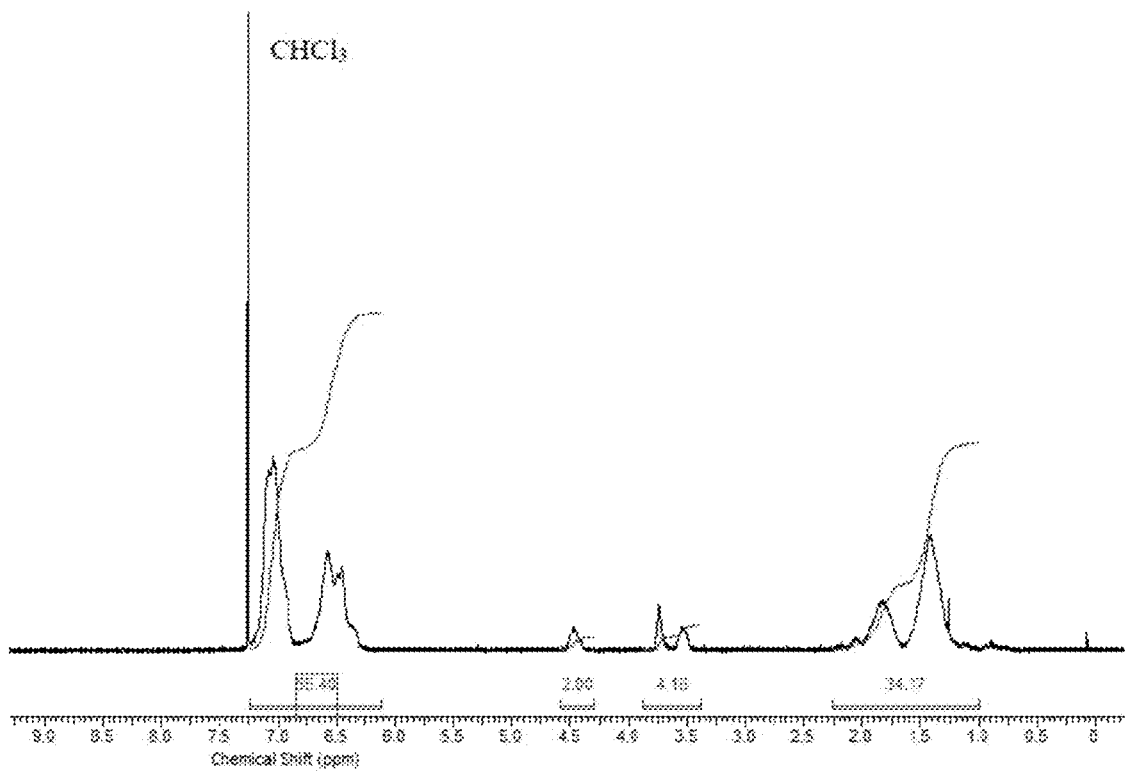
FIG. 6

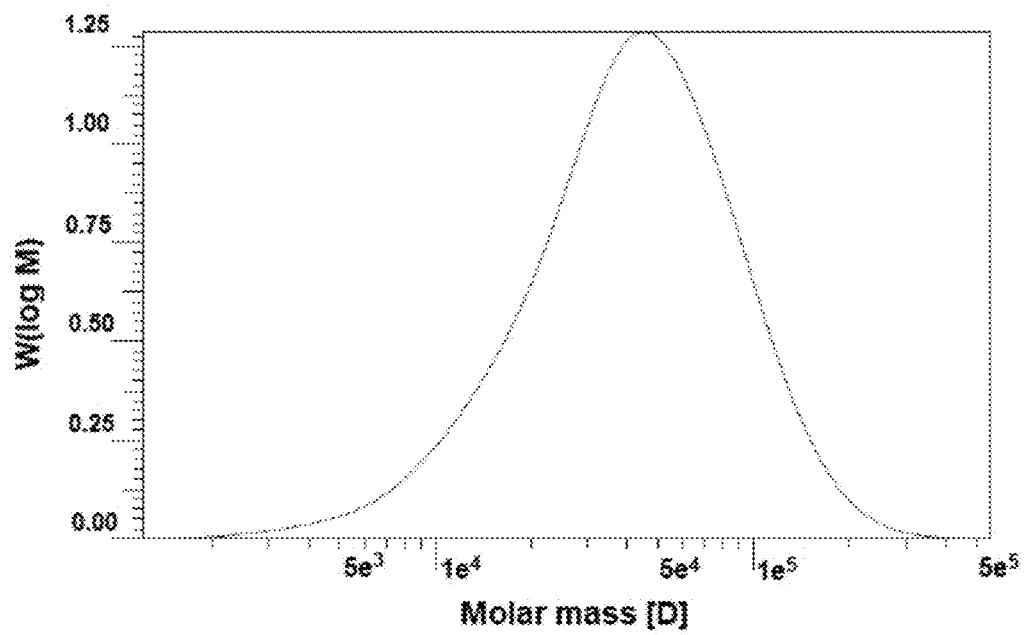
FIG. 7
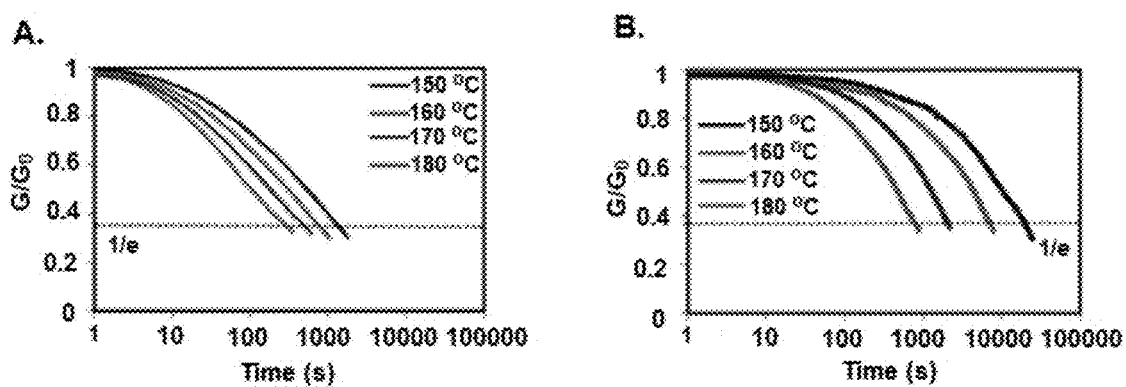
FIG. 8A-B

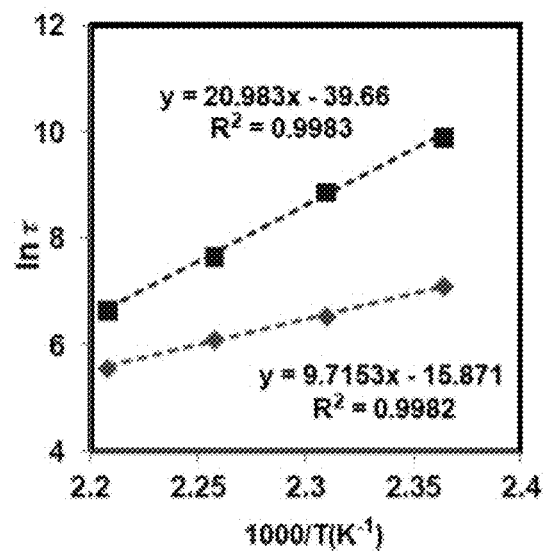
FIG. 9
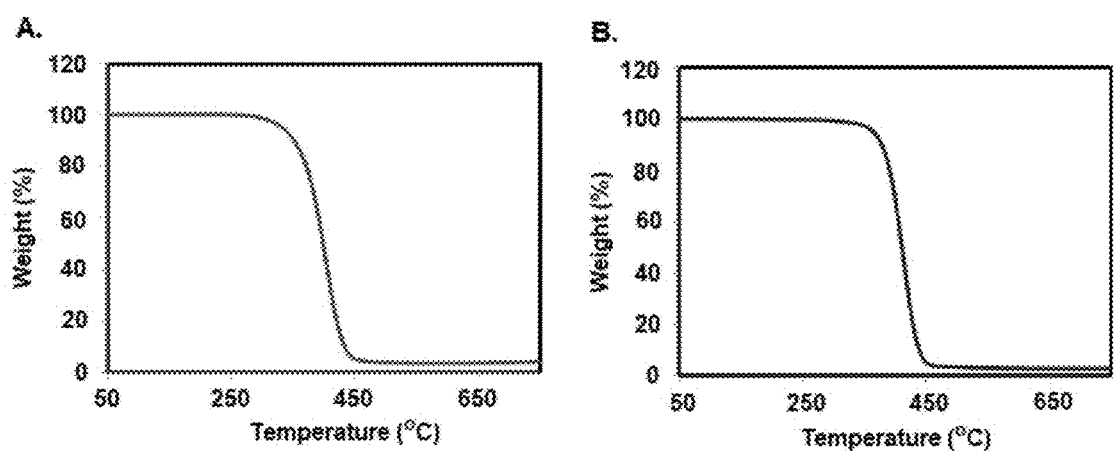
FIG. 10A-B

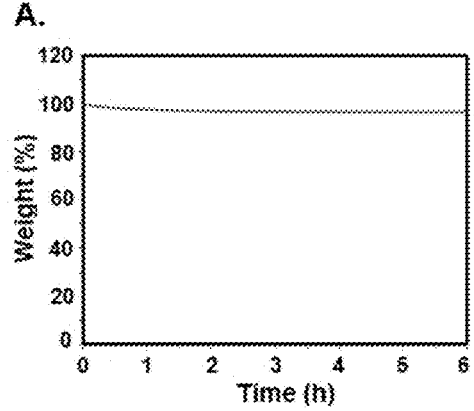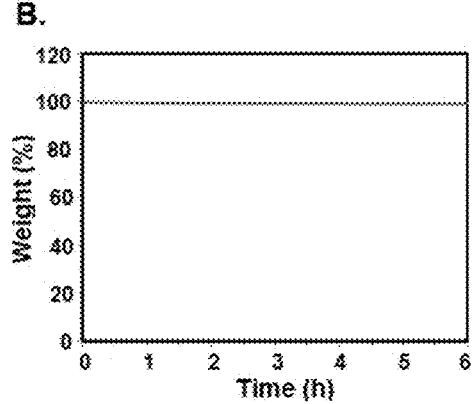
*FIG. 11A-B*
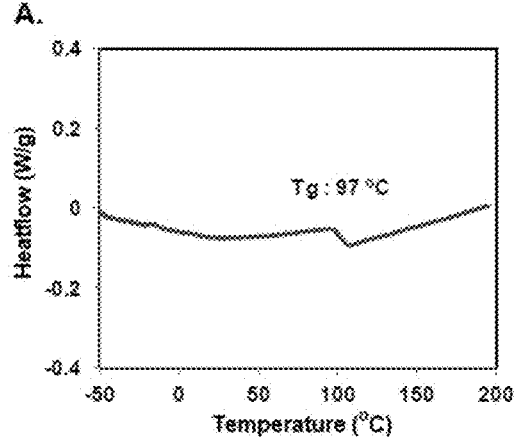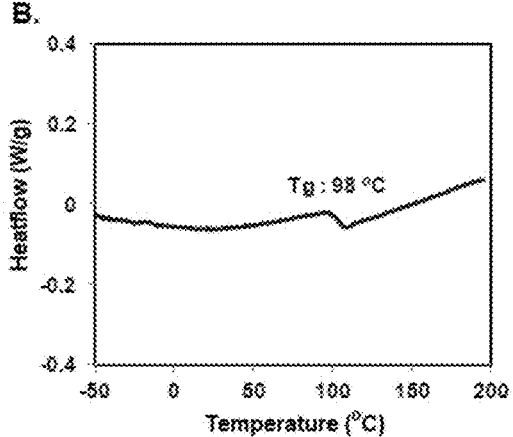
*FIG. 12A-B*

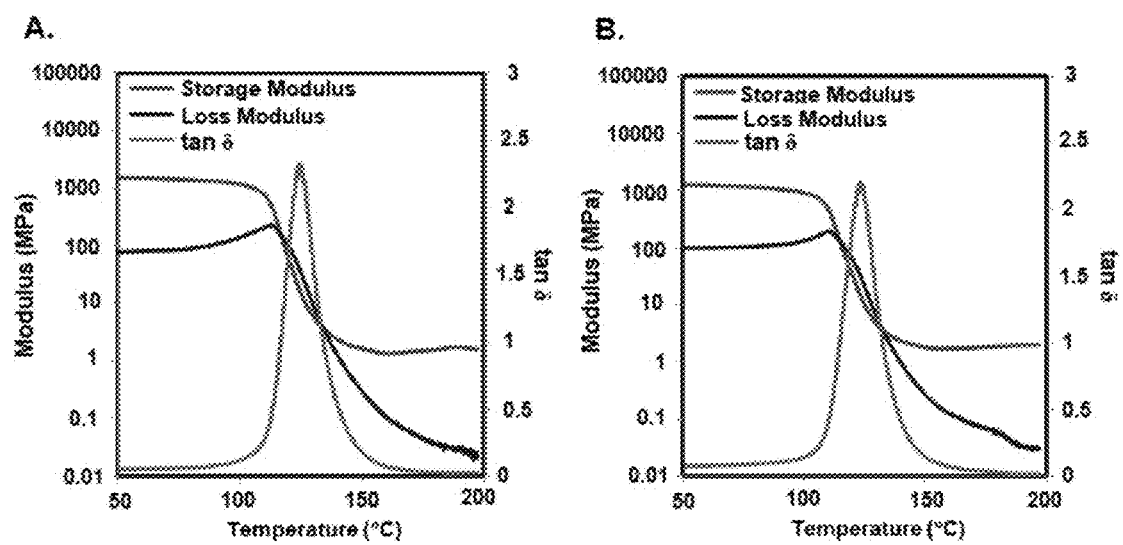
FIG. 13A-B
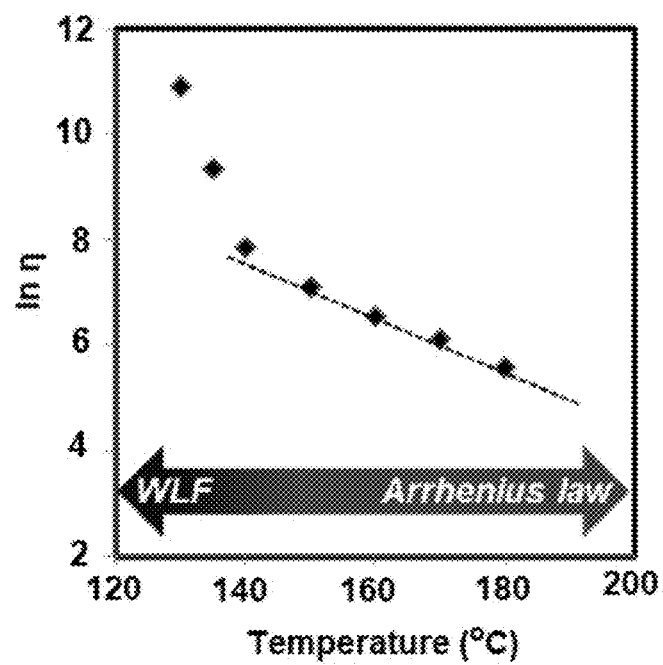
FIG. 14

Silyl ether exchange with free hydroxyls
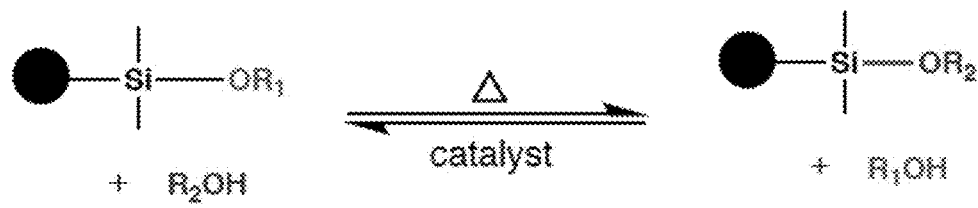
Silyl ether metathesis reaction
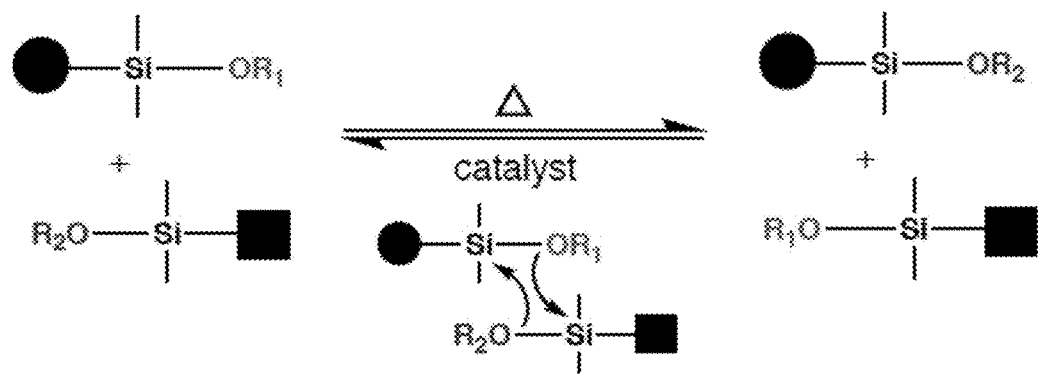
FIG. 18

A.

B.

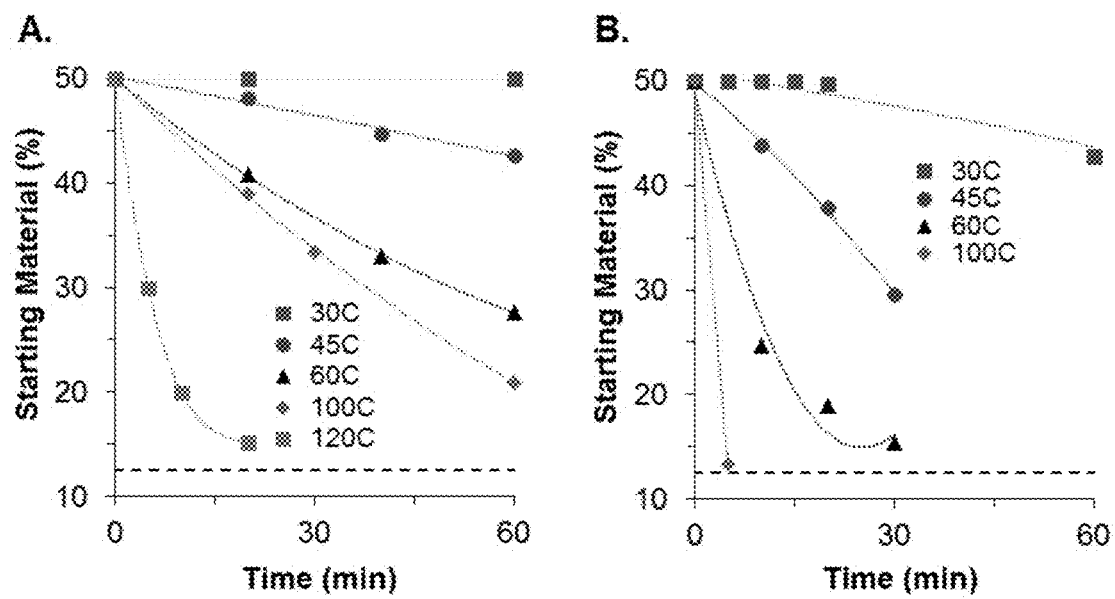
FIG. 20A-B
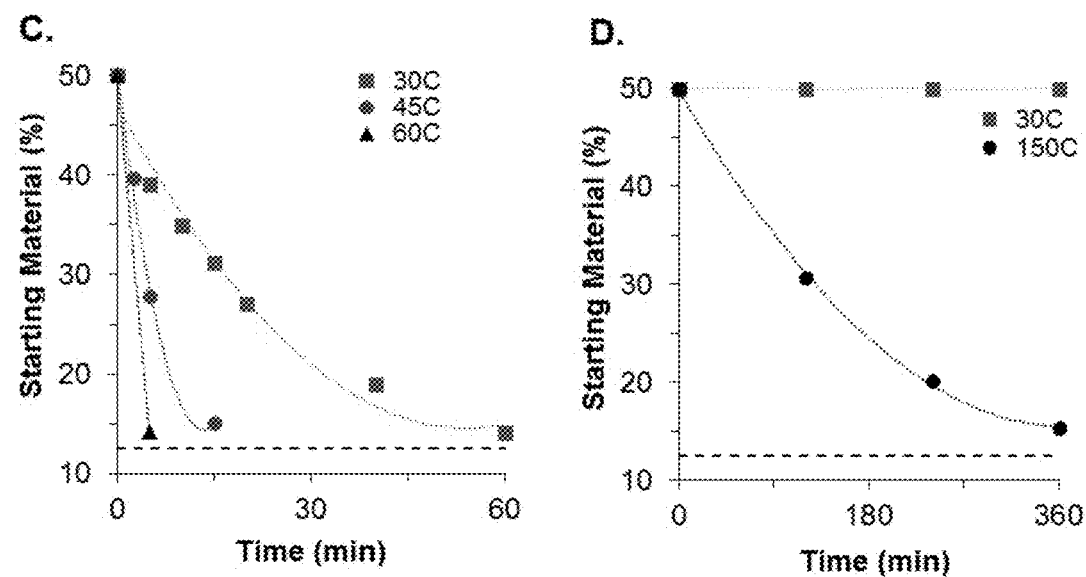
FIG. 20C-D

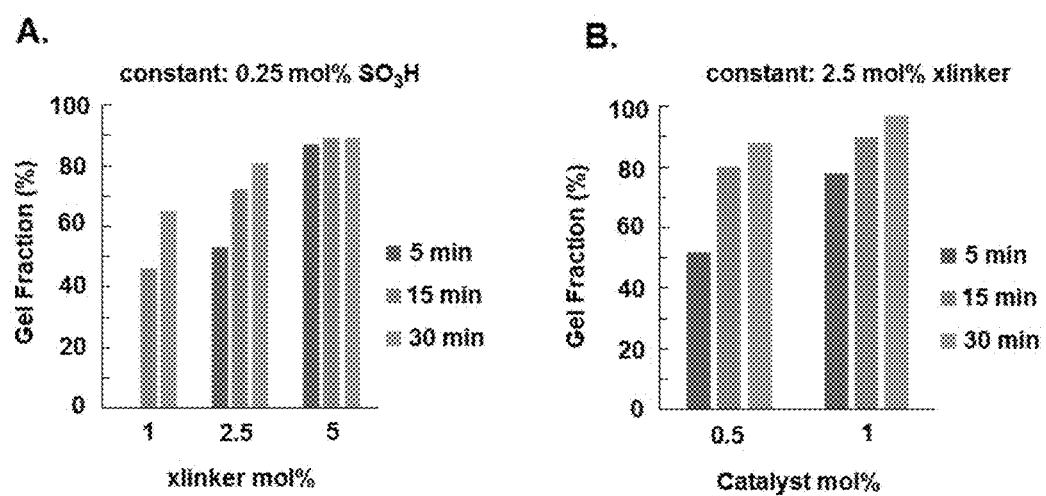
FIG. 21A-B

DYNAMIC POLYMERS BASED ON SILYL ETHER EXCHANGE

CROSS REFERENCE TO RELATED APPLICATIONS

This application claims priority under 35 U.S.C. § 119 from Provisional Application Ser. No. 62/525,176 filed Jun. 26, 2017, the disclosure of which is incorporated herein by reference.

STATEMENT OF GOVERNMENT SUPPORT

This invention was made with Government support under Grant No. DE-FG02-04ER46162, awarded by the Department of Energy, and Grant No. 1810217, awarded by the National Science Foundation. The Government has certain rights in the invention.

TECHNICAL FIELD

The disclosure provides for dynamic polymers based on silyl ether exchange that are malleable and recyclable which have favorable mechanical properties and chemical resistance, methods of making thereof, and uses and applications thereof.

BACKGROUND

The recent trend in materials chemistry towards bottom-up materials design with a focus on small molecule dynamics has allowed scientists and engineers to imbue remarkable macroscopic responses to bulk materials such as self-healing, shape-memory, and malleability.

SUMMARY

The disclosure provides for dynamic polymers that are malleable and recyclable which have favorable mechanical properties and chemical resistance. In particular, the dynamic polymers of the disclosure utilize a vitrimer design. The vitrimer design integrates an innovative dynamic motif along with exchange chemistry of covalent bonds containing silicon. The dynamic polymers disclosed herein, when cross-linked, were fully reformed after samples were cut into small pieces and then melt-pressed. This is one of the few examples of materials exhibiting vitrimeric behavior without a transition metal catalyst. Moreover, the dynamic polymers of the disclosure utilize autocatalytic control of the vitrimer topology freezing temperature and the material reprocessing temperature.

In a certain embodiment, the disclosure provides for a dynamic polymer comprising a silyl ether-based vitrimer, wherein the dynamic polymer comprises an organic and/or inorganic polymer backbone crosslinked by a plurality of telechelic bis-silyl ether cross linkers. In a further embodiment, a dynamic polymer comprises ethenyl-based monomers, vinyl-based monomers, UV active monomers, styrene-based monomers, acrylic-based monomers, amine-based monomers, epoxide-based monomers, anhydride-based monomers, and/or imide-base monomers. In yet a further embodiment, at least a portion of monomers making up the organic and/or polymer backbone comprises or further comprises pendant hydroxyl groups. In a certain embodiment, a dynamic polymer disclosed herein comprises a poly(styrene-co-sytrene-OH) polymer backbone. In yet another embodiment, a dynamic polymer disclosed herein comprise a plurality of bis-silyl ether cross linkers that comprises one or more heteroatom-based functional groups between the silicon atoms. In a particular embodiment, the plurality of bis-silyl ether cross linkers comprises secondary amino groups at y positions to each silicon atom. In an alternate embodiment, a dynamic polymer disclosed herein comprise a plurality of bis-silyl ether cross linkers that does not comprise any heteroatom-based functional groups between the silicon atoms. In another embodiment disclosed herein, a dynamic polymer disclosed herein does not exhibit thermal degradation at temperatures up to 300° C. In yet another embodiment, a dynamic polymer does not exhibit thermal degradation at temperatures up to 350° C. In a further embodiment, a dynamic polymer disclosed herein has a topology-freezing transition temperature ($T_v$) that is lower than the glass transition temperature ($T_g$). In yet a further embodiment, a dynamic polymer disclosed herein has a $T_v$ that is less than 75% of the Tg. In another embodiment, a dynamic polymer disclosed herein has a $T_v$ that is less than 50% of the Tg. In a certain embodiment, a dynamic polymer disclosed herein exhibits one or more of the following properties: malleability, self-healing, and/or shape-memory. In another embodiment, a dynamic polymer disclosed herein exhibits vitrimeric behavior without the use of a transition metal catalyst. In yet another embodiment, the $T_v$ and/or the material reprocessing temperature of a polymer of the disclosure is autocatalytically controlled.

In a particular embodiment, the disclosure provides for a dynamic malleable and self-healing polymer comprising one or more polymer chains that are reversibly and covalently cross-linked by a plurality of bis-, tri-, or tetra-silyl ether crosslinkers and/or bis-, tri-, or tetra-silyl halide cross-linkers. In a further embodiment, the dynamic polymer comprises a first portion of monomers that do not comprise pendant hydroxyl groups or pendant silyl ether groups, and a second portion of monomers that comprise pendant hydroxyl groups or pendant silyl ether groups. In another embodiment, the dynamic polymer comprises a ratio of the first portion of monomers to the second portion of monomers of 100:1 to 1:100. In an alternate embodiment, the dynamic polymer comprises a ratio of the first portion of monomers to the second portion of monomers of 20:1 to 1:20. In yet another embodiment, the polymer comprises polymerized acrylic monomers, alcohol monomers, allyl monomers, anhydride monomers, biodegradable polymer monomers, bisphenol and sulfonyldiphenol monomers, carboxylic acid monomers, epoxide monomers, isocyanate monomers, norbornene monomers, silicone monomers, styrene monomers, vinyl ester monomers, vinyl ether monomers, or vinyl monomers. In a further embodiment, the dynamic polymer comprises polymerized styrene monomers, wherein the polymer comprises a first portion of styrene monomers having the structure of:

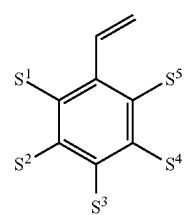

wherein, $S^1$-$S^5$ are each independently selected from the group consisting of H, halo, nitro, $(C_1$-$C_4)$alkyl, $(C_1$-$C_3)$alkoxy, $(C_1$-$C_2)$alkyl halide, and amino; and wherein the polymer comprises a second portion of the styrene monomers having the structure of:

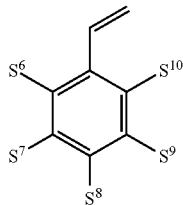

wherein, $S^6$-$S^{10}$ are each independently selected from the group consisting of H, halo, nitro, $(C_1$-$C_4)$alkyl, $(C_1$-$C_3)$ alkoxy, $(C_1$-$C_2)$alkyl halide, amino,

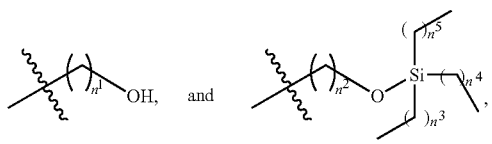

$n^1$-$n^5$ are integers and are each independently selected from the group consisting of 0, 1, 2, 3, 4, 5 and 6, and wherein one of $S^6$-$S^{10}$ is

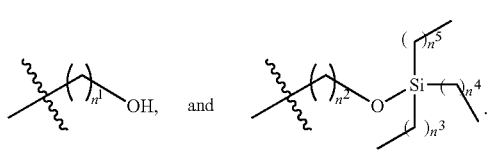

In a certain embodiment, the dynamic polymer of claim 6, wherein the first portion of styrene monomers comprises the structure of:

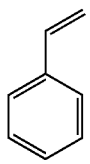

and wherein the second portion of styrene monomers comprises the structure of:

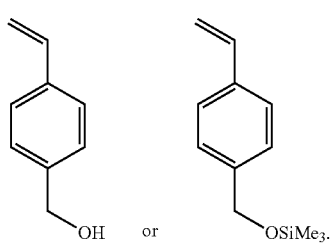

In an alternate embodiment, the polymer comprises polymerized acrylic monomers, wherein the polymer comprises a first portion of acrylic monomers having the structure of:

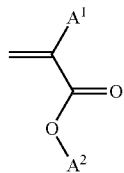

wherein, $A^1$ is selected from the group consisting of H, methyl, $(C_1$-$C_3)$alkoxy, $(C_1$-$C_3)$ester, $(C_1$-$C_2)$alkyl halide, and amide, $A^2$ is selected from a $(C_1$-$C_3)$alkoxy or an optionally substituted $(C_1$-$C_4)$alkyl, wherein the alkyl is optionally substituted with an amino group, carboxy group, or one or more halide(s); and wherein the polymer comprises a second portion of acrylic monomers having the structure of:

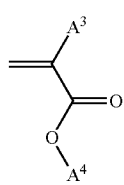

wherein, $A^3$ is selected from the group consisting of H, methyl, $(C_1$-$C_3)$alkoxy, $(C_1$-$C_3)$ester, $(C_1$-$C_2)$alkyl halide, and amide, $A^4$ is selected from

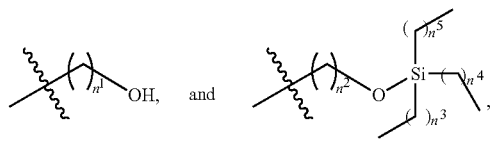

and $n^1$-$n^5$ are integers each independently selected from the group consisting of 0, 1, 2, 3, 4, 5 and 6. In yet a further embodiment, the first portion of acrylic monomers comprises the structure of:

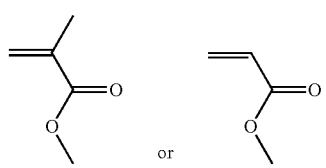

and wherein the second portion of acrylic monomers comprises a structure selected from the group consisting of:

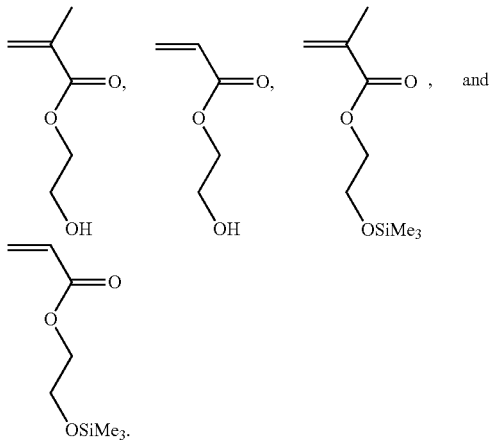

In yet another alternate embodiment, the dynamic polymer comprises polymerized vinyl monomers, wherein the polymer comprises a first portion of vinyl monomers having the structure of:

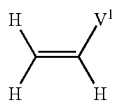

wherein, $V^1$ is selected from the group consisting of H, halo, heterocycle, nitrile, acetamide, $(C_1-C_6)$alkyl, and $(C_1-C_6)$ alkoxy, wherein the polymer comprises a second portion of vinyl monomers having the structure of:

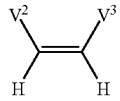

wherein, $V^2$ is selected from

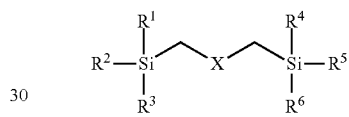

$V^3$ is selected from the group consisting of H, halo, heterocycle, nitrile, acetamide, $(C_1-C_6)$alkyl, and $(C_1-C_6)$alkoxy, and $n^1$-$n^5$ are integers each independently selected from the group consisting of 0, 1, 2, 3, 4, 5 and 6. In a further embodiment, the first portion of vinyl monomers comprises a structure selected from the group consisting of:

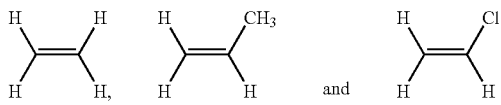

and wherein the second portion of vinyl monomers comprises a structure selected from the group consisting of:

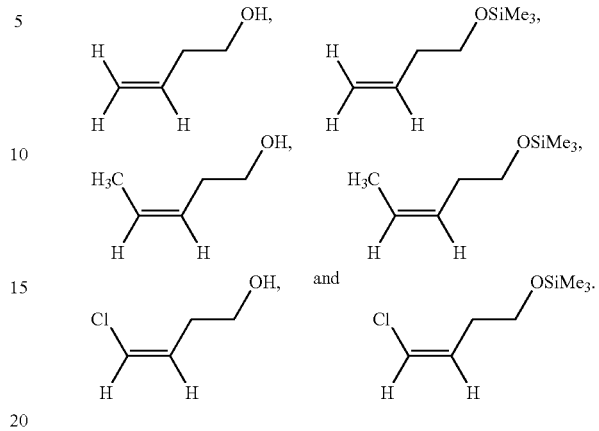

In yet a further embodiment, a dynamic polymer disclosed herein comprises a plurality of bis- or tri-silyl ether crosslinkers and/or bis- or tri-silyl halide crosslinkers having the structure of:

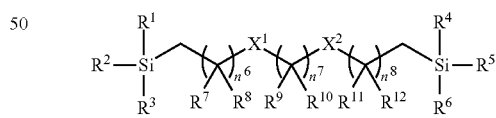

wherein, $R^1$-$R^6$ are each individually selected from a halo, a $(C_1-C_3)$alkyl, or a —O—$(C_1-C_3)$alkyl, and wherein at least one of $R^1$-$R^3$ is a —O—$(C_1-C_3)$alkyl or a halo, and wherein at least one of $R^4$-$R^6$ is a —O—$(C_1-C_3)$alkyl or a halo; and X is selected from the group consisting of an optionally substituted $(C_1-C_{20})$alkyl, an optionally substituted $(C_1-C_{19})$ hetero-alkyl, an optionally substituted $(C_1-C_{20})$alkenyl, an optionally substituted $(C_1-C_{19})$hetero-alkenyl, an optionally substituted $(C_1-C_{20})$alkynyl, an optionally substituted $(C_1-C_{19})$ hetero-alkynyl, optionally substituted aryl, optionally substituted $(C_5-C_8)$cycloalkyl, optionally substituted $(C_5-C_8)$cycloalkenyl, optionally substituted heterocycle, and optionally substituted mixed ring system. In a further embodiment, the plurality of bis-or tri-silyl ether crosslinkers and/or bis or tri-silyl halide crosslinkers comprise the structure of:

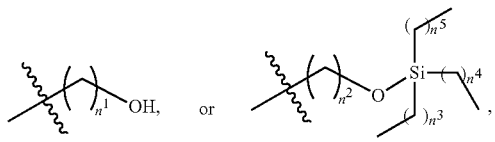

wherein, $X^1$ is selected from the group consisting of:

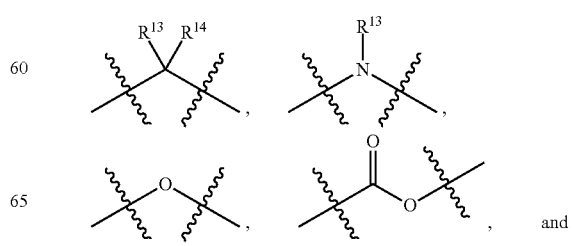

and

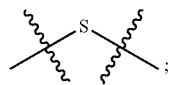

$X^2$ is selected from the group consisting of:

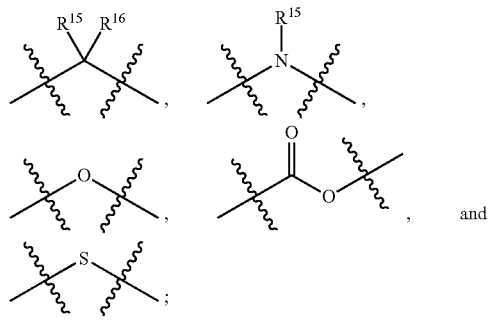

$R^1$-$R^6$ are each individually selected from a halo, a ($C_1$-$C_3$) alkyl, or a —O—($C_1$-$C_3$) alkyl, and wherein at least one of $R^1$-$R^3$ is a —O—($C_1$-$C_3$)alkyl or a halo, and wherein at least one of $R^4$-$R^6$ is a —O—($C_1$-$C_3$)alkyl or a halo; and $R^7$-$R^{16}$ are each individually selected from the group consisting of H, D, an optionally substituted ($C_1$-$C_8$)alkyl, an optionally substituted ($C_1$-$C_7$)hetero-alkyl, an optionally substituted ($C_1$-$C_8$)alkenyl, an optionally substituted ($C_1$-$C_7$)hetero-alkenyl, an optionally substituted ($C_1$-$C_8$)alkynyl, an optionally substituted ($C_1$-$C_7$)hetero-alkynyl, optionally substituted aryl, optionally substituted ($C_5$-$C_8$)cycloalkyl, optionally substituted ($C_5$-$C_8$)cycloalkenyl, optionally substituted heterocycle, optionally substituted mixed ring system, halo, hydroxyl, amino, nitro, azide, cyanate, isocyanate, nitrile, isonitrile, nitro, ($C_1$-$C_7$)ketone, ($C_1$-$C_7$)aldehyde, ($C_1$-$C_7$) silyl ether, ($C_1$-$C_7$)silyl halide, and ($C_1$-$C_7$)ester; and $n^6$-$n^8$ are integers and are each independently selected from the group consisting of 0, 1, 2, 3, 4, 5, 6, 7, 8, 9, and 10. In yet another embodiment, the plurality of bis-silyl ether crosslinkers and/or bis-silyl halide crosslinkers comprise the structure of:

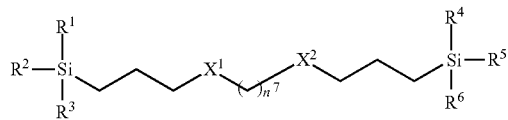

wherein, $X^1$ is selected from the group consisting of:

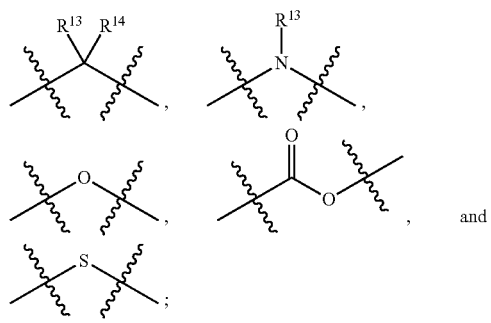

$X^2$ is selected from the group consisting of:

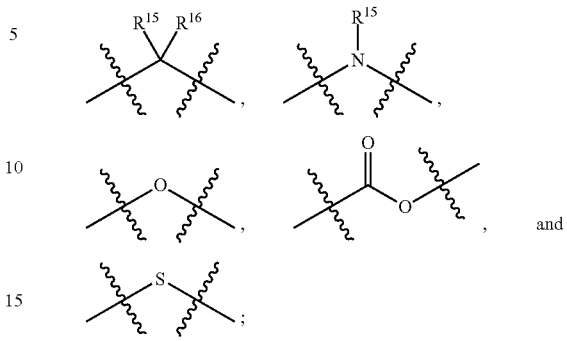

$R^1$-$R^6$ are each individually selected from a halo, a ($C_1$-$C_3$) alkyl, or a —O—($C_1$-$C_3$)alkyl, and wherein at least one of $R^1$-$R^3$ is a —O—($C_1$-$C_3$)alkyl or a halo, and wherein at least one of $R^4$-$R^6$ is a —O—($C_1$-$C_3$) alkyl or a halo; and $R^{13}$-$R^{16}$ are each individually selected from the group consisting of H, D, and an optionally substituted ($C_1$-$C_8$)alkyl; and $n^7$ is an integer selected from the group consisting of 0, 1, 2, 3, 4, 5, 6, 7, 8, 9, and 10. In yet a further embodiment, the plurality of bis-silyl ether crosslinkers and/or bis-silyl halide crosslinkers comprises one or more structures selected from the group consisting of:

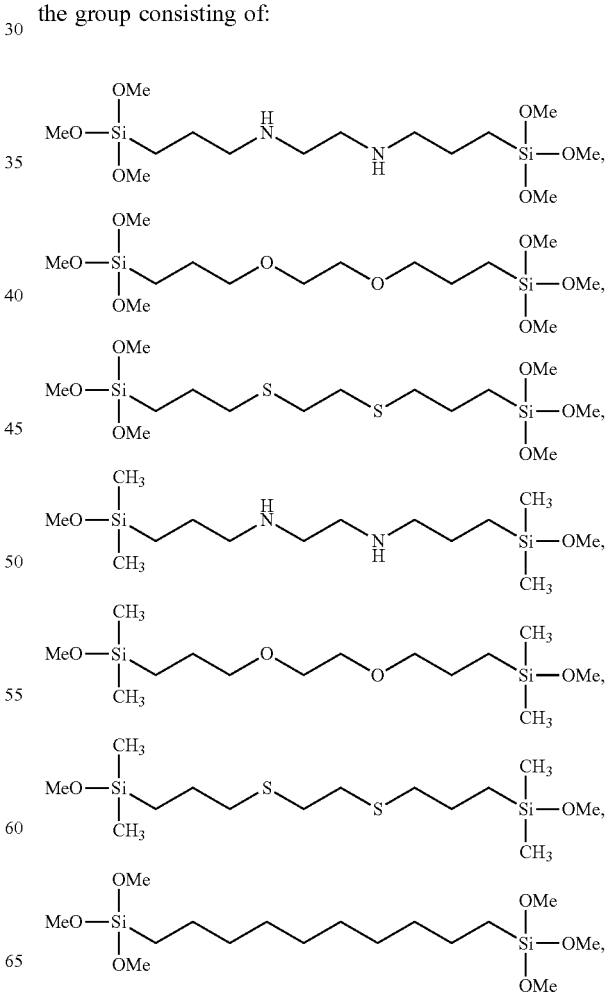

-continued

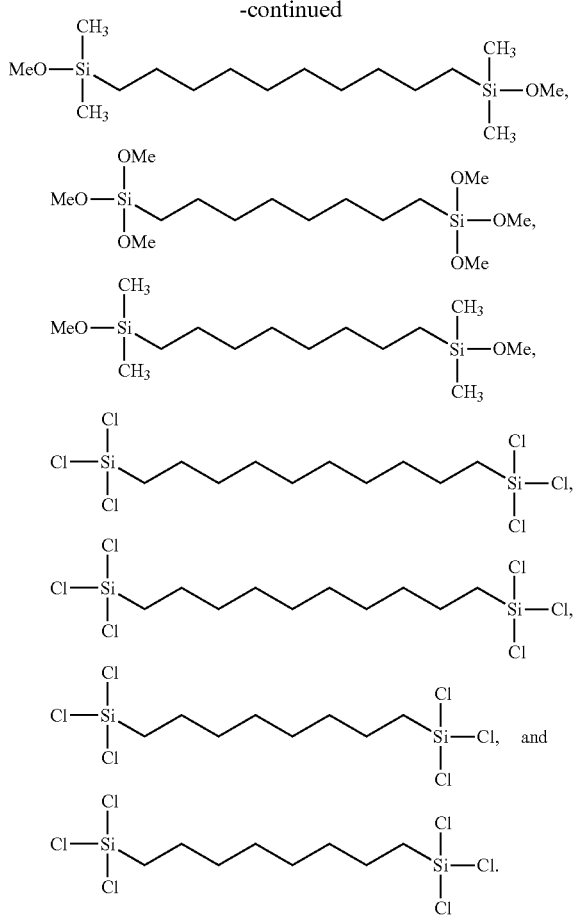

In yet another embodiment, plurality of bis-silyl ether cross-linkers and/or bis-silyl halide crosslinkers comprise the structure of:

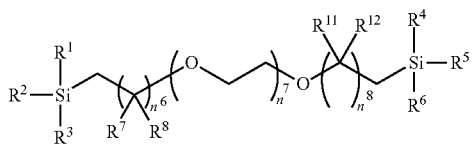

wherein, $R^1$-$R^6$ are each individually selected from a halo, a ($C_1$-$C_3$)alkyl, or a —O—($C_1$-$C_3$)alkyl, and wherein at least one of $R^1$-$R^3$ is a —O—($C_1$-$C_3$)alkyl or a halo, and wherein at least one of $R^4$-$R^6$ is a —O—($C_1$-$C_3$)alkyl or a halo; and $R^7$, $R^8$, $R^{11}$ and $R^{12}$ are each individually selected from the group consisting of H, D, an optionally substituted ($C_1$-$C_8$) alkyl, an optionally substituted ($C_1$-$C_7$)hetero-alkyl, an optionally substituted ($C_1$-$C_8$)alkenyl, an optionally substituted ($C_1$-$C_7$)hetero-alkenyl, an optionally substituted ($C_1$-$C_8$)alkynyl, an optionally substituted ($C_1$-$C_7$)hetero-alkynyl, optionally substituted aryl, optionally substituted ($C_5$-$C_8$) cycloalkyl, optionally substituted ($C_5$-$C_8$)cycloalkenyl, optionally substituted heterocycle, optionally substituted mixed ring system, halo, hydroxyl, amino, nitro, azide, cyanate, isocyanate, nitrile, isonitrile, nitro, ($C_1$-$C_7$)ketone, ($C_1$-$C_7$)aldehyde, ($C_1$-$C_7$)silyl ether, and ($C_1$-$C_7$)ester; and $n^6$-$n^8$ are integers and are each independently selected from the group consisting of 0, 1, 2, 3, 4, 5, 6, 7, 8, 9, and 10.

In a particular embodiment, the disclosure provides for a dynamic polymer that exhibits one or more of the following features: (i) the dynamic polymer does not exhibit any significant thermal degradation at temperatures up to 300° C.; (ii) the dynamic polymer has a topology-freezing transition temperature ($T_v$) that is lower than the glass transition temperature ($T_g$); and/or (iii) the $T_v$ of the dynamic polymer and/or the material reprocessing temperature of the dynamic polymer is autocatalytically controlled.

In a certain embodiment, the disclosure also provides for a reprocessable composite comprising a dynamic polymer of the disclosure.

In a particular embodiment, the disclosure provides a method of making the dynamic polymer of the disclosure using free hydroxyls comprising: polymerizing a first portion of monomers that do not comprise pendant hydroxyl groups with a second portion of monomers that comprise pendant hydroxyl groups in an organic solvent system by adding a radical initiator at an elevated temperature to form polymer chains; crosslinking the polymer chains by heating a reaction mixture comprising bis-silyl ether crosslinkers and the polymer chains in organic solvent system at two elevated temperatures. In an alternate embodiment, the disclosure provides a method of making a dynamic polymer disclosed herein using cross silyl ether metathesis comprising: polymerizing a first portion of monomers that do not comprise pendant silyl ether groups with a second portion of monomers that comprise pendant silyl ether groups in an organic solvent system by adding a radical initiator at an elevated temperature to form polymer chains; and crosslinking the polymer chains by heating a reaction mixture comprising an acid catalyst, bis-silyl ether crosslinkers, and the polymer chains in organic solvent system at an elevated temperature.

DESCRIPTION OF DRAWINGS

FIG. 5A-B presents Arrhenius plots. (A) Reaction of 1. (B) Reaction of 2.

FIG. 6 presents a $^1$H NMR of poly(styrene-co-styrene-OH).

FIG. 7 presents a GPC trace of poly(styrene-co-styrene-OH).

FIG. 8A-B provides the stress relaxation tests of (A) PS-Bis-γ-NH and (B) PS-Bis-C10.

FIG. 9 provides Arrhenius plots of the measured relaxation times for PS-Bis-C10 and PS-Bis-γ-NH.

FIG. 10A-B presents TGA for crosslinked polymer samples (A) PS-Bis-γ-NH and (B) PS-Bis-C10.

FIG. 11A-B provides isothermal TGA measurements of (A) PS-Bis-γ-NH at 160° C. and (B) PS-Bis-C10 at 190° C.

FIG. 12A-B presents differential scanning calorimetry (DSC) thermograms for PS-Bis-γ-NH (A) and PS-Bis-C10 (B).

FIG. 13A-B presents the results of dynamical-mechanical thermal analysis (DMTA) experiments PS-Bis-γ-NH (A) and PS-Bis-C10 (B).

FIG. 14 shows the temperature dependence of viscosity for PS-Bis-γ-NH.

FIG. 18 presents multiple embodiments of dynamic covalent chemistries for silyl ether exchange that can be used to make silyl ether-based dynamic polymers.

FIG. 20A-D provides the results of the metathesis reaction using silyl ether (a) and (b) and various temperatures and the acid catalysts: Zn(OTf)$_2$ (A), Sc(OTf)$_2$ (B), camphor sulfonic acid (C), and cyclohexanecarboxylic acid (D).

FIG. 21A-B provides the results of experiments looking at the use of various amounts of catalyst and cross-linker. (A) The amount of camphor sulfonic acid catalyst was held constant at 0.25 mol % (with respect to total repeat units) and the amount of cross-linker was varied between 1-5 mol % (with respect to total repeat units). (B) The amount of the cross-linker was held constant at 2.5 mol % (with respect to total repeat units) and the amount of the camphor sulfonic acid catalyst was used at 0.5 mol % or 1 mol % (with respect to total repeat units).

DETAILED DESCRIPTION

Figure 1:
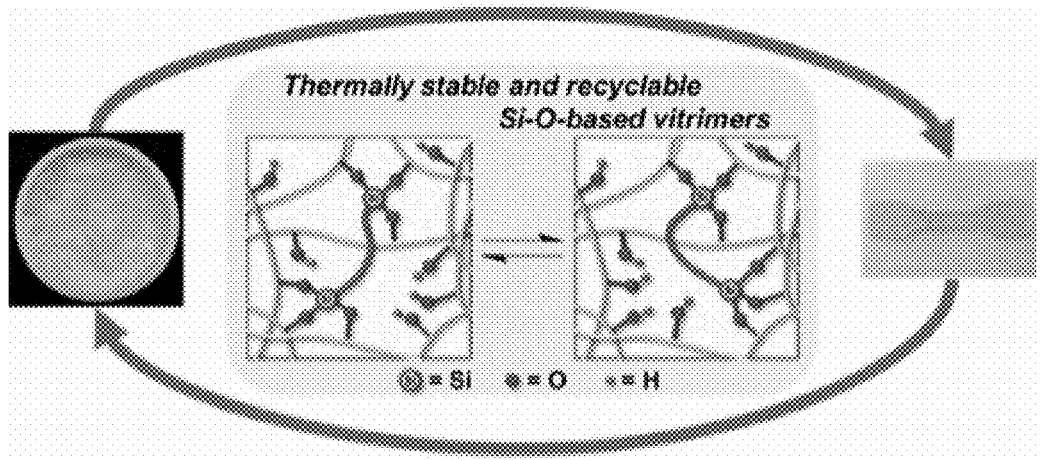
FIG. 1 presents a diagram and photo demonstrating that the silyl ether linkage is a dynamic covalent motif for generating thermally stable and recyclable Si—O-based vitrimers. By incorporating silyl ether linkages into covalently cross-linked polymer networks, dynamic covalent network polymers displaying both malleability and reprocessability were demonstrated.

As used herein and in the appended claims, the singular forms "a," "an," and "the" include plural referents unless the context clearly dictates otherwise. Thus, for example, reference to "a dynamic polymer" includes a plurality of such dynamic polymers and reference to "the silyl ether" includes reference to one or more silyl ethers and equivalents thereof known to those skilled in the art, and so forth.

Unless defined otherwise, all technical and scientific terms used herein have the same meaning as commonly understood to one of ordinary skill in the art to which this disclosure belongs. Although many methods and reagents are similar or equivalent to those described herein, the exemplary methods and materials are presented herein.

All publications mentioned herein are incorporated by reference in full for the purpose of describing and disclosing methodologies that might be used in connection with the description herein. Moreover, with respect to any term that is presented in one or more publications that is similar to, or identical with, a term that has been expressly defined in this disclosure, the definition of the term as expressly provided in this disclosure will control in all respects.

A bond indicated by a dashed line indicates a bond that may be a single covalent bond or alternatively absent, thus the R group may also be absent.

The term "alkyl", refers to an organic group that is comprised of carbon and hydrogen atoms that contain single covalent bonds between carbons. Typically, an "alkyl" as used in this disclosure, refers to an organic group that contains 1 to 30 carbon atoms, unless stated otherwise. Where if there is more than 1 carbon, the carbons may be connected in a linear manner, or alternatively if there are more than 2 carbons then the carbons may also be linked in a branched fashion so that the parent chain contains one or more secondary, tertiary, or quaternary carbons. An alkyl may be substituted or unsubstituted (i.e., optionally substituted), unless stated otherwise. Examples of substitutions for alkyls include, but are not limited, to halos, hydroxyls, anhydrides, carbonyls, carboxyls, carbonates, carboxylates, aldehydes, haloformyls, esters, hydroperoxy, peroxy, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, and silyl ethers.

The term "acrylate monomer", refers to a monomer that is used to form an acrylate polymer. "Acrylate monomers" are based on the structure of acrylic acid or is a derivative thereof. Examples of "acrylate monomers" include, but are not limited to, methacrylates (e.g., methylmethacrylate (MMA)), methyl acrylate, ethyl acrylate, 2-chloroethyl vinyl ether, 2-ethylhexyl acrylate, hydroxyethyl methacrylate, butyl acrylate, butyl methacrylate, and trimethylolpropane triacrylate (TMPTA). In a particular embodiment, the acrylate monomer comprises or further comprises a pendant hydroxyl group or a pendant silyl ether group.

The term "alkenyl", refers to an organic group that is comprised of carbon and hydrogen atoms that contains at least one double covalent bond between two carbons. Typically, an "alkenyl" as used in this disclosure, refers to organic group that contains 2 to 30 carbon atoms, unless stated otherwise. While a C$_2$-alkenyl can form a double bond, an alkenyl group of three or more carbons can contain more than one double bond. It certain instances the alkenyl group will be conjugated, in other cases an alkenyl group will not be conjugated, and yet other cases the alkenyl group may have stretches of conjugation and stretches of nonconjugation. Additionally, if there are more than 2 carbons, the carbon atoms may be connected in a linear manner, or alternatively if there are more than 3 carbon atoms then the carbons may also be linked in a branched fashion so that the parent chain contains one or more secondary, tertiary, or quaternary carbons. An alkenyl may be substituted or unsubstituted (i.e., optionally substituted), unless stated otherwise. Examples of substitutions for alkenyls include, but are not limited, to halos, hydroxyls, anhydrides, carbonyls, carboxyls, carbonates, carboxylates, aldehydes, haloformyls, esters, hydroperoxy, peroxy, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, and silyl ethers.

The term "alkynyl", refers to an organic group that is comprised of carbon and hydrogen atoms that contains a triple covalent bond between two carbons. Typically, an "alkynyl" as used in this disclosure, refers to organic group that contains 2 to 30 carbon atoms, unless stated otherwise. While a $C_2$ alkynyl can form a triple bond, an alkynyl group of three or more carbons can contain more than one triple bond. Where if there are more than 2 carbon atoms, the carbons may be connected in a linear manner, or alternatively if there are more than 4 carbon atoms then the carbon atoms may also be linked in a branched fashion so that the parent chain contains one or more secondary, tertiary, or quaternary carbons. An alkynyl may be substituted or unsubstituted (i.e., optionally substituted), unless stated otherwise. Examples of substitutions for alkynyls include, but are not limited, to halos, hydroxyls, anhydrides, carbonyls, carboxyls, carbonates, carboxylates, aldehydes, haloformyls, esters, hydroperoxy, peroxy, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, and silyl ethers.

The term "amine monomer", refers to a monomer that is used to form a polyamide, a polyimide, or a polyurea polymer. "Amine monomers" can be polymerized into a chain and comprise a primary, secondary or tertiary amine. Examples of "amine monomers" include, but are not limited to, allylamine, diethylenetriamine, triethylenetetramine, tetraethylenepentamine, pentaethylenehexamine, and aziridine. In a particular embodiment, the "amine monomer" comprises or further comprises a pendant hydroxyl group or a pendant silyl ether group.

The term "aryl", as used in this disclosure, refers to a conjugated planar ring system with delocalized pi electron clouds that contain only carbon as ring atoms. An "aryl" for the purposes of this disclosure encompass from 1 to 12 aryl rings wherein when the aryl is greater than 1 ring the aryl rings are joined so that they are linked, fused, or a combination thereof. An aryl may be substituted or unsubstituted (i.e., optionally substituted), or in the case of more than one aryl ring, one or more rings may be unsubstituted, one or more rings may be substituted, or a combination thereof. Examples of substitutions for aryls include, but are not limited, to halos, hydroxyls, anhydrides, carbonyls, carboxyls, carbonates, carboxylates, aldehydes, haloformyls, esters, hydroperoxy, peroxy, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, and silyl ethers.

The term "cycloalkyl", as used in this disclosure, refers to an alkyl that contains at least 3 carbon atoms but no more than 12 carbon atoms connected so that it forms a ring. A "cycloalkyl" for the purposes of this disclosure encompass from 1 to 12 cycloalkyl rings, wherein when the cycloalkyl is greater than 1 ring, then the cycloalkyl rings are joined so that they are linked, fused, or a combination thereof. A cycloalkyl may be substituted or unsubstituted (i.e., optionally substituted), or in the case of more than one cycloalkyl ring, one or more rings may be unsubstituted, one or more rings may be substituted, or a combination thereof. Examples of substitutions for cycloalkyls include, but are not limited, to halos, hydroxyls, anhydrides, carbonyls, carboxyls, carbonates, carboxylates, aldehydes, haloformyls, esters, hydroperoxy, peroxy, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, and silyl ethers.

The term "cycloalkenyl", as used in this disclosure, refers to an alkene that contains at least 4 carbon atoms but no more than 12 carbon atoms connected so that it forms a ring. A "cycloalkenyl" for the purposes of this disclosure encompass from 1 to 12 cycloalkenyl rings, wherein when the cycloalkenyl is greater than 1 ring, then the cycloalkenyl rings are joined so that they are linked, fused, or a combination thereof. A cycloalkenyl may be substituted or unsubstituted (i.e., optionally substituted), or in the case of more than one cycloalkyl ring, one or more rings may be unsubstituted, one or more rings may be substituted, or a combination thereof. Examples of substitutions for cycloalkenyls include, but are not limited, to halos, hydroxyls, anhydrides, carbonyls, carboxyls, carbonates, carboxylates, aldehydes, haloformyls, esters, hydroperoxy, peroxy, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, and silyl ethers.

The term "heterocycle", as used in this disclosure, refers to ring structures that contain at least 1 non-carbon ring atom, and typically comprise from 3 to 12 ring atoms. A "heterocycle" for the purposes of this disclosure encompass from 1 to 12 heterocycle rings wherein when the heterocycle is greater than 1 ring the heterocycle rings are joined so that they are linked, fused, or a combination thereof. A heterocycle may be a hetero-aryl or nonaromatic, or in the case of more than one heterocycle ring, one or more rings may be nonaromatic, one or more rings may be hetero-aryls, or a combination thereof. A heterocycle may be substituted or unsubstituted (i.e., optionally substituted), or in the case of more than one heterocycle ring one or more rings may be unsubstituted, one or more rings may be substituted, or a combination thereof. Examples of substitutions for heterocycles include, but are not limited, to halos, hydroxyls, anhydrides, carbonyls, carboxyls, carbonates, carboxylates, aldehydes, haloformyls, esters, hydroperoxy, peroxy, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, and silyl ethers. Typically, the non-carbon ring atom is N, O, S, Si, Al, B, or P. In case where there is more than one non-carbon ring atom, these non-carbon ring atoms can either be the same element, or combination of different elements, such as N and O. Examples of heterocycles include, but are not limited to: a monocyclic heterocycle such as, aziridine, oxirane, thiirane, azetidine, oxetane, thietane, pyrrolidine, pyrroline, imidazolidine, pyrazolidine, pyrazoline, dioxolane, sulfolane 2,3-dihydrofuran, 2,5-dihydrofuran tetrahydrofuran, thiophane, piperidine, 1,2,3,6-tetrahydro-pyridine, piperazine, morpholine, thiomorpholine, pyran, thiopyran, 2,3-dihydropyran, tetrahydropyran, 1,4-dihydropyridine, 1,4-dioxane, 1,3-dioxane, dioxane, homopiperidine, 2,3,4,7-tetrahydro-1H-azepine homopiperazine, 1,3-dioxepane, 4,7-dihydro-1,3-dioxepin, and hexamethylene oxide; and polycyclic heterocycles such as, indole, indoline, isoindoline, quinoline, tetrahydroquinoline, isoquinoline, tetrahydroisoquinoline, 1,4-benzodioxan, coumarin, dihydrocoumarin, benzofuran, 2,3-dihydrobenzofuran, isobenzofuran, chromene, chroman, isochroman, xanthene, phenoxathiin, thianthrene, indolizine, isoindole, indazole, purine, phthalazine, naphthyridine, quinoxaline, quinazoline, cinnoline, pteridine, phenanthridine, perimidine, phenanthroline, phenazine, phenothiazine, phenoxazine, 1,2-benzisoxazole, benzothiophene, benzoxazole, benzthiazole, benzimidazole, benztriazole, thioxanthine, carbazole, carboline, acridine, pyrolizidine, and quinolizidine. In addition to the polycyclic heterocycles described above, heterocycle includes polycyclic heterocycles wherein the ring fusion between two or more rings includes more than one bond common to both rings and more than two atoms common to both rings. Examples of such bridged heterocycles include quinuclidine, diazabicyclo[2.2.1]heptane and 7-oxabicyclo[2.2.1]heptane.

The terms "heterocyclic group", "heterocyclic moiety", "heterocyclic", or "heterocyclo" used alone or as a suffix or prefix, refers to a heterocycle that has had one or more hydrogens removed therefrom.

The term "hetero-aryl" used alone or as a suffix or prefix, refers to a heterocycle or heterocyclyl having aromatic character. Examples of heteroaryls include, but are not limited to, pyridine, pyrazine, pyrimidine, pyridazine, thiophene, furan, furazan, pyrrole, imidazole, thiazole, oxazole, pyrazole, isothiazole, isoxazole, 1,2,3-triazole, tetrazole, 1,2,3-thiadiazole, 1,2,3-oxadiazole, 1,2,4-triazole, 1,2,4-thiadiazole, 1,2,4-oxadiazole, 1,3,4-triazole, 1,3,4-thiadiazole, and 1,3,4-oxadiazole.

The term "hetero-" when used as a prefix, such as, hetero-alkyl, hetero-alkenyl, hetero-alkynyl, or hetero-hydrocarbon, for the purpose of this disclosure refers to the specified hydrocarbon having one or more carbon atoms replaced by non-carbon atoms as part of the parent chain. Examples of such non-carbon atoms include, but are not limited to, N, O, S, Si, Al, B, and P. If there is more than one non-carbon atom in the hetero-based parent chain then this atom may be the same element or may be a combination of different elements, such as N and O.

The term "mixed ring system" refers to optionally substituted ring structures that contain at least two rings, and wherein the rings are joined together by linking, fusing, or a combination thereof. A mixed ring system comprises a combination of different ring types, including cycloalkyl, cycloalkenyl, aryl, and heterocycle.

The term "optionally substituted" with respect to hydrocarbons, heterocycles, and the like, refers to structures that may be substituted, or alternatively be unsubstituted. Examples of optional substitutions include, but are not limited, to halos, hydroxyls, anhydrides, carbonyls, carboxyls, carbonates, carboxylates, aldehydes, haloformyls, esters, hydroperoxy, peroxy, ethers, orthoesters, carboxamides, amines, imines, imides, azides, azos, cyanates, isocyanates, nitrates, nitriles, isonitriles, nitrosos, nitros, nitrosooxy, pyridyls, sulfhydryls, sulfides, disulfides, sulfinyls, sulfos, thiocyanates, isothiocyanates, carbonothioyls, phosphinos, phosphonos, phosphates, and silyl ethers.

The term "pendant" when used in reference to a functional group (e.g., a "pendant" hydroxyl) refers to a functional group that extends or is bound to small carbon chain that extends from the main polymer chain. A "pendant" functional group is not involved with bonds that specifically connect the monomers together to form a polymer but is accessible (i.e., not sterically hindered) to being bound by crosslinking reagents (e.g., a bis-silyl ether).

The term "styrene monomer", refers to a monomer that is used to form a polystyrene polymer. "Styrene monomers" comprise a vinylbenzene that can be polymerized into a chain. Examples of "styrene monomers" include, but are not limited to, styrene, bromostyrene, chlorostyrene, fluorostyrene, nitrostyrene, methylstyrene, vinylbiphenyl, vinylnapthalene, vinylaniline, vinylanisole, and methoxystyrene. In a particular embodiment, the "styrene monomer" comprises or further comprises a pendant hydroxyl group or a pendant silyl ether group.

The term "substituted" with respect to hydrocarbons, heterocycles, and the like, refers to structures wherein hydrogen atoms have been replaced by a substituent.

The term "substituent" refers to an atom or group of atoms substituted in place of a hydrogen atom. For purposes of this disclosure, a substituent would include deuterium atoms.

The term "unsubstituted" with respect to hydrocarbons, heterocycles, and the like, refers to structures wherein the parent chain comprises no substituents.

The term "vinyl monomer", refers to a monomer that is used to form a polyvinyl polymer. "Vinyl monomers" are comprised of a vinyl group that can be polymerized into a chain. Typically, vinyl monomers undergo homopolymerization via a radical mechanism. Examples of "vinyl monomers" include, but are not limited to, ethylene, propylene, butadiene, vinyl chloride, and acrylonitrile. In a particular embodiment, the "vinyl monomer" comprises or further comprises a pendant hydroxyl group or a pendant silyl ether group.

The term "vinyl ester monomer", refers to a monomer that is used to form a polyvinyl ester polymer. "Vinyl ester monomers" comprise a vinyl ester group that can be polymerized into a chain. Typically, vinyl ester monomers undergo homopolymerization via a radical mechanism. Examples of "vinyl ester monomers" include, but are not limited to, vinyl acetate, vinyl benzoate, vinyl chloroformate, vinyl trifluoroacetate, vinyl valerate, vinyl pivalate, and vinyl cinnamate. In a particular embodiment, the "vinyl ester monomer" comprises or further comprises a pendant hydroxyl group or a pendant silyl ether group.

The recent trend in materials chemistry towards bottom-up materials design based on small molecule dynamics has allowed researchers to introduce remarkable macroscopic responses to bulk materials such as self-healing, shape-memory, and malleability. In particular, dynamic exchangeable crosslinks have been incorporated into covalent networks to introduce plasticity and make them adaptive and malleable. Such networks were termed as covalent adaptive networks (CANs). The concept of CANs has recently been extended to organic network materials with glass-like flow properties called vitrimers. These materials combine mechanical robustness and creep resistance at service conditions, while displaying the plasticity and/or re-processability of thermoplastics upon photo or thermal triggers. Importantly, the associative CANs or vitrimers retain their cross-linking density at all times due to their associative exchange mechanisms, and thus enjoy the solvent resistance associated with thermosets.

Several dynamic covalent motifs have thus far been incorporated into polymer networks to affect this property. The first reported associative CANs were based on photo-mediated radical addition fragmentation chain transfer reactions by using allyl sulfide moieties, which was further applied to other CANs by using different radical generators with trithiocarbonates. More recently, transition metal catalyzed trans-esterification was successfully used in the design of several vitrimer systems. Other dynamic covalent motifs reported thus far for vitrimers include olefin cross metathesis, thiol-disulfide exchange, trans-animation, trans-imination, trans-carbamoylation, trans-alkylation, boronic ester exchange, thiol-ene chemistry and poly(alkylurea-urethane). Surprisingly, silyl ether exchange, the dynamic chemistry which gives glass itself its fluidity at elevated temperatures—and hence 'vitrimer' its name—has not yet been employed in a vitrimeric material.

In certain embodiments presented herein, the disclosure provides for dynamic polymers which are silyl ether-based dynamic polymers that have versatility in both material and chemical properties (see FIG. 1). The scope of material properties of the dynamic polymers disclosed herein is extensive, ranging from polydimethylsiloxanes (PDMS), among the softest of rubbers, to inorganic glass, an extremely strong and hard material. Additionally, it was further found herein that the exchange dynamics of silyl ether-based dynamic polymers of the disclosure can be varied over a wide window based on a neighboring group effects (e.g., effects from neighboring amino groups, hydroxyl groups, ether groups, ester groups, and sulfide groups). It was found that variability in molecular exchange kinetics in synthesizing the dynamic polymers directly translated into variability for the bulk dynamic properties of the polymers. The high chemical stability of silyl ether linkages also makes it a desirable motif for the design of mechanically strong dynamic materials.

The disclosure provides for dynamic polymers that exhibit vitrimer-like properties. The dynamic polymers are composed of innovative dynamic motifs that use silyl ether exchange chemistry. The dynamic polymers of the disclosure are one of the few examples of materials that exhibit the properties of a vitrimer without the use of transition metal catalyst. Notably, presented herein is the first example of autocatalytic control of the vitrimer topology freezing temperature ($T_v$). Furthermore, the experimental observation of a transition from Williams-Landel-Ferry model (WLF) behavior to Arrhenius behavior for the temperature dependence of the viscosity for the dynamic polymers is also unique. For example, it was found that a dynamic polymer disclosed herein exhibited a $T_v$ (47° C.)<<$T_g$ (125° C.). In the experiments presented herein the dynamic polymer did not exhibit any significant thermal degradation at temperatures up to 300° C. Further, it was found that the $T_v$ of the dynamic polymer and the material reprocessing temperature of the dynamic polymer were autocatalytically controlled. Thus, the disclosure provides direct support for both the theory of topology freezing through molecular kinetic arrest of vitrimers, as well as the mechanism of fluidity for the system. The tunable exchange dynamics coupled with the high thermal stability and recyclability of the silyl ether-based dynamic polymers disclosed herein allows for broad applications for this family of dynamic polymers. Moreover, the methods and findings presented herein, demonstrate that the dynamic properties of other silicon-based materials such as silicon oils, silicon rubbers, silica, glass, etc can also be controlled.

In a particular embodiment, the disclosure provides for dynamic malleable and self-healing polymers comprising one or more polymer chains that are reversibly and covalently cross-linked by a plurality of bis-, tri-, tetra- or multi-silyl ether crosslinkers and/or bis-, tri-, tetra- or multi-silyl halide crosslinkers. The bis-, tri-, tetra- or multi-silyl ether and/or bis-, tri-, tetra- or multi-silyl halide crosslinkers can be used to crosslink most if not all types of organic and/or inorganic polymer chains including, but not limited to, those polymer chains made from polymerizing acrylic monomers, alcohol monomers, allyl monomers, anhydride monomers, biodegradable polymer monomers, bisphenol and sulfonyldiphenol monomers, carboxylic acid monomers, epoxide monomers, isocyanate monomers, norbornene monomers, silicone monomers, styrene monomers, vinyl ester monomers, vinyl ether monomers, and vinyl monomers. In a particular embodiment, the bis-, tri-, tetra- or multi-silyl ether and/or bis-, tri-, tetra- or multi-silyl halide crosslinkers can be used to crosslink polymer chain made from polymerizing vinyl monomers, styrene monomers, vinyl ester monomers, amine monomers, or acrylate monomers. The silyl ether exchange reactions are particularly amendable to crosslinking polymer chains which comprise pendent hydroxyl groups or pendant silyl ether groups. It should be noted that various polymer monomers can be purchased from various vendors, such as Sigma-Aldrich, TCI America, Alfa Aesar, etc., where the monomer comprises pendant hydroxyl groups. Moreover, as shown in the Examples section presented herein, the functionalization of polymer monomers with pendant hydroxyl or pendant silyl ether groups can readily be carried out using standard chemical reactions using standard chemical reaction mechanisms, such as addition reactions, elimination reactions, substitution reactions, pericyclic reactions, rearrangement reactions, photochemical reactions and redox reactions. In a particular embodiment, the disclosure provides for crosslinking the chains of polystyrene, poly(methyl methacrylate) PMMA, poly(methyl acrylate), polyvinyl chloride, polypropylene or polyethylene together by using silyl exchange reactions with bis-, tri-, tetra- or multi-silyl ether crosslinking reagents and/or bis-, tri-, tetra- or multi-silyl halide crosslinking reagents.

The dynamic polymers disclosed herein typically comprise multiple portions or types of monomers that differ by structure, which are then joined together in a polymerization reaction. In a particular embodiment, the dynamic polymers disclosed herein are comprised of (i) a first portion of monomers that do not comprise pendant hydroxyl groups or pendant silyl ether groups, and (ii) a second portion of monomers that comprise pendant hydroxyl groups or pendant silyl ether groups. Additionally, the dynamic polymers may comprise additional portions or types of monomers, e.g., (iii) a third portion of monomers, (iv) a fourth portion of monomers, (V) . . . (VI) . . . etc., whereby all monomer portions differ based upon the monomer's structure. Moreover, the dynamic polymers disclosed herein can be comprised of equal or unequal amounts of the different types or portions of monomers. For example, the dynamic polymers may comprise a ratio of a first portion of monomers to a second portion of monomers of 1:100 to 100:1, 1:80 to 80:1, 1:70 to 70:1, 1:60 to 60:1, 1:50 to 50:1, 1:40 to 40:1, 1:30 to 30:1, 1:20 to 20:1, 1:15 to 15:1, 1:10 to 10:1, 1:9 to 9:1, 1:8 to 8:1, 1:7 to 7:1, 1:6 to 6:1, 1:5 to 5:1, 1:4 to 4:1, 1:3 to 3:1, 1:2 to 2:1, or 1:1. As indicated above, the bis-, tri-, tetra- or multi-silyl ether and/or -silyl halide crosslinkers disclosed herein can be used to crosslink many types of polymer chains including those polymer chains made from polymerizing vinyl monomers, styrene monomers, vinyl ester monomers, amine monomers, and acrylate monomers.

In a particular embodiment, the disclosure provides for dynamic polymers which are comprised of two or more portions or types of styrene monomers that have been connected together to form a polymer, wherein a first portion of the styrene monomers comprises the structure of:

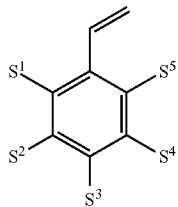

wherein,
S$^1$-S$^5$ are each independently selected from H, halo, nitro, (C$_1$-C$_4$)alkyl, (C$_1$-C$_3$)alkoxy, (C$_1$-C$_2$)alkyl halide, and amino;
and wherein a second portion of the styrene monomers comprise the structure of:

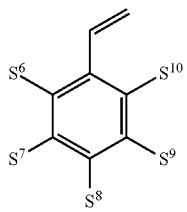

wherein,
S$^6$-S$^{10}$ are each independently selected from H, halo, nitro, (C$_1$-C$_4$)alkyl, (C$_1$-C$_3$)alkoxy, (C$_1$-C$_2$)alkyl halide, amino,

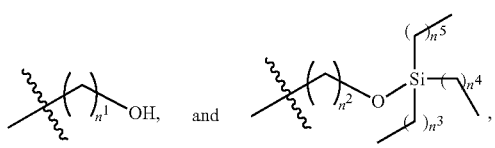

n$^1$-n$^5$ are integers and are each independently selected from 0, 1, 2, 3, 4, 5 and 6,
wherein one of S$^6$-S$^{10}$ is

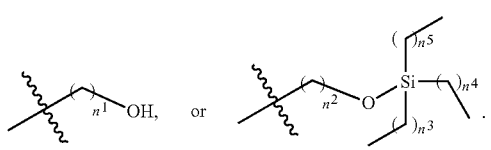

In a further embodiment, n$^1$-n$^5$ are 0 or 1.
In a further embodiment, the disclosure provides for dynamic polymers which are comprised of two or more portions or types of styrene monomers that have been connected together to form a polymer, wherein a first portion of the styrene monomers comprises the structure of:

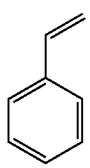

and wherein the second portion of styrene monomers comprises the structure of:

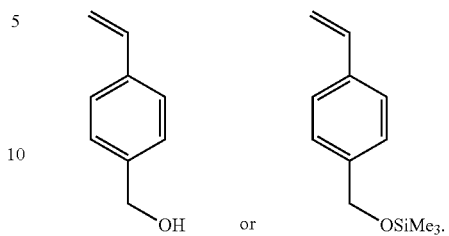

In another embodiment, the disclosure provides for dynamic polymers which are comprised of two or more portions or types of acrylic monomers that have been connected together to form a polymer, wherein a first portion of the acrylic monomers comprise the structure of:

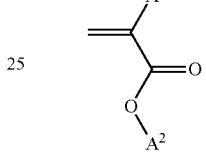

wherein,
A$^1$ is selected from H, methyl, (C$_1$-C$_3$)alkoxy, (C$_1$-C$_3$) ester, (C$_1$-C$_2$)alkyl halide, and amide,
A$^2$ is selected from a (C$_1$-C$_3$)alkoxy or an optionally substituted (C$_1$-C$_4$)alkyl, wherein the alkyl is optionally substituted with an amino group, carboxy group, or one or more halide(s); and
wherein a second portion of the acrylic monomers comprise the structure of:

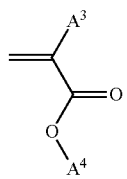

wherein,
A$^3$ is selected from H, methyl, (C$_1$-C$_3$)alkoxy, (C$_1$-C$_3$) ester, (C$_1$-C$_2$)alkyl halide, and amide,
A$^4$ is selected from

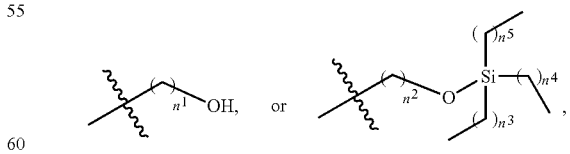

and
n$^1$-n$^5$ are integers each independently selected from the group consisting of 0, 1, 2, 3, 4, 5 and 6. In a particular, embodiment, n$^1$-n$^5$ are 0 or 1.
In yet another embodiment, the disclosure provides for dynamic polymers which are comprised of two or more portions or types of acrylic monomers that have been connected together to form a polymer, wherein a first portion of the acrylic monomers comprise the structure of:

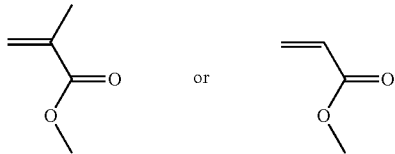

and wherein the second portion of acrylic monomers comprises a structure selected from the group consisting of:

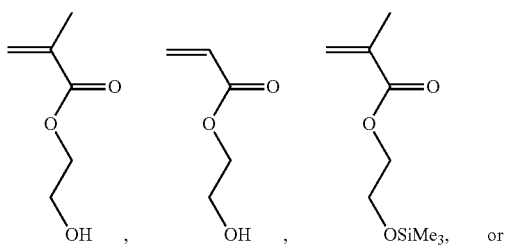

In a certain embodiment, the disclosure provides for dynamic polymers which are comprised of two or more portions or types of vinyl monomers, wherein the polymer comprises a first portion of vinyl monomers having the structure of:

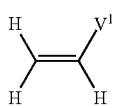

wherein, $V^1$ is selected from the group consisting of H, halo, heterocycle, nitrile, acetamide, $(C_1-C_6)$alkyl, and $(C_1-C_6)$alkoxy, wherein the polymer comprises a second portion of vinyl monomers having the structure of:

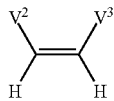

wherein, $V^2$ is selected from

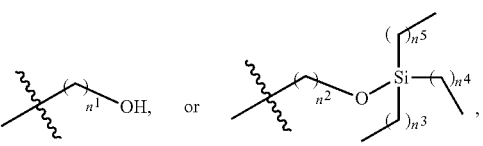

$V^3$ is selected from H, halo, heterocycle, nitrile, acetamide, $(C_1-C_6)$alkyl, and $(C_1-C_6)$alkoxy, and $n^1$-$n^5$ are integers each independently selected from the group consisting of 0, 1, 2, 3, 4, 5 and 6. In a particular, embodiment, $n^1$-$n^5$ are 0 or 1.

In a certain embodiment, the disclosure provides for dynamic polymers which are comprised of two or more portions or types of vinyl monomers, wherein the polymer comprises a first portion of vinyl monomers having a structure selected from the group consisting of:

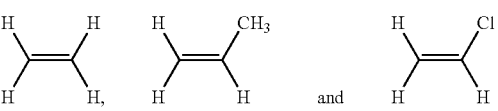

and wherein the second portion of vinyl monomers comprises a structure selected from the group consisting of:

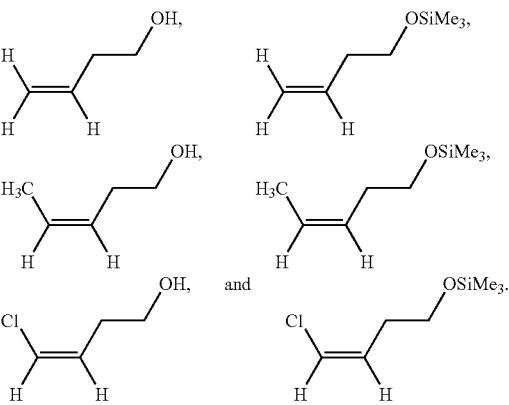

The disclosure further provides for dynamic polymers which comprise bis-, tri-, tetra-, multi-silyl ether crosslinkers and/or bis-, tri-, tetra-, multi-silyl halide crosslinkers that are used to crosslink one or more polymer chains or strands together. For purposes of this disclosure "multi" in reference to silyl ether or silyl halide, refers to 5, 6, 7, 8, 9, or 10 or more silyl ether or silyl halide groups. As indicated more fully herein, crosslinkers that comprise silyl-ether groups or silyl-halide groups that can readily participate in silyl ether exchange reactions with pendant hydroxyl groups or undergo cross metathesis reactions with other silyl ether groups. It should be further noted that one of the benefits of the silyl ether exchange reaction is that it can be performed with as little as one ether group or one halide group bound to a silicon atom of the crosslinker.

In a particular embodiment, a dynamic polymer of the disclosure comprises a plurality of bis-silyl ether crosslinkers that comprise one or more structures of:

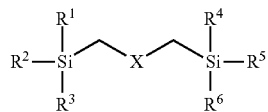

wherein, $R^1$-$R^6$ are each individually selected from a halo, a ($C_1$-$C_3$)alkyl, or a —O—($C_1$-$C_3$)alkyl, and wherein at least one of $R^1$-$R^3$ is a —O—($C_1$-$C_3$)alkyl or a halo, and wherein at least one of $R^4$-$R^6$ is a —O—($C_1$-$C_3$)alkyl or a halo; and X is selected from an optionally substituted ($C_1$-$C_{20}$) alkyl, an optionally substituted ($C_1$-$C_{19}$)hetero-alkyl, an optionally substituted ($C_1$-$C_{20}$)alkenyl, an optionally substituted ($C_1$-$C_{19}$)hetero-alkenyl, an optionally substituted ($C_1$-$C_{20}$)alkynyl, an optionally substituted ($C_1$-$C_{19}$)hetero-alkynyl, an optionally substituted aryl, an optionally substituted ($C_5$-$C_8$)cycloalkyl, an optionally substituted ($C_5$-$C_8$)cycloalkenyl, an optionally substituted heterocycle, and an optionally substituted mixed ring system. In a further embodiment, $R^1$-$R^6$ are —OMe groups.

In another embodiment, a dynamic polymer disclosed herein, comprises a plurality of bis-silyl ether crosslinkers that comprise one or more structures of:

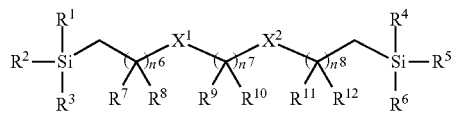

wherein, $X^1$ is selected from the group consisting of:

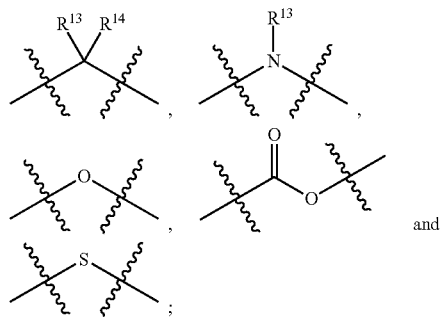

$X^2$ is selected from the group consisting of:

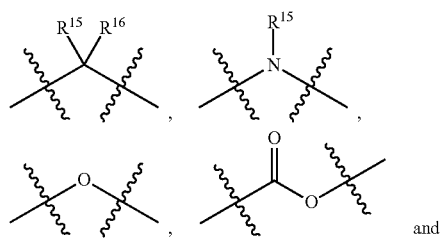

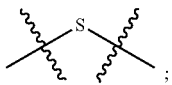

$R^1$-$R^6$ are each individually selected from a halo, a ($C_1$-$C_3$)alkyl, or a —O—($C_1$-$C_3$)alkyl, and wherein at least one of $R^1$-$R^3$ is a —O—($C_1$-$C_3$)alkyl or a halo, and wherein at least one of $R^4$-$R^6$ is a —O—($C_1$-$C_3$)alkyl or a halo; and $R^7$-$R^{16}$ are each individually selected from the group consisting of H, D, an optionally substituted ($C_1$-$C_{13}$)alkyl, an optionally substituted ($C_1$-$C_{12}$)hetero-alkyl, an optionally substituted ($C_1$-$C_{13}$)alkenyl, an optionally substituted ($C_1$-$C_{12}$)hetero-alkenyl, an optionally substituted ($C_1$-$C_{13}$)alkynyl, an optionally substituted ($C_1$-$C_{12}$)hetero-alkynyl, an optionally substituted aryl, an optionally substituted ($C_5$-$C_8$) cycloalkyl, an optionally substituted ($C_5$-$C_8$)cycloalkenyl, an optionally substituted heterocycle, an optionally substituted mixed ring system, a halo, a hydroxyl, an amino, a nitro, an azide, a cyanate, an isocyanate, a nitrile, an isonitrile, a nitro, a ($C_1$-$C_{12}$)ketone, a ($C_1$-$C_{12}$)aldehyde, a ($C_1$-$C_{12}$)silyl ether, and a ($C_1$-$C_{12}$)ester; and $n^6$-$n^8$ are integers and are each independently selected from 0, 1, 2, 3, 4, 5, 6, 7, 8, 9, and 10. In a further embodiment, $R^1$-$R^6$ are —OMe groups.

In yet another embodiment, a dynamic polymer disclosed herein, comprises a plurality of bis-silyl ether crosslinkers that comprise one or more structures of:

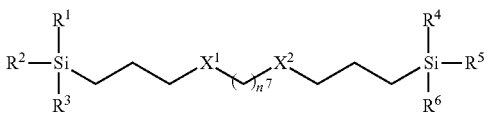

wherein, $X^1$ is selected from the group consisting of:

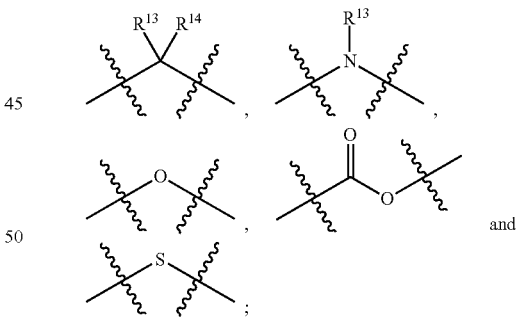

$X^2$ is selected from the group consisting of:

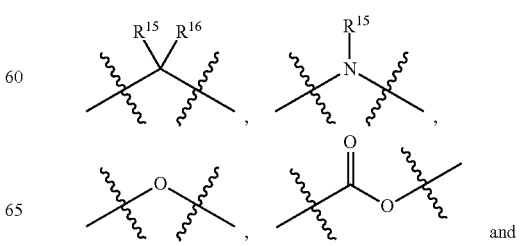

-continued

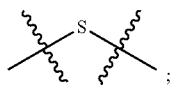;

$R^1$-$R^6$ are each individually selected from a ($C_1$-$C_3$)alkyl, or a —O—($C_1$-$C_3$)alkyl, and wherein at least one of $R^1$-$R^3$ is a —O—($C_1$-$C_3$)alkyl, and wherein at least one of $R^4$-$R^6$ is a —O—($C_1$-$C_3$)alkyl; and $R^{13}$-$R^{16}$ are each individually selected from H, D, and an optionally substituted ($C_1$-$C_8$)alkyl; and $n^7$ is an integer selected from 0, 1, 2, 3, 4, 5, 6, 7, 8, 9, and 10. In a further embodiment, $R^1$-$R^6$ are —OMe groups.

In a further embodiment, a dynamic polymer disclosed herein, comprises a plurality of bis-silyl ether crosslinkers that comprise one or more structures of:

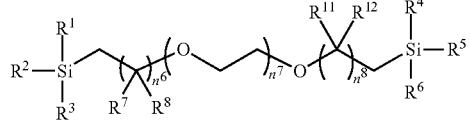

wherein, $R^1$-$R^6$ are each individually selected from a halo, a ($C_1$-$C_3$)alkyl, or a —O—($C_1$-$C_3$)alkyl, and wherein at least one of $R^1$-$R^3$ is a —O—($C_1$-$C_3$)alkyl or a halo, and wherein at least one of $R^4$-$R^6$ is a —O—($C_1$-$C_3$) alkyl or a halo; and $R^7$, $R^8$, $R^{11}$ and $R^{12}$ are each individually selected from H, D, an optionally substituted ($C_1$-$C_8$)alkyl, an optionally substituted ($C_1$-$C_7$)hetero-alkyl, an optionally substituted ($C_1$-$C_8$) alkenyl, an optionally substituted ($C_1$-$C_7$)hetero-alkenyl, an optionally substituted ($C_1$-$C_8$)alkynyl, an optionally substituted ($C_1$-$C_7$)hetero-alkynyl, an optionally substituted aryl, an optionally substituted ($C_5$-$C_8$)cycloalkyl, an optionally substituted ($C_5$-$C_8$)cycloalkenyl, an optionally substituted heterocycle, an optionally substituted mixed ring system, a halo, a hydroxyl, an amino, a nitro, an azide, a cyanate, an isocyanate, a nitrile, an isonitrile, a nitro, a ($C_1$-$C_7$)ketone, a ($C_1$-$C_7$)aldehyde, a ($C_1$-$C_7$)silyl ether, and a ($C_1$-$C_7$)ester; and $n^6$-$n^8$ are integers and are each independently selected from 0, 1, 2, 3, 4, 5, 6, 7, 8, 9, and 10. In yet a further embodiment, $R^1$-$R^6$ are —OMe groups.

In yet a further embodiment, a dynamic polymer disclosed herein, comprises a plurality of bis-silyl ether crosslinkers that comprise one or more structures of:

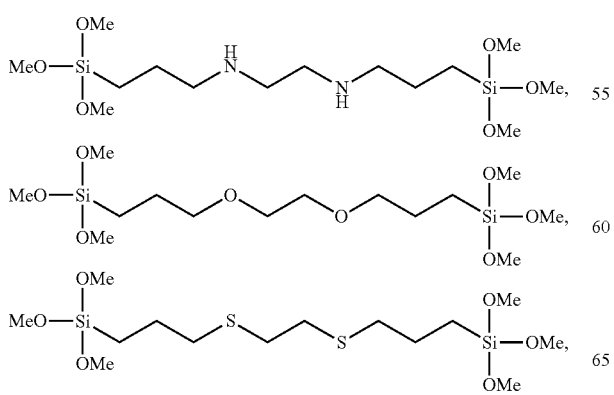

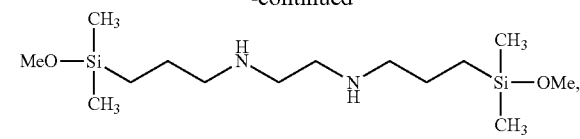

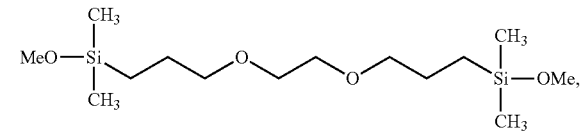

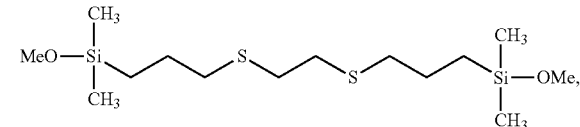

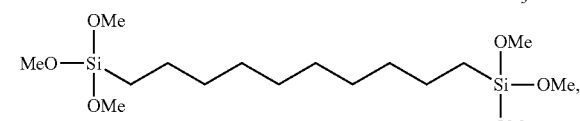

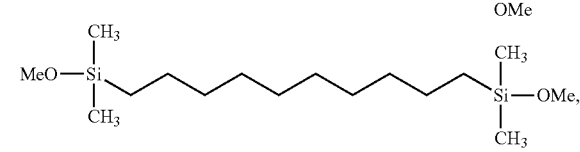

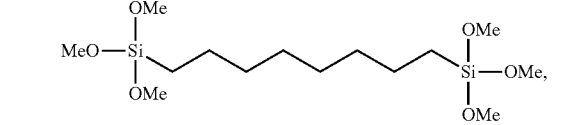

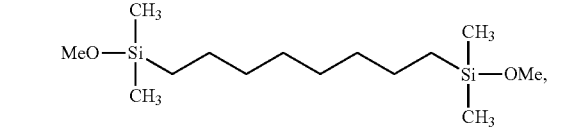

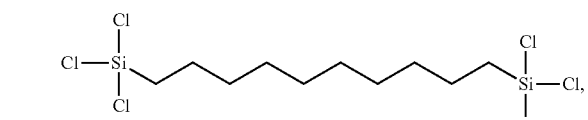

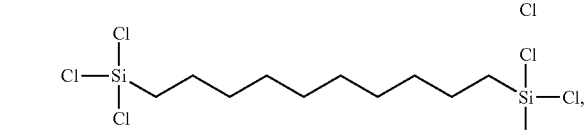

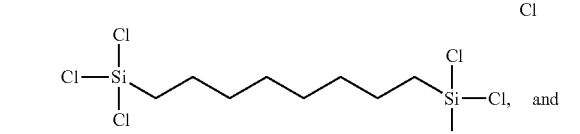

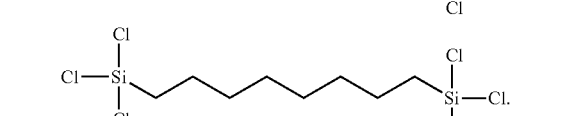

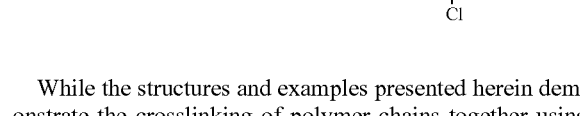

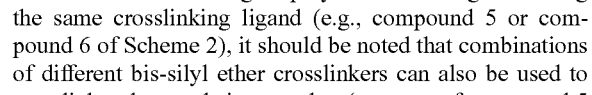

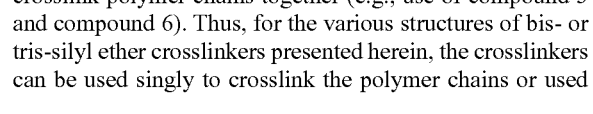

While the structures and examples presented herein demonstrate the crosslinking of polymer chains together using the same crosslinking ligand (e.g., compound 5 or compound 6 of Scheme 2), it should be noted that combinations of different bis-silyl ether crosslinkers can also be used to crosslink polymer chains together (e.g., use of compound 5 and compound 6). Thus, for the various structures of bis- or tris-silyl ether crosslinkers presented herein, the crosslinkers can be used singly to crosslink the polymer chains or used in combination with other bis- or tris-silyl ether crosslinkers which have different structures to crosslink the polymer chains together.

The disclosure further provides methods for making dynamic polymers disclosed herein. As exemplified in the Examples and Figures presented herein, multiple silyl ether exchange methods were developed to crosslink polymers using bis-silyl ether crosslinking reagents. In one embodiment, a method of making the dynamic polymer disclosed herein comprises using free hydroxyls (see FIG. 18A). In a particular embodiment, the method comprises: polymerizing a first portion of monomers that do not comprise pendant hydroxyl groups (e.g., styrene) with a second portion of monomers that comprise pendant hydroxyl groups (e.g., styrene-OH) in an organic solvent system (e.g., toluene) by adding a radical initiator (e.g., azobisisobutyronitrile (AIBN)) at an elevated temperature (e.g., 70° C.) to form polymer chains (e.g., poly(styrene-co-styrene-OH)); crosslinking the polymer chains by heating a reaction mixture comprising bis-silyl ether crosslinkers and the polymer chains in organic solvent system (e.g., 1,2-dichlorobenzene) at two elevated temperatures (e.g., at 80° C. and at 120° C.). In another embodiment, a method of making the dynamic polymer disclosed herein comprises using cross silyl ether metathesis (see FIG. 18B). In a certain embodiment, the method comprises: polymerizing a first portion of monomers that do not comprise pendant silyl ether groups (e.g., styrene) with a second portion of monomers that comprise pendant silyl ether groups (e.g., styrene-OSiMe$_3$) in an organic solvent system (e.g., toluene) by adding a radical initiator (e.g., azobisisobutyronitrile (AIBN)) at an elevated temperature (e.g., 80° C.) to form polymer chains; crosslinking the polymer chains by heating a reaction mixture comprising an acid catalyst (e.g., a Lewis acid or a BrØnstead acid), bis-silyl ether crosslinkers, and the polymer chains in organic solvent system at an elevated temperature (e.g., ≥30° C.). As indicated herein, there is a lot of flexibility in the reactions disclosed herein, and different catalysts, linker concentrations, and the like, will still provide for crosslinked polymers.

While it would be expected that the dynamic polymers described herein can be used in applications such as reprocessable composites and liquid-crystalline elastomer actuators, the dynamic polymers of the disclosure also hold the promise of changing the classical perception of bulk synthetic 'plastics'. Today, society generally regards organic polymers as cheap, fit-for-purpose, discardable materials that ultimately become hazardous 'chemical' waste. As the dynamic polymers disclosed herein can easily be (re)processed, recycled and repaired in a similar way to glass and metals, bulk synthetic organic polymers might also evolve towards a new perception of versatile light weight raw materials with a high intrinsic value. Moreover, the properties of the dynamic polymers described herein make the dynamic polymers excellent candidates for various types of applications in various industries, such as the aviation, automotive, electronic, and sporting goods industries. The dynamic polymers disclosed herein are useful in a variety of practical applications, including as adhesives and for molded plastic products. The dynamic polymers of the disclosure hold tremendous promise for a range of advanced material technologies.

The following examples are intended to illustrate but not limit the disclosure. While they are typical of those that might be used, other procedures known to those skilled in the art may alternatively be used.

EXAMPLES

General Experimental Details. Anhydrous solvents were purified through a column of alumina before use. Inhibitors were removed by passing the styrene monomers through a basic alumina column. All other commercial reagents were used as received unless otherwise noted. $^1$H NMR spectra were recorded at 500 MHz on a GN-500 or CRYO-500 spectrometer. $^1$H NMR chemical shifts are reported as 5 values in ppm relative to residual solvent: CHCl$_3$ (7.26 ppm). Gel Permeation Chromatography (GPC) traces were obtained on an Agilent 1100 SEC system using a PLGel Mixed-C column from Polymer Labs (Amherst, Mass.). THF was used as eluting solvent at a flow rate of 1.0 mL/min. Number averaged and weight averaged molecular weight distributions ($M_n$ and $M_w$, respectively) of samples were measured with respect to polystyrene (PS) standards purchased from Aldrich (Milwaukee, Wis.).

Synthesis of poly(styrene-co-styrene-OH) 4. Styrene (10.0 mL, 87.0 mmol), 2-(4-vinyl-benzyloxy)-ethanol (1.72 g, 9.67 mmol) and AIBN (47.6 mg, 0.290 mmol) were dissolved in 40 mL toluene. The mixture was stirred at room temperature for 60 min, and then was heated at 70° C. for 24 h under nitrogen. The reaction was quenched by cooling the mixture to room temperature. Copolymer was precipitated by slowly adding the reaction mixture to 1000 mL of hexane under stirring. After filtration, the polymer was dissolved in DCM and precipitated twice into stirring MeOH. The precipitate was dried at 80° C. under vacuum for 24 h to give the white solid (10.3 g, 76% yield). $^1$H NMR (CDCl$_3$) δ: 4.13(br, s), 3.91-3.33(m), 2.58(br, s), 2.15-0.75(m), and 9% 2-(4-vinyl-benzyloxy)-ethanol incorporation. GPC: $M_n$, 29.0 kg/mol; PDI, 1.82.

Small molecule exchange experiments in $^1$H NMR (Calculation of rate constants and activation energies). A solution of 1 (trimethoxy[3-(methylamino)propyl]silane) or 2 (trimethoxy(propyl)silane) in CDCl$_3$ was prepared. An excess of CD$_3$OD was added (Table 1), and $^1$H NMR experiments at various temperatures (5° C., 15° C., 25° C., or 35° C. for 1, 25° C., 35° C., 45° C., or 55° C. for 2) were performed. The peaks of Si—OC$\underline{H}_3$ (δ: 3.5-3.6) and SiCH$_2$-C$\underline{H}_2$—CH$_2$N (δ: 1.50-1.65) for 1 or SiCH$_2$—CH$_2$—C$\underline{H}_3$ (δ: 0.9-1.1) for 2 were carefully integrated, and the concentration of 1 or 2 was calculated.

TABLE 1

Concentration of samples for $^1$H NMR silyl ether exchange study

| | Initial concentration | |
|---|---|---|
| | Silane small molecule | CD$_3$OD |
| Reaction of 1 | 0.0095M | 0.99M |
| Reaction of 2 | 0.19M | 20M |

As shown herein, those reactions can be described in terms of second-order kinetics (eq. (1) and (4)). In addition, considering a vast excess of $CD_3OD$, eq. (1) and (4) can be transformed into eq. (2) and eq. (5) respectively.
The reaction of 1:

$$d[1]/dt = k_1[CD_3OD][1] \quad (1)$$

$$= -k_{exp1}[1] \quad (2)$$

$$(k_{exp1} = k_1[CD_3OD]) \quad (3)$$

The reaction of 2:

$$d[2]/dt = k_2[CD_3OD][2] \quad (4)$$

$$= -k_{exp2}[2] \quad (5)$$

$$(k_{exp2} = k_2[CD_3OD]) \quad (6)$$

k: rate constant, $k_{exp}$: experimental rate constant. If the initial concentration of 1 and 2 is described as $[1]_0$ and $[2]_0$, eq. (2) and (5) can be transformed to eq. (7) and (8).

$$\ln([1]/[1]_0) = -k_{exp1}t \quad (7)$$

$$\ln([2]/[2]_0) = -k_{exp2}t \quad (8)$$

Plots of $\ln([1]/[1]_0)$ and $\ln([2]/[2]_0)$ vs. t were made for each reaction (see FIG. 3 and FIG. 4), and $k_{exp1}$ and $k_{exp2}$ were determined. Finally, $k_1$ and $k_2$ were calculated by eq. (3) and (6) respectively. The result is shown in Table 2.

TABLE 2

Reaction rate constant of different alkoxysilanes

| k | Reaction rate constant (L mol$^{-1}$ s$^{-1}$) | | | | | |
|---|---|---|---|---|---|---|
|   | 5° C. | 15° C. | 25° C. | 35° C. | 45° C. | 55° C. |
| 1 | 1.8 × 10$^{-5}$ | 3.7 × 10$^{-5}$ | 5.6 × 10$^{-5}$ | 7.9 × 10$^{-5}$ | — | — |
| 2 | — | — | 2.9 × 10$^{-8}$ | 5.9 × 10$^{-8}$ | 1.5 × 10$^{-7}$ | 3.1 × 10$^{-7}$ |

1: Reaction rate constant of alkoxysilane 1 (with neighboring amino groups in the γ positions),
2: Reaction rate constant of alkoxysilane 2 (no neighboring groups)

To calculate the activation energy for each reaction, the Arrhenius plots were made using $k_{exp1}$ and $k_{exp2}$ (see FIG. 5).

$$k = A \exp(-E_a/RT) \quad (9)$$

(A: pre-exponential factor, $E_a$: activation energy, R: universal gas constant).
R=8.31 J K$^{-1}$ mol$^{-1}$ was used to calculate the activation energies from the slope values.

Representative procedure for preparing cross-linked bulk samples. Poly(styrene-co-styrene-OH) 4 (1.5 g) was dissolved in 1,2-dichlorobenzene (7.5 mL). To the stirring solution, 0.75 mol % of silane cross-linker (5 or 6) (with respect to combined monomers) in 1,2-dichlorobenzene (4 mL) was added. The mixture was then cast into a Teflon mold. The mold was first placed in an oven at 80° C. under $N_2$ for 12 h, and then at 120° C. under reduced pressure (0.03 mmHg) for 24 h to remove any residual solvent.

TGA (thermogravimetric analysis) procedure. The thermal stability of the cross-linked polymers was probed by TGA under air. The samples were heated from 30° C. to 850° C. at 10° C./min and then mass loss was plotted versus temperature (see FIG. 10).

Isothermal TGA Measurements. Isothermal TGA measurements were performed at 160° C., 6 hours for PS-Bis-γ-NH network, and at 190° C., 6 hours for PS-Bis-C10 network. No significant degradation was observed (see FIG. 11).

DSC (differential scanning calorimetry) procedure. Differential scanning calorimetry measurements were performed using a TA Q2000 instrument. ~5 mg of polymer sample was placed in a non-hermitic pan and scanned against an empty reference pan. The DSC experiment was performed in a heat-cool cycle (25 to 180° C., 20° C./min; 180 to −80° C., 10° C./min; isothermal −80° C., 30 min; −80 to 200° C., 5° C./min), where the thermal transitions for the last heating cycle were recorded (see FIG. 12).

DMTA (Dynamic mechanical thermal analysis) procedure. Dynamic mechanical thermal analysis experiments were performed using a TA instruments DMA Q800. Sample dimensions were measured (l,w,t) and loaded into the furnace and the strain was set to 1%. A temperature ramp was then performed from 50° C. to 200° C. at a rate of 5° C. min$^{-1}$ with 1.0 Hz frequency (see FIG. 13).

Calculation of cross-linking density. Cross-linking density, or the average molecular weight between crosslinks ($M_c$) was calculated by the following equation using storage modulus above $T_g$:

$$M_c = 2(1+v)\rho RT/E' \quad (10)$$

v: Poisson's ratio (polystyrene: 0.336)
ρ: density (polystyrene: 1.04 g cm$^{-3}$)
R: universal gas constant
E': storage modulus Using the above equation, the values for both networks at 180° C. were calculated to be:

PS-Bis-γ-NH (E'=1.7 MPa): 6.2×10$^3$ g mol$^{-1}$

PS-Bis-C10 (E'=1.9 MPa): 5.5×10$^3$ g mol$^{-1}$

The results confirm that the two networks have comparable crosslinking density.

Stress relaxation procedure. Stress relaxation experiments were performed using a TA instruments DMA Q800. Sample dimensions were measured (l,w,t) and loaded into the furnace. The sample was equilibrated to a set temperature for 15 min, after which the sample was displaced and held at 10% strain until the samples had relaxed to 1/e of the initial stress relaxation modulus. The mean relaxation lifetime τ* was determined for each experiment where the stress relaxation modulus to reach 37% (1/e) of its initial value.

Calculation of topology-freezing transition temperatures ($T_v$) and activation energies ($E_a$). Topology-freezing transition temperatures ($T_v$) and activation energies ($E_a$) were determined using the methodology reported in Capelot et al. (ACS Macro Lett. 2012, 1, 789) and Brutman et al. (ACS Macro Lett. 2014, 3, 607). The measured values of τ* were plotted versus 1000/T. The plots were fit to the Arrhenius law in eq. (11) (see FIG. 9).

$$\tau^*(T) = \tau_0^* e^{Ea/RT} \quad (11)$$

(R: universal gas constant; 8.31 J K$^{-1}$ mol$^{-1}$).
Eq. (9) can be transformed to eq. (12):

$$\ln \tau^*(T) = \ln \tau_0^* + E_a/RT \quad (12)$$

Referring to FIG. 9, eq. (12) for PS-Bis-γ-NH and PS-Bis-C10 is transformed eq. (13) and (14) respectively.

$$\text{PS-Bis-}\gamma\text{-NH: } \ln \tau^*(T) = 9.72 \cdot 1000/T - 15.8 \quad (13)$$

$$\text{PS-Bis-C10: } \ln \tau^*(T) = 21.0 \cdot 1000/T - 39.7 \quad (14)$$

$E_a/R = 15.9$ for PS-Bis-γ-NH and 21.0 for PS-Bis-C10, so the activation energy of PS-Bis-γ-NH is 81 kJ mol$^{-1}$ and that of PS-Bis-C10 is 174 kJ mol$^{-1}$. $T_v$ is defined to be the temperature at which the material reaches a viscosity of $10^{12}$ Pa. The relation of the viscosity η and the characteristic relaxation time τ* is known as the Maxwell relation (eq. (15)).

$$= G\tau^* = (E'/2(1+\nu)) \cdot \tau^* \quad (15)$$

(G: shear modulus, E': storage modulus, ν: Poisson's ratio). Using the Poisson's ratio of polystyrene is 0.336, eq. (15) can be transformed to eq. (16).

$$= 0.374 \cdot E' \tau^* \quad (16)$$

The storage modulus of PS-Bis-γ-NH from 150° C. to 180° C. is 1.4 MPa, and that of PS-Bis-C10 in the same temperature range is 1.9 MPa (see FIG. 13). Thus, τ* of PS-Bis-γ-NH is $1.9 \times 10^6$ s at $T_v$ and τ* of PS-Bis-C10 is $1.4 \times 10^6$ s at $T_v$ because of $\eta = 10^{12}$ Pa. Using these values and eq. (13) or (14), $T_v$ was calculated.

Insoluble fraction test. Insoluble gel fraction tests of cross-linked polymers were performed by the following procedure. A small amount of cross-linked polymers, which were weighed before the experiment, were placed into a vial. The vial was filled with 1,2,4-trichlorobenzene, closed and heated at 150° C. After heating for 24 h, the vial was cooled down to room temperature. The polymer sample was washed by toluene followed by dichloromethane, and then the solvents were removed by using a centrifuge. The sample was then dried under reduced pressure (0.03 mmHg) at 150° C. overnight. After cooling back to room temperature, the sample was weighed and the gel fraction was calculated. The result is shown in Table 3.

TABLE 3

Gel fraction of PS-Bis-γ-NH and PS-Bis-C10 in 1,2,4-trichlorobenzene at 150° C. for 24 h

| Sample | Experiment No. | Before (mg) | After (mg) | Gel fraction (%) |
|---|---|---|---|---|
| PS-Bis-γ-NH | 1 | 15.1 | 14.6 | 97 |
|  | 2 | 17.8 | 17.5 | 98 |
|  | 3 | 16.8 | 16.2 | 96 |
| PS-Bis-C10 | 1 | 18.9 | 18.6 | 98 |
|  | 2 | 17.5 | 16.5 | 96 |
|  | 3 | 15.8 | 15.3 | 97 |

Insoluble fraction tests were also performed by the same procedure using reprocessed samples. The result is shown in Table 4. Note that the soluble fraction is not altered after reprocessing.

TABLE 4

Gel fraction of reprocessed PS-Bis-γ-NH and PS-Bis-C10 in 1,2,4-trichlorobenzene at 150° C. for 24 h

| Sample | Experiment No. | Before (mg) | After (mg) | Gel fraction (%) |
|---|---|---|---|---|
| PS-Bis-γ-NH | 1 | 20.1 | 19.8 | 99 |
|  | 2 | 23.5 | 22.5 | 96 |
|  | 3 | 19.1 | 18.7 | 98 |
| PS-Bis-C10 | 1 | 25.5 | 24.7 | 97 |
|  | 2 | 19.8 | 19 | 96 |
|  | 3 | 24.4 | 23.6 | 97 |

Tensile and re-processability test. Cross-linked polymers were placed in a dog bone shaped mold and then melt-processed to make mechanical test samples (160° C., 6 h for PS-Bis-γ-NH, or 190° C., 6 h for PS-Bis-C10). Tensile tests of the samples were performed using an Instron 3365 instrument with a 500 N load cell with a pulling rate of 2 mm/min. Sample dimensions were measured and the sample was pulled at ambient temperature until break. After initial measurements, the samples were cut and placed in a dog-bone shaped mold. The samples were melt-processed and then tensile tests were performed again at the same condition. Mechanical properties including Young's modulus, tensile strength, and elongation at break were not affected after reprocessing. Table 5 summarizes these results.

TABLE 5

Mechanical properties of PS-Bis-γ-NH and PS-Bis-C10

| Sample | Young's modulus (GPa) | | Tensile Stress (MPa) at break | | Maximum Strain (mm/mm) | |
|---|---|---|---|---|---|---|
|  | original | reprocessed | original | reprocessed | original | reprocessed |
| PS-Bis-γ-NH | 1.5 | 1.5 | 12.4 | 11.3 | 0.014 | 0.013 |
|  | 1.1 | 1.2 | 10.9 | 10.2 | 0.016 | 0.015 |
|  | 1.3 | 1.3 | 12.5 | 11.6 | 0.017 | 0.016 |
| PS-Bis-C10 | 1.8 | 1.7 | 20.3 | 19.2 | 0.017 | 0.017 |
|  | 1.7 | 1.6 | 16.9 | 16.4 | 0.014 | 0.014 |
|  | 1.5 | 1.6 | 18.9 | 18.0 | 0.017 | 0.016 |

Figure 16:
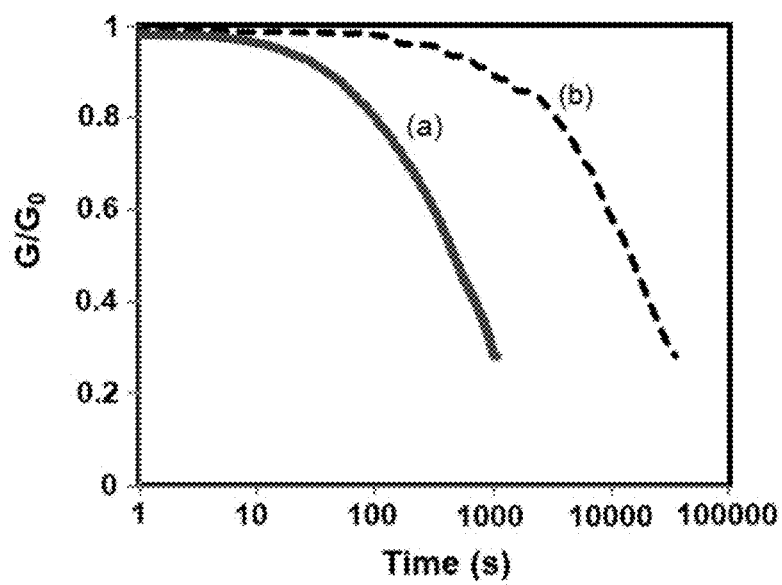
FIG. 16 provides for stress relaxation tests of (a) PS-Bis-C10 and (b) Control sample at 180° C.

Control Study. For the control study, less dynamic cross-linked polymers were prepared by adding 1,6-diisocyanatohexane. Poly(styrene-co-styrene-OH) 4 (0.3 g) was dissolved in 1,2-dichlorobenzene (1.5 mL) To the stirring solution, 2.25 mol % of 1,6-diisocyanatohexane with respect to monomers in 1,2-dichlorobenzene (2 mL) was added to the stirring polymer solution. The mixture was then cast into a Teflon mold. The mold was first placed in an oven at 80° C. under N$_2$ for 12 h, and then at 120° C. under reduced pressure (0.03 mmHg) for 24 h to remove any residual solvent. The result of stress relaxation test at 180° C. is shown in FIG. 16. The control sample shows slower relaxation than PS-Bis-C10.

Figure 17:
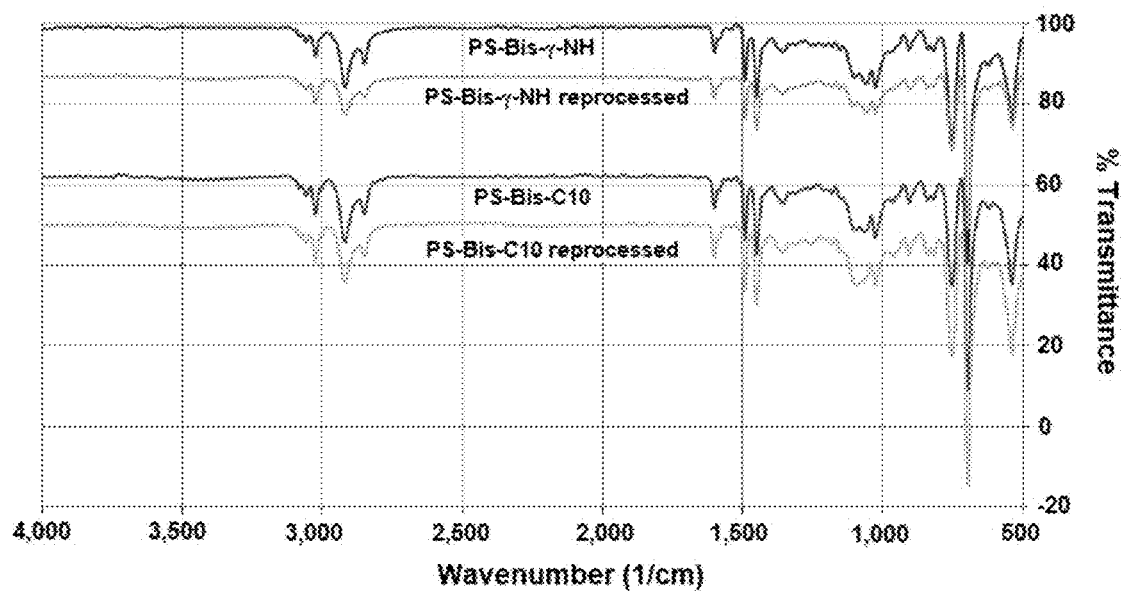
FIG. 17 presents Fourier-transform infrared spectroscopy (FT-IR) spectra of PS-Bis-γ-NH and PS-Bis-C10 networks (original and reprocessed) samples.

FT-IR Measurements. FT-IR spectra were collected on Jasco FT/IR-4700 equipped with an ATR-pro one accessory with a monolithic diamond. Each experiment was done with 100 scans with a resolution of 4 cm$^{-1}$. All spectra were recorded with dry samples with the pressing pin fully engaged (see FIG. 17).

Tunable exchange dynamics in small molecule model systems. The scope of material properties of Si—O based materials is vast, ranging from polydimethylsiloxane (PDMS), among the softest of rubbers, to inorganic glass, an extremely strong and hard material. One early study about chemical stress-relaxation of PDMS elastomers was reported in the 1950s. Recently, self-healing materials using anionic siloxane exchange were reported. Additionally, a previous study showed that the rate of alkoxysilane hydrolysis varies over a wide window based on a neighboring amino-group effect. Encouraged by finding that variability in molecular exchange kinetics could directly translate to variability in bulk dynamic properties in preliminary studies, the potential of silyl ether to deliver similar versatility in dynamic and mechanical properties to networks through minimal variation in molecular structure was envisioned. Furthermore, the high chemical and thermal stability of silyl ether linkages adds additional appeal as a candidate for dynamic materials chemistry.

Figure 2A:
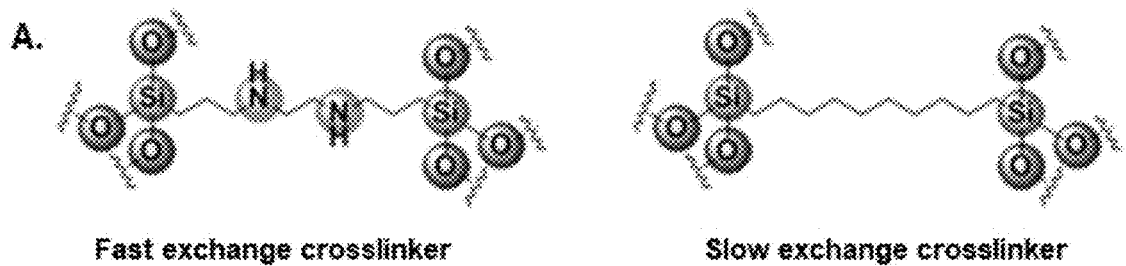
FIG. 2A-B presents one embodiment of a design concept of the dynamic polymers based upon silyl ether exchange disclosed herein. (A) Design of bis-crosslinkers with and without neighboring amino groups. (B) Dynamic exchange of silyl ether cross-linkers affords dynamic vitrimeric materials.
Figure 2B:
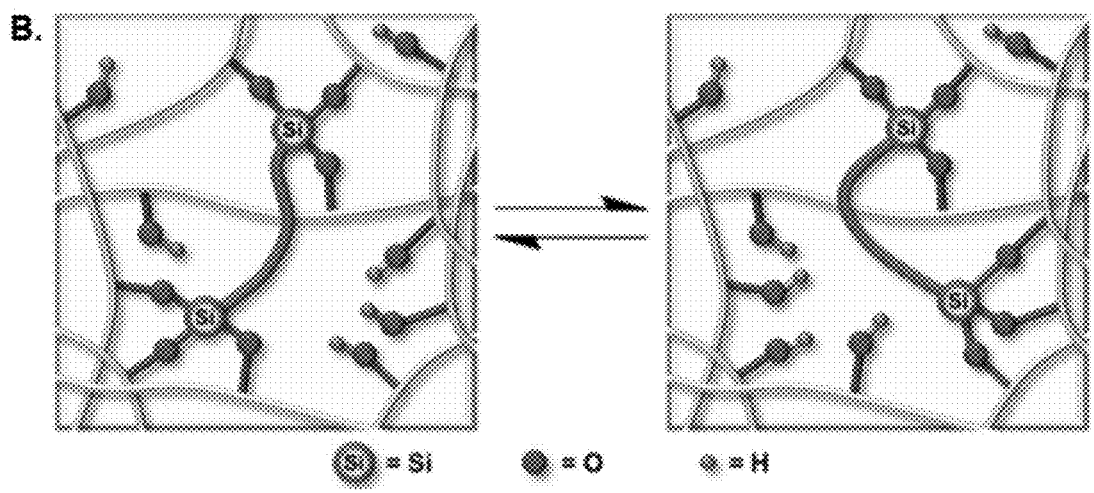

The first example of a silyl ether exchange-based vitrimer is reported herein (see FIG. 2B). Specifically, a styrene-based copolymer with bis-silyl ether was cross-linked through pendant hydroxyl groups functionalized on the styrene monomer units. Additional networks were developed where the pendant hydroxyl groups could be absent. Networks were prepared with two cross-linkers of variable dynamics, one with rate accelerating amino neighboring groups, and the other without (see FIG. 2A). Surprisingly, a dramatic difference in the temperature-dependent stress-relaxation behavior of the two materials was discovered. As such, this data provides the first example of utilizing intramolecular catalytic control of bond exchange kinetics to influence the thermal responsive properties of vitrimers. Notably, the remarkable high thermal stability of silyl ether should be beneficial for many practical applications.

Based on a previous report showing effects of amino neighboring groups on the hydrolysis rates of alkoxysilanes, the differences in siloxane exchange reactions was first identified in model alkoxysilanes 1 (with neighboring amino groups in the γ positions) and 2 (no neighboring groups) (see Scheme 1).

Scheme 1. Small Molecule Model Study of Silyl Ether Exchange Kinetics

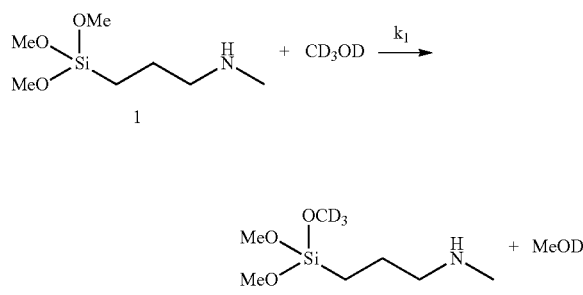

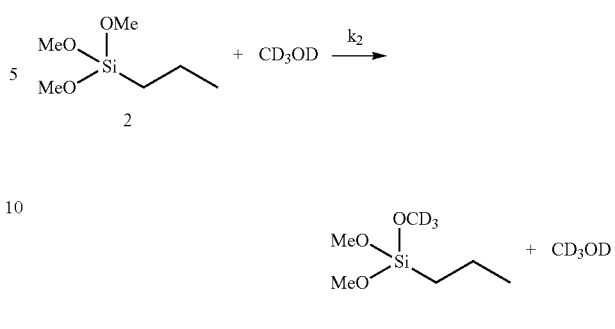

The small molecule model reactions were performed through trans-methoxylation of CD$_3$OD to trimethoxysilanes 1 and 2 with an excess of CD$_3$OD, and their rates monitored through disappearance of methoxysilane resonances on $^1$H NMR. Previous studies on the hydrolysis reactions on alkoxysilanes showed that these reactions proceed via a pentacoordinate intermediate and can be described in terms of pseudo-first-order kinetics when an excess of water is present. By following a similar kinetic treatment, the reaction rate constants at 5° C., 15° C., 25° C. and 35° C. for compound 1 and 25° C., 35° C., 45° C. and 55° C. for compound 2 were calculated and are summarized in Table 2 (see also FIGS. 3 and 4).

Figure 3:
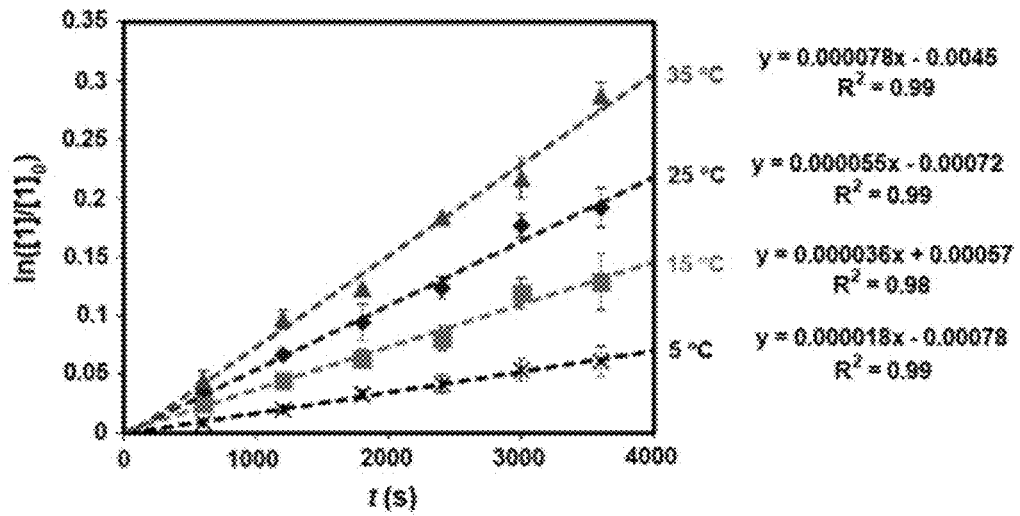
FIG. 3 presents plots of $\ln([1]/[1]_0)$ vs. t for the reaction of 1. $k_{exp1}$ at each temperature was determined by its slope value.
Figure 4:
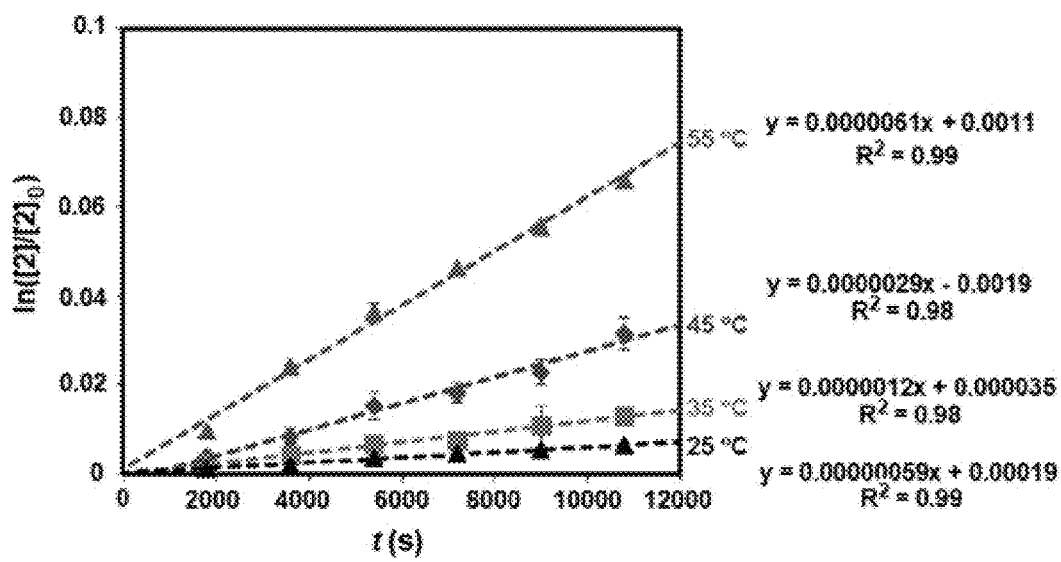
FIG. 4 presents plots of $\ln([2]/[2]_0)$ vs. t for the reaction of 2. $k_{exp2}$ at each temperature was determined by its slope value.

Consistent with literature, compound 1 accelerated by the neighboring amino group exhibited almost three orders of magnitude faster rate for CD$_3$OD exchange than compound 2 due to internal catalysis by the neighboring group (See FIGS. 3-5). The activation energies of exchange for these two species were calculated to be 35 and 65 kJ/mol, respectively (Table 6; see also FIG. 5).

TABLE 6

Summary of thermal properties and activation energies of exchange

| | | | Activation Energy (kJ mol$^{-1}$) | |
|---|---|---|---|---|
| Sample | T$_v$ (° C.)[a] | T$_g$ (° C.)[b] | Stress relaxation analysis[c] | Small molecule study[d] |
| PS-Bis-γ-NH | 47 | 125 | 81 | 35[e] |
| PS-Bis-C10 | 117 | 123 | 174 | 65[f] |

[a]Temperature at which a viscosity of 10$^{12}$ Pa s is reached.
[b]Measured by DMA.
[c]Calculated by the Arrhenius plots of the mean relaxation life time τ* (FIG. 9).
[d]Calculated by the Arrhenius plots of the rate constants k (FIG. 5).
[e]The activation energy of the reaction of 1.
[f]The activation energy of the reaction of 2.

Dynamic mechanical properties in bulk materials. Having demonstrated the tunable exchange dynamics in small molecule model systems, the results of these studies were then transferred to study the dynamic mechanical properties in bulk materials.

For the polymer backbone, a styrene copolymer with hydroxyl group side chains was synthesized (Scheme 2).

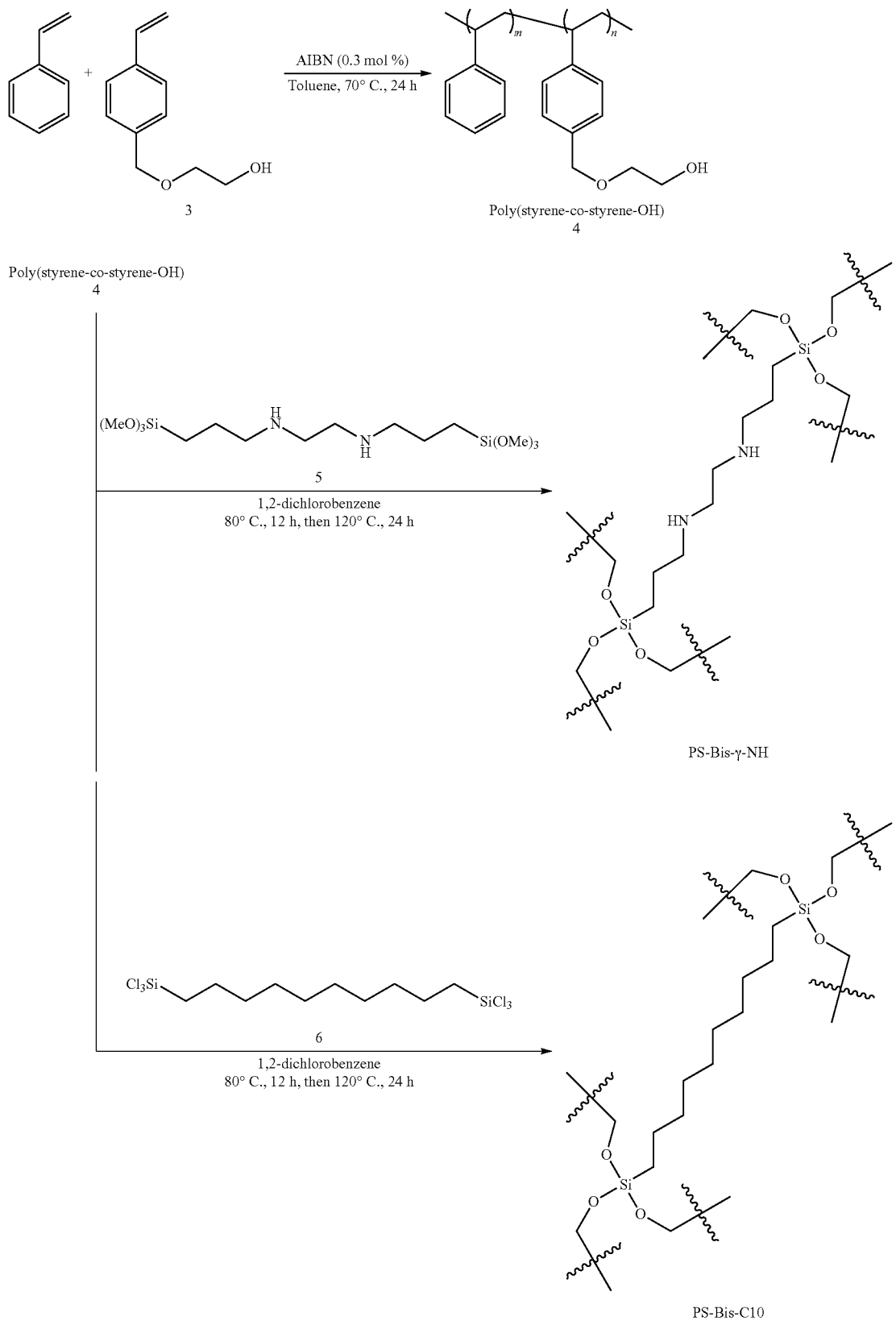

Styrene-based monomer 3 with a pendant hydroxyl group was prepared according to Pasini et al. (M. *Adv. Synth. Catal.* 2007, 349, 971-978), which was copolymerized with styrene by free radical polymerization to afford poly(styrene-co-styrene-OH) 4. The molar ratio of monomer 3 to styrene in copolymer 4 was determined by $^1$H NMR to be 9 mol % (see FIG. 6).

Based on the results of the small molecule model study, Bis-γ-NH and Bis-C10 (compounds 5 and 6, Scheme 2) were chosen as the fast and slow cross-linkers, respectively. Fast exchanging cross-linker 5 is a bis-alkoxysilane cross-linker with secondary amino groups at γ positions to each respective silicon. Slow exchanging cross-linker 6 has no functional groups between the two silicon atoms. Cross-linked network PS-Bis-γ-NH was prepared through the reaction between copolymer 4 and cross-linker 5 (0.75 mol % cross-linker with respect to combined monomers) in 1,2-dichlorobenzene. Each cross-linker has six reactive functionalities, resulting in a maximal consumption of 4.5% of the hydroxyl groups on the polystyrene backbone (i.e., half of the total hydroxyl groups). The remaining half of the free hydroxyls will allow associative exchange with the silyl ether linkages for the desired vitrimer function. The reaction was first allowed to proceed at 80° C. for 12 h, after which the solvent was removed at 120° C. under reduced pressure (0.03 mmHg) for 24 hours. The PS-Bis-C10 network was prepared through the reaction of copolymer 4 with cross-linker 6 (0.75 mol % cross-linker with respect to combined monomers) using the same conditions as PS-Bis-γ-NH (Scheme 2). These cured networks were insoluble in 1,2,4-trichlorobenzene at 150° C. for 24 hours, indicating a robust cross-linked network (see Tables 3 and 4). The combination of DMTA data (see FIG. 13), calculated cross-linking density (see above), and FT-IR spectra (see FIG. 17) support that PS-Bis-γ-NH and PS-Bis-C10 have comparable network structures.

Next, the cross-linked polymers PS-Bis-γ-NH and PS-Bis-C10 were subjected to stress relaxation analyses at elevated temperatures (150° C., 160° C., 170° C. and 180° C.) to investigate their flow properties (see FIG. 8). Consistent with the small molecule exchange kinetics (Table 2), it was found that PS-Bis-γ-NH released stress much faster than PS-Bis-C10 at all temperatures. For example, the characteristic relaxation time τ* of PS-Bis-γ-NH at 180° C. is 260 seconds, while τ* of PS-Bis-C10 at 180° C. is 779 seconds. These results show good qualitative correlation with the small molecule kinetics in Table 2, supporting the hypothesis of transferring small molecule exchange kinetics to the dynamic mechanical properties of bulk materials. Furthermore, as shown in FIG. 9, the temperature dependence of the relaxation time for both samples is in good agreement with the Arrhenius equation, in alignment with vitrimeric properties arising from associative dynamic exchange.

Thanks to the chemical stability of silyl linkage, the networks exhibit very high thermal stability. Thermogravimetric analysis (TGA) showed that there was negligible thermal degradation for PS-Bis-γ-NH and PS-Bis-C10 at temperatures below 300° C. and 350° C., respectively (see FIG. 10). The onset of thermal degradation of the current system is ~100° C. higher than previously reported vitrimers, where degradation onsets have been reported between 200° C. (triazolium trans-alkylation) and 263° C. (trans-carbomoylation). Practically, this allows for a wider temperature range for real-life material processing and applications.

A defining characteristic of vitrimers is the topology-freezing transition temperature ($T_v$), the temperature at which the network topology of the material is frozen through kinetic trapping of its internal dynamic chemistry. Using protocols developed by Montarnal et al., Science 2011, 334, 965-968, the Tv of PS-Bis-γ-NH and PS-Bis-C10 were calculated to be 47 and 117° C., respectively (see Table 6; and the calculations presented above).

The $T_v$ of PS-Bis-γ-NH provides a special case scenario of $T_v$ (47° C.)<<$T_g$ (125° C.) rarely seen in vitrimer literature, as most vitrimers exhibit $T_v$>$T_g$. This property gives rise to unique behavior in the PS-Bis-γ-NH network. The $T_g$ is characterized by polymer chain motion, and follows a very rapid drop in viscosity over a small temperature range, explained in part by the Williams-Landel-Ferry (WLF) model. In contrast, $T_v$ arises from molecular exchange kinetics, and gradual, logarithmic decay of viscosity results over a wide temperature range exhibited by the classic Arrhenius model of molecular kinetics. This means that in a $T_v$<<$T_g$ vitrimer, in a narrow temperature range above the $T_g$, rapid decay of viscosity around $T_g$ predicted by the WLF model should dominate, while in temperatures sufficiently far removed from $T_g$, the gradual Arrhenial decay of viscosity characteristic of vitrimers should dominate.

This behavior is indeed seen in PS-Bis-γ-NH. Observe in FIG. 14 as the rapid decay of viscosity (ln η) of the material at temperatures ranging from 125-140° C. (close to $T_g$, WLF behavior) gives way to the steady, linearly logarithmic decline of viscosity above 150° C. ($T_v$ dominating $T_g$ with Arrhenius behavior). This is the first time that this behavior has been experimentally verified. The significance of this result cannot be understated as it provides direct support to both the theory of topology freezing through molecular kinetic arrest of vitrimers, as well as the mechanism of fluidity of the specific system described herein.

The activation energies towards flow for the two vitrimers demonstrate the expected trend. As shown in Table 6, the activation energy of PS-Bis-γ-NH is less than half of that for PS-Bis-C10, reflecting the same trend that was shown for small molecule exchange kinetics for compounds 1 and 2. However, the absolute values obtained for the polymer networks are substantially higher than those obtained in small molecule exchange studies. This difference is attributed to two factors, variability in the steric bulk between the exchanging alkoxy groups and diffusion of polymer chains. Namely, in the small molecule model study, the exchanging alkoxy groups are very small methoxy and deuteride methoxy groups. On the contrary, in bulk polymer samples, the exchanging alkoxy groups on the networks are much more sterically encumbered (Scheme 2). In addition, diffusion of molecules is much slower in bulk polymers. This factor also affects the difference.

Figure 15A:
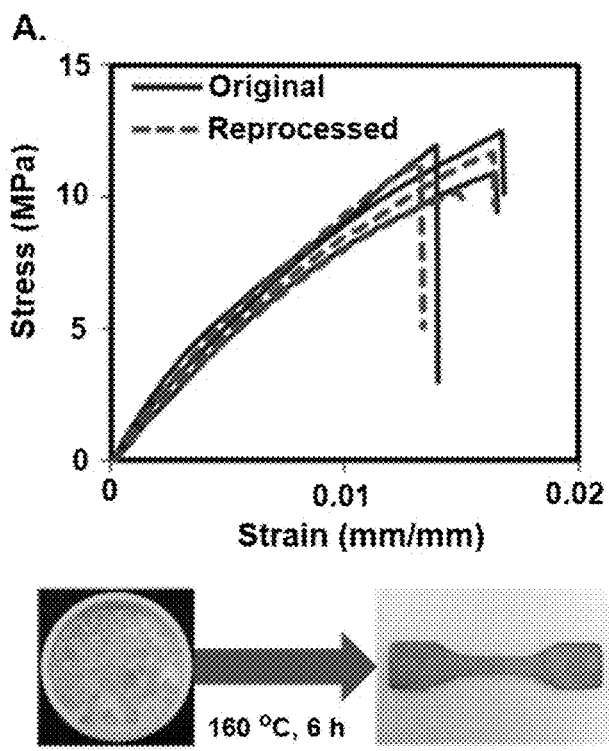
FIG. 15A-B provides for tensile tests and reprocessability tests of: PS-Bis-γ-NH (A), and PS-Bis-C10 (B). The left figures are tensile tests of original samples (solid lines) and reprocessed samples (dash lines). The top images are cut samples after initial experiments. The bottom images are reprocessed samples.
Figure 15B:
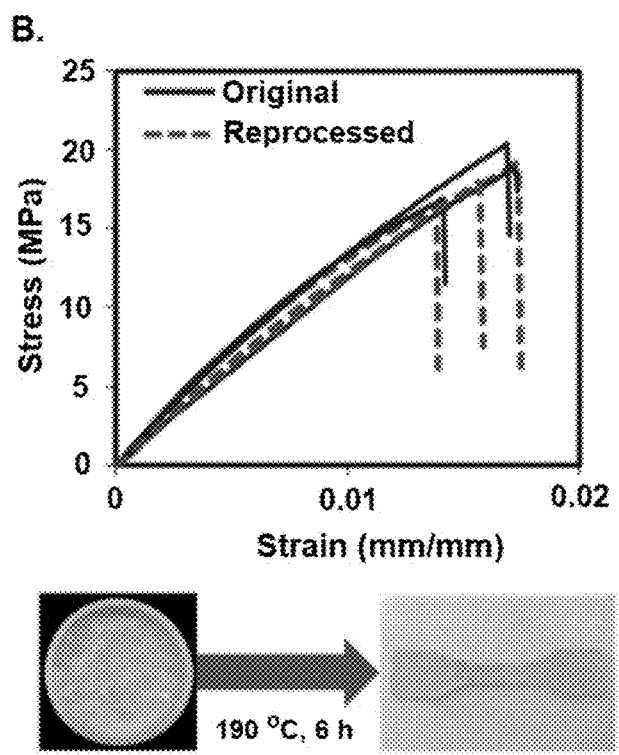

Finally, uniaxial tensile extension tests were performed with the samples to gauge the mechanical strength of the materials, as well as to confirm re-processability of the materials. First, dog bone-shaped samples of PS-Bis-γ-NH and PS-Bis-C10 were prepared. Stress-strain profiles of the virgin samples were collected. After the failure of the material, each sample was cut into small pieces and then melt-pressed at 160° C., 6 h for PS-Bis-γ-NH or at 190° C., 6 h for PS-Bis-C10. Because of higher $T_v$ of PS-Bis-C10 than that of PS-Bis-γ-NH, the higher temperature is needed to reprocess samples of PS-Bis-C10. The polymer networks were fully reformed. The tensile tests indicate that the mechanical properties of both PS-Bis-γ-NH and PS-Bis-C10 were recovered after the reprocessing conditions (see FIG. 15, and Table 5).

Acid catalyzed direct silyl ether metathesis reaction and its application toward malleable polymer thermosets. Unlike in the reactions described above (see Scheme 2), free hydroxyl groups on polymers are not needed for the silyl ether exchange metathesis reaction described below. The free hydroxyl functionality on polymers may cause undesired side reactions, such as oxidation or dehydration. To avoid such drawbacks, a direct silyl ether metathesis reaction was investigated that did not involve use of pendant hydroxyl groups (see FIG. 18).

Figure 19A:
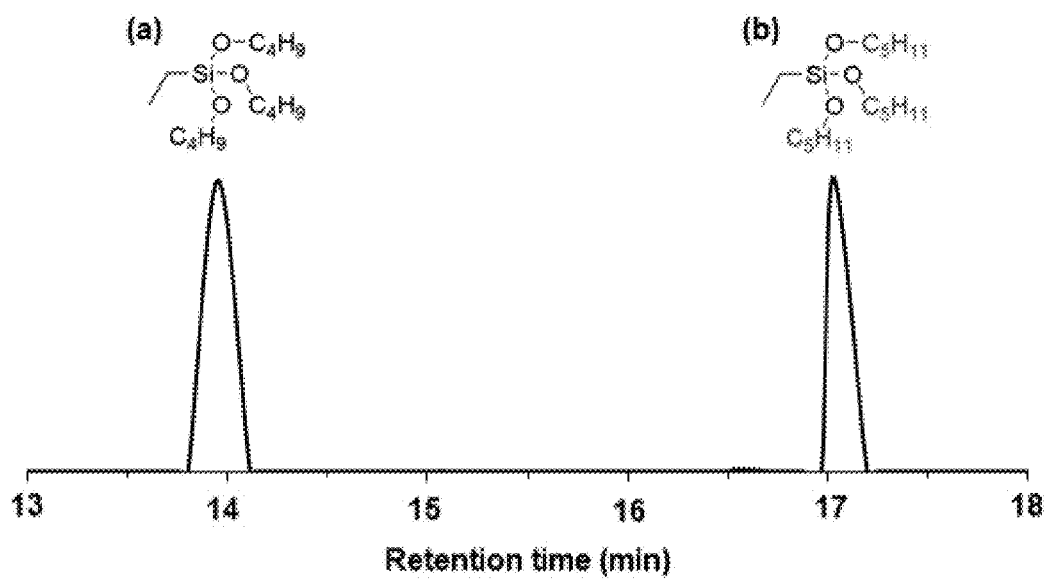
FIG. 19A-B shows exemplary gas chromatograms that track the results of the silyl ether cross metathesis reaction of two silyl ethers, (a) and (b). No free alcohol species was observed under any of reaction conditions. (A) Gas chromatogram demonstrating the retention times of silyl ethers, (a) and (b). (B) Gas chromatogram showing the product distribution following the silyl ether metathesis reaction. The two reactants (silyl ethers (a) and (b)) and two products (silyl ethers (c) and (d)) species are indicated in the chromatogram. Complete equilibrium was attained when the reaction reached 1:3:3:1 product distribution.
Figure 19B:
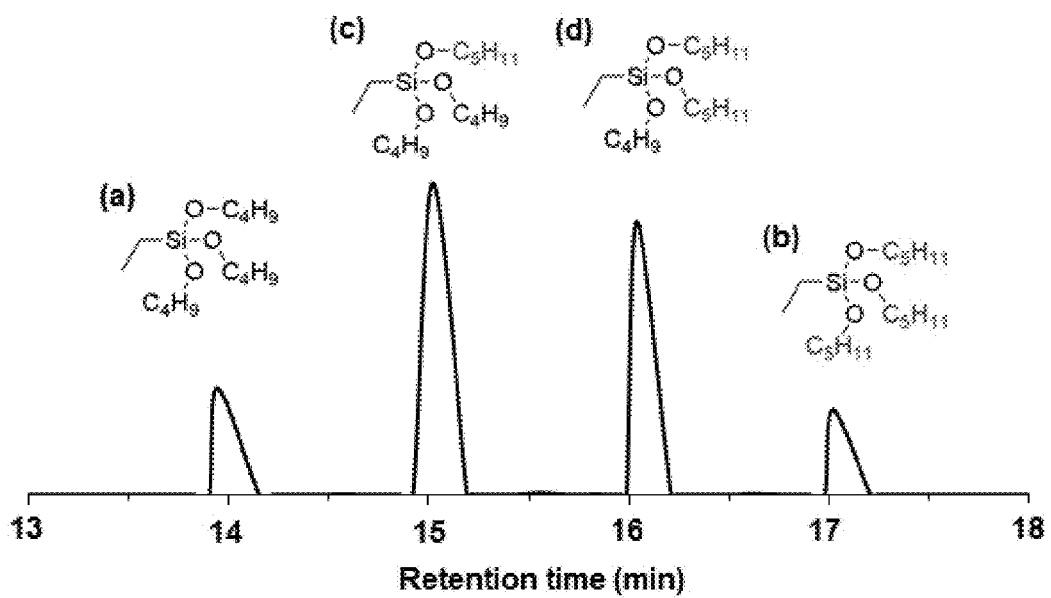

Exchange dynamics in small molecule model systems using silyl ether metathesis reactions. Two silyl ethers, a silyl ether comprising a tributoxy group and a silyl ether comprising a tripentoxy group were mixed in the presence of an acid catalyst (5 mol %). The mixture was dissolved in DMAC under anhydrous conditions (to prevent a hydrolysis reaction). The metathesis reaction was followed via gas chromatography and no free alcohol species was observed under any reaction condition. Complete equilibrium was attained when the reaction reaches 1:3:3:1 product distribution (see FIG. 19).

The metathesis reaction showed wide tunability, where full equilibrium can be reached under numerous conditions (hot/cold, slow/fast) and using a variety of catalysts (see FIG. 20). Two Lewis acids (Zn(OTf)$_2$ and Sc(OTf)$_3$) and two Bronsted acids (camphor sulfonic acid and cyclohexanecarboxylic acid) were selected for the study. Camphor sulfonic acid displayed the highest catalyst activity, reaching ~full equilibrium at 30° C. in 1 h or in 5 minutes at 60° C. In contrast, the cyclohexanecarboxylic acid displayed the lowest activity requiring 6 h at 150° C. to reach near full equilibrium. Interestingly, the Lewis acid metal catalysts demonstrated a wider temperature window for the reaction. For example, Zn(OTf)$_2$ showed moderate activity between 40° C. and 120° C.

Dynamic mechanical properties in bulk polymer materials comprising silyl ether motifs. After completion of the preliminary small molecule screening, polymers functionalized with the silyl ether motif were evaluated for their bulk polymer properties. A polystyrene material containing 10% silyl ether functionality was synthesized (Scheme 3).

Scheme 3. Preparation of Polystyrene Material Containing 10% Silyl Ether Functionality

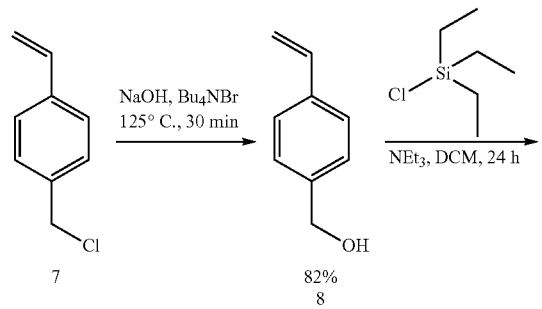

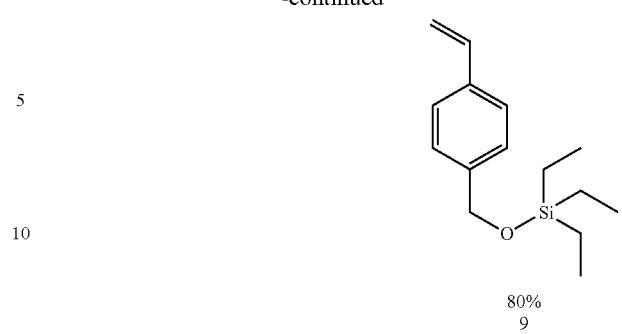

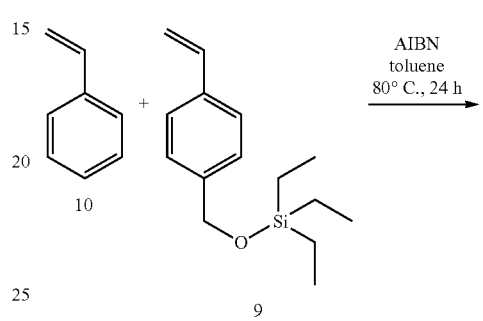

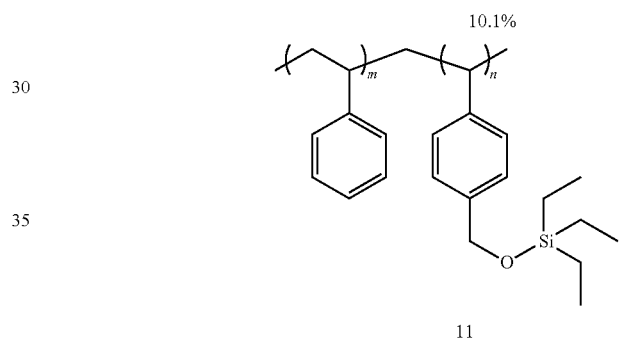

The chlorine group of vinyl benzene 7 was substituted with a hydroxide group in the presence of a phase transfer catalyst to form vinyl-phenyl methanol 8. Vinyl-phenyl methanol 8 is coupled to a chloro-triethyl silane under basic conditions to form silyl ether vinyl benzene 9. Upon addition of azobisisobutyronitrile, silyl ether vinyl benzene 9 is polymerized with styrene 10 to form a polystyrene material 11 comprising 10% silyl ether functionality.

Polystyrene was selected as the backbone to illustrate the commercial relevance of the silyl ether vitrimer motif. To initially probe the behavior of this system in bulk, the polymer sample was cross-linked with toluene sulfonic acid (TsOH) as the catalyst and a difunctional silyl ether as the cross-linker (Scheme 4).

Scheme 4. Preparation of Cross-linked Networks Using Polystyrene Material 11

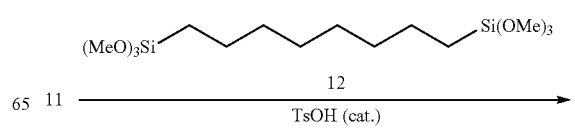

-continued

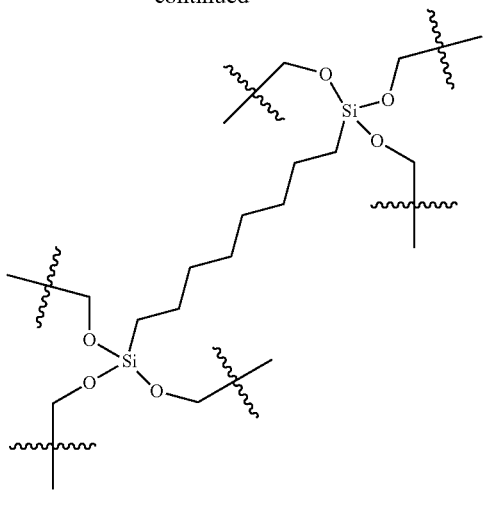

PS-Bis-C8

The amount of crosslinking was quantified via analysis of the remaining gel fraction left after submersion in xylenes for at least 12 hours.

To optimize the silyl ether bulk system, the amounts of catalyst and crosslinker were varied and gel fractions compared (see FIG. 21). First, the amount of catalyst was held constant at 0.25 mol % (with respect to total repeat units) and the amount of cross-linker was varied between 1-5 mol % (with respect to total repeat units). The samples were processed at 125° C. for 5, 15, and 30 minutes (see FIG. 21A). The data indicated that a higher gel fraction could be achieve by using more cross-linker. Next, the amount of cross-linker was held constant at 2.5 mol % and the catalyst was incorporated at 0.5 and 1 mol % (see FIG. 21B). It was found that a higher gel fraction could be generated using a higher catalyst loading.

These studies indicate the tunability of the dynamic polymers in bulk. The desired properties for a polystyrene-based material can be achieved via selection of specific incorporation amounts of catalyst and cross-linker. It was also observed that a gel fraction >85% leads to diminished reprocessability.

A number of embodiments have been described herein. Nevertheless, it will be understood that various modifications may be made without departing from the spirit and scope of this disclosure. Accordingly, other embodiments are within the scope of the following claims.

What is claimed is:

1. A dynamic malleable and reprocessable/recyclable polymer comprising one or more polymer chains that are reversibly and covalently cross-linked by a plurality of bis-silyl ether crosslinkers by a catalytically accelerated silyl ether exchange reaction,
   wherein the plurality of bis-silyl ether crosslinkers have a structure of:

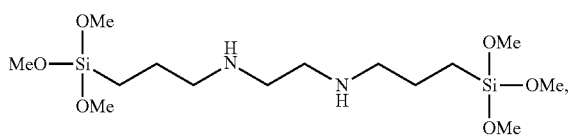 [SMILES: CO[Si](CCCNCCNCCC[Si](OC)(OC)OC)(OC)OC]

wherein the silyl ether exchange reaction is catalytically accelerated by the plurality of bis-silyl ether crosslinkers comprising amine groups that increase the rate of the silyl ether exchange reaction between the bis-silyl ether crosslinkers and the one or more polymer chains.

2. The dynamic polymer of claim 1, wherein the one or more polymer chains are formed from polymerized polymer monomers, wherein the polymer monomers comprise a first portion of monomers that do not comprise pendant hydroxyl groups, and a second portion of monomers that comprise pendant hydroxyl groups.

3. The dynamic polymer of claim 2, wherein the one or more polymer chains comprises polymerized acrylic monomers, wherein the acrylic monomers comprise a first portion of acrylic monomers that have the structure of:

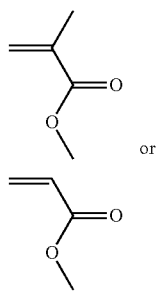

and wherein the acrylic monomers comprise a second portion of acrylic monomers that have a structure of:

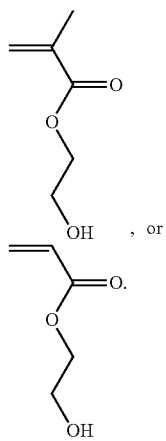

4. The dynamic polymer of claim 2, wherein the one or more polyer chains comprises polymerized vinyl monomers, wherein the vinyl monomers comprise a first portion of vinyl monomers that have a structure selected from the group consisting of:

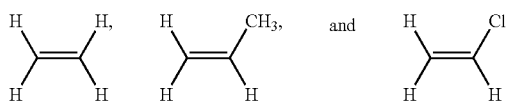

and wherein vinyl monomers comprise a second portion of vinyl monomers that have a structure selected from the group consisting of:

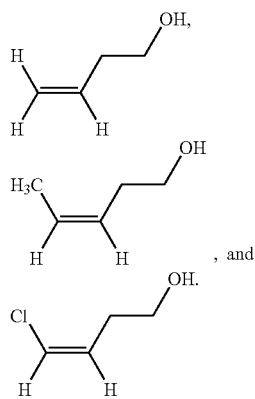

5. A method of making the dynamic polymer of claim 2 comprising:
polymerizing the first portion of monomers that do not comprise pendant hydroxyl groups with the second portion of monomers that comprise pendant hydroxyl groups in an organic solvent system by adding a radical initiator at an elevated temperature to form one or more polymer chains; and
crosslinking the polymer chains by heating a reaction mixture comprising the plurality of bis-silyl ether crosslinkers and the one or more polymer chains in organic solvent system at elevated temperatures.

6. The dynamic polymer of claim 1, wherein the one or more polymer chains comprises polymerized styrene monomers, wherein the styrene monomers comprise a first portion of styrene monomers that have the structure of:

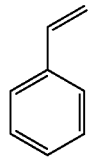

and wherein the styrene monomers comprise a second portion of styrene monomers that have the structure of:

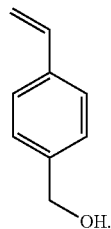

7. The dynamic polymer of claim 1, wherein the dynamic polymer exhibits one or more of the following features:
(i) the dynamic polymer does not exhibit any significant thermal degradation at temperatures up to 300° C.;
(ii) the dynamic polymer has a topology-freezing transition temperature ($T_v$), that is lower than the glass transistion temperature ($T_g$); and/or
(iii) the $T_v$ of the dynamic polymer and/or the material reprocessing temperature of the dynamic polymer is autocatalytically controlled.

8. A dynamic, malleable and self-healing polymer comprising one or more polymer chains formed from polymer monomers, wherein a portion of the polymer monomers comprise pendant hydroxyl groups or pendant silyl ether groups that are reversibly and covalently cross-linked with a plurality of bis-silyl ether crosslinkers,
wherein the one or more polymer chains that are formed from polymer monomers that that comprise pendant hydroxyl groups, the plurality of bis-silyl ether crosslinkers have the structure of:

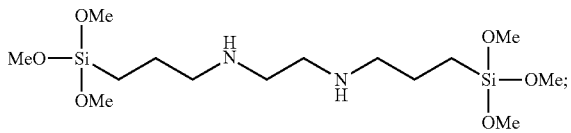 [SMILES: CO[Si](CCCNCCNCCC[Si](OC)(OC)OC)(OC)OC]

wherein the polymer monomers that comprise pendant hydroxyl groups have a structure selected from the group consisting of:

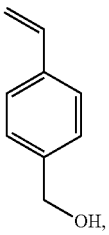

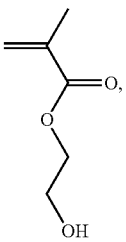

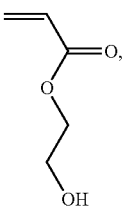

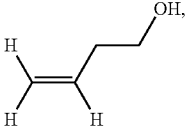

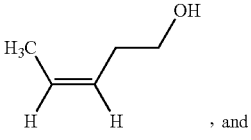

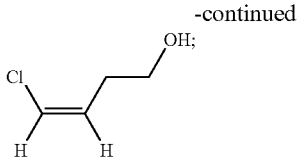

wherein for the one or more polymer chains that are formed from polymer monomers that that comprise pendant silyl ether groups, the plurality of bis-silyl ether crosslinkers have the structure of:

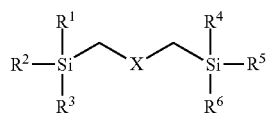

wherein, $R^1$-$R^6$ are —O—($C_1$-$C_3$)alkyl; and X is selected from the group consisting of an optionally substituted ($C_1$-$C_{20}$)alkyl, an optionally substituted ($C_1$-$C_{19}$) hetero-alkyl, an optically substituted ($C_1$-$C_{20}$)alkenyl, an optionally substituted ($C_1$-$C_{19}$) hetero-alkenyl, an optionally substituted ($C_1$-$C_{20}$)alkynyl, an optionally substituted ($C_1$-$C_{19}$)hetero-alkynyl, optionally substituted aryl, optionally substituted ($C_5$-$C_8$) cycloalkyl, optionally substituted ($C_5$-$C_8$)cycloalkenyl, optionally substituted heterocycle, and optionally substituted mixed ring system;

wherein the polymer monomers that comprise pendant silyl ether groups have a structure selected from the group consisting of:

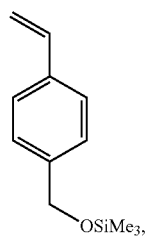

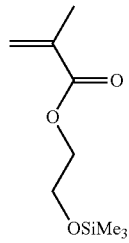

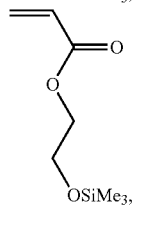

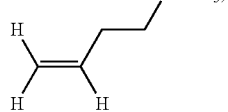

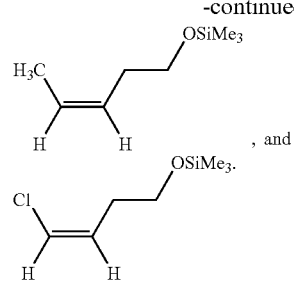

, and

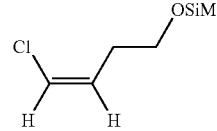

9. A dynamic, malleable and reprocessable/recyclable polymer comprising one or more polymer chains that are reversibly and covalently cross-linked with a plurality of silyl ether crosslinkers by a catalytically accelerated direct silyl ether metathesis reaction,
wherein the one or more polymer chains comprise pendant silyl ether groups, wherein a portion of the pendant silyl ether groups of the one or more polymer chains are reversibly and covalently linked with the plurality of silyl ether crosslinkers via a direct silyl ether metathesis reaction.

10. The dynamic polymer of claim 9, wherein the direct silyl ether metathesis reaction is catalytically accelerated by use of an acid catalyst.

11. The dynamic polymer of claim 9, wherein the one or more polymer chains are formed from polymerized polymer monomers, wherein the polymer monomers comprise a first portion of monomers that do not comprise silyl ether groups, and a second portion of monomers that comprise pendant silyl ether groups.

12. The dynamic polymer of claim 11, wherein the one or more polymer chains comprises polymerized acrylic monomers, alcohol monomers, allyl monomers, anhydride monomers, biodegradable polymer monomers, bisphenol and sulfonyldiphenol monomers, carboxylic acid monomers, epoxide monomers, isocyanate monomers, norbornene monomers, silicone monomers, styrene monomers, vinyl ester monomers, vinyl ether monomers, or vinyl monomers.

13. The dynamic polymer of claim 12, wherein the one or more polymer chains comprises polymerized styrene monomers, wherein the styrene monomers comprise a first portion of styrene monomers that have the structure of:

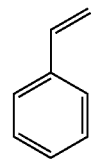

and wherein the styrene monomers comprise a second portion of styrene monomers that have the structure of:

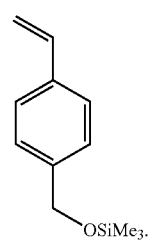

14. The dynamic polymer of claim 12, wherein the one or more polymer chains comprises polymerized acrylic monomers, wherein the acrylic monomers comprise a first portion of acrylic monomers that have the structure of:

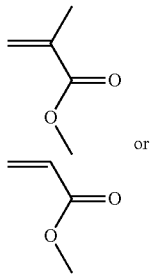 or and wherein the acrylic monomers comprise a second portion of acrylic monomers that have the structure of:

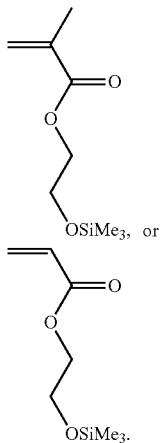

15. The dynamic polymer of claim 12, wherein the one or more polymer chains comprises polymerized vinyl monomers, wherein the vinyl monomers comprise a first portion of vinyl monomers that have a structure selected from the group consisting of:

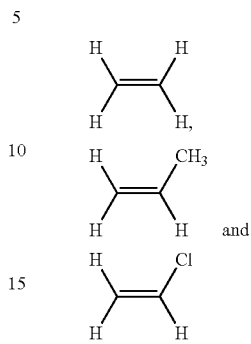

and wherein the vinyl monomers comprise a second portion of vinyl monomers that have a structure selected from the group consisting of:

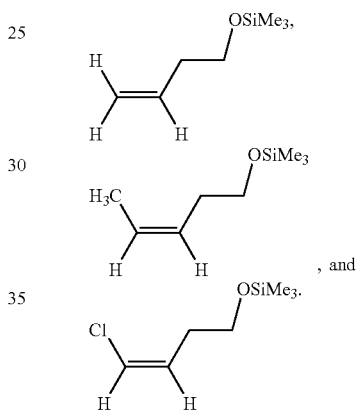

* * * * *